United States Patent
Nadolski

(10) Patent No.: US 12,287,312 B2
(45) Date of Patent: Apr. 29, 2025

(54) ROCK HARDNESS MEASUREMENT

(71) Applicant: MINPRAXIS SOLUTIONS LTD., Vancouver (CA)

(72) Inventor: Stefan Nadolski, Vancouver (CA)

(73) Assignee: MINPRAXIS SOLUTIONS LTD., Vancouver (CA)

(*) Notice: Subject to any disclaimer, the term of this patent is extended or adjusted under 35 U.S.C. 154(b) by 338 days.

(21) Appl. No.: 17/764,913

(22) PCT Filed: Oct. 2, 2020

(86) PCT No.: PCT/CA2020/051327
§ 371 (c)(1),
(2) Date: Mar. 29, 2022

(87) PCT Pub. No.: WO2021/062556
PCT Pub. Date: Apr. 8, 2021

(65) Prior Publication Data
US 2023/0009484 A1    Jan. 12, 2023

Related U.S. Application Data

(60) Provisional application No. 62/910,780, filed on Oct. 4, 2019.

(51) Int. Cl.
*G01N 3/50* (2006.01)
(52) U.S. Cl.
CPC ....... *G01N 3/50* (2013.01); *G01N 2203/0037* (2013.01); *G01N 2203/0087* (2013.01)
(58) Field of Classification Search
CPC .. G01N 3/10; G01N 3/40; G01N 3/50; G01N 2203/0037; G01N 2203/0076; G01N 2203/0087
See application file for complete search history.

(56) References Cited

U.S. PATENT DOCUMENTS

| | | |
|---|---|---|
| 4,074,866 A | 2/1978 | Meder |
| 4,315,429 A | 2/1982 | Morozov et al. |
| (Continued) | | |

FOREIGN PATENT DOCUMENTS

| | | |
|---|---|---|
| AU | 2020294352 A1 | 9/2021 |
| CN | 104772187 A | 7/2015 |
| (Continued) | | |

OTHER PUBLICATIONS

International Patent Application No. PCT/CA2020/051327, International Search Report dated Dec. 15, 2020, 4 pages.
(Continued)

*Primary Examiner* — Erika J. Villaluna
(74) *Attorney, Agent, or Firm* — Kolitch Romano Dascenzo Gates LLC

(57) ABSTRACT

A method of facilitating hardness measurement of a rock sample involves receiving force information representing forces applied to the rock sample during roll crushing, determining size information representing a size of the rock sample, and determining, based on at least the force information and the size information, at least one hardness parameter representing hardness of the rock sample. A method of facilitating hardness measurement of a rock sample from a drill core involves receiving force information representing forces applied to the rock sample during roll crushing of the rock sample, determining, based on at least the force information, at least one hardness parameter representing hardness of the rock sample, and associating the at least one hardness parameter with at least one location from which the rock sample was extracted. Other apparatuses, methods, systems, and computer-readable media are provided.

44 Claims, 35 Drawing Sheets

(56) References Cited

U.S. PATENT DOCUMENTS

| | | | |
|---|---|---|---|
| 4,703,897 | A | 11/1987 | Beisner et al. |
| 4,914,591 | A | 4/1990 | Warren et al. |
| 5,133,209 | A | 7/1992 | Noguchi et al. |
| 5,392,633 | A | 2/1995 | Morris |
| 5,670,711 | A | 9/1997 | Detournay et al. |
| 7,549,315 | B2 | 6/2009 | Bulled et al. |
| 7,845,237 | B2 | 12/2010 | Torres et al. |
| 8,234,912 | B2 | 8/2012 | Suarez-Rivera et al. |
| 8,271,236 | B2 | 9/2012 | Shi et al. |
| 8,272,247 | B2 | 9/2012 | Kojovic et al. |
| 9,205,431 | B2 | 12/2015 | Anderson, Jr. |
| 10,048,179 | B2 | 8/2018 | Lai et al. |
| 11,573,159 | B2 * | 2/2023 | Lee .......................... G01N 3/44 |
| 2009/0084168 | A1 | 4/2009 | Bulled et al. |
| 2009/0260415 | A1 | 10/2009 | Suarez-Rivera et al. |
| 2011/0126641 | A1 | 6/2011 | Speith et al. |
| 2013/0277467 | A1 | 10/2013 | Niklewski |
| 2016/0107162 | A1 | 4/2016 | Busenhart et al. |
| 2017/0014833 | A1 | 1/2017 | Mahonen et al. |
| 2018/0252626 | A1 | 9/2018 | Kojovic |
| 2018/0364140 | A1 * | 12/2018 | Miyazaki ............. G01N 29/045 |
| 2021/0270709 | A1 | 9/2021 | Yliopisto |

FOREIGN PATENT DOCUMENTS

| | | |
|---|---|---|
| CN | 108097372 A | 6/2018 |
| CN | 109126960 A | 1/2019 |
| EP | 2653224 A1 | 10/2013 |
| EP | 2653225 A1 | 10/2013 |
| EP | 2653227 A1 | 10/2013 |
| IN | 383107 A1 | 12/2021 |
| JP | H06205998 A | 7/1994 |
| WO | 2013156964 A1 | 10/2013 |
| WO | 2013156966 A1 | 10/2013 |
| WO | 2016186691 A1 | 11/2016 |
| WO | 2019093954 A1 | 5/2019 |
| WO | 2020136309 A1 | 7/2020 |

OTHER PUBLICATIONS

International Patent Application No. PCT/CA2020/051327, Written Opinion of the International Searching Authority dated Dec. 11, 2020, 4 pages.

Lieberwirth, et al., "Dynamics in double roll crushers", Elsevier Ltd., Minerals Engineering 103-104, Sep. 2, 2016, pp. 60-66.

Nadolski, et al., "Development and Application of an Energy Benchmarking Model for Mineral Comminution", Semi-Autogenous and High Pressure Grinding Technology (SAG) Conference, 2015, Vancouver, 15 pages.

ASTM International, "Standard Test Method for Determination of the Point Load Strength Index of Rock and Application to Rock Strength Classifications" published Feb. 2008, 12 pages.

Michaux, et al., "How to Set Up and Develop a Geometallurgical Program", Geological Survey of Finland Economic Minerals Unit, May 11, 2020, 245 pages.

Hillmann, et al., "New Horizons for Double-Roll Crushers", Proceedings of the 14th European Symposium on Comminution and Classification, Institute of Mineral Processing Machines, Freiberg, Germany, Sep. 2015, pp. 233-239.

Torvela, "Double Wheel Crusher Prototype", Master Thesis Feb. 2020, Degree Program of Mechanical Engineering, University of Oulu, 73 pages.

Matus, "Development of a Methodology and Validation of the Geopyörä Breakage Test", Master Thesis in Mineral Processing, Oulu Mining School, Oulu, Jun. 2020, 175 pages.

Uktech Products, Products Brochure, "JK Rotary Breakage Tester" published prior to Oct. 2019, 2 pages.

University of Oulu, "Promising Solutions to the Mining Industry and Self Driving Cars", www.oulu.fi/university/www.oulu.fi/university/news/lidar, last updated Mar. 1, 2019, 3 pages.

Gupta, Ashok; et al., "Mineral Processing Design and Operations (Second Edition), Chapter 6—Roll Crushers", Elsevier, ISBN 9780444635891, May 31, 2016, https://doi.org/10.1016/B978-0-444-63589-1.00006-X, pp. 169-188.

European Patent Application No. 20870691.1, Extended European Search Report dated Feb. 14, 2024, 15 pages.

Canadian Patent Application No. 3,156,054, Office Action dated May 30, 2024, 6 pages.

Assakkaf, Dr. Ibrahim; Aggregate Production; Microsoft PowerPoint—Lecture 22, Chapter 14, ENCE 420-Construction Equipment and Methods, Department of Civil and Environmental Engineering University of Maryland, College Park, presented Spring 2003, available online http://www.assakkaf.com/courses/ence420/lectures/chapter14.pdf; 33 pages.

Canadamines.ca, "Core logging 101, The Fundamentals of Logging Core Samples for Mineral Exploration", available online at The Basics of Logging Core for Exploration https://canadamines.ca/basics-of-logging-core-samples-for-mineral-exploration, published online Feb. 19, 2014, 8 pages.

CIM Mineral Resource and Mineral Reserve Committee; "CIM Mineral Exploration Best Practice Guidelines", Adopted by CIM Council, Nov. 23, 2018, available online at https://mrmr.cim.org/media/1080/cim-mineral-exploration-best-practice-guidelines-november-23-2018.pdf, 17 pages.

\* cited by examiner

Hardness parameter record

| | | |
|---|---|---|
| 402 — | Hardness 1 | 13.82 |
| 404 — | Time | 20190716151233936 |
| | Hardness 2 | 30.71 |
| | Time | 20190716151234562 |
| | ... | |
| | Hardness 30 | 50.13 |
| | Time | 20190716161203222 |

520

Hardness parameter record

522 — Hardness        3.26
524 — Time            20190717151233909

540

Hardness parameter location record

542 — Hardness      3.26
543 — Time      20190717151233909
544 — Drill hole ID      MPXS002
546 — Location start      300

Hardness parameter location record

| | | |
|---|---|---|
| 542— | Hardness | 3.26 |
| 543— | Time | 20190717151233909 |
| 544— | Drill hole ID | MPXS002 |
| 546— | Location start | 300 |
| 548— | Location end | 300.030 |

2040

Hardness parameter location record

| | | |
|---|---|---|
| 2042 — | Hardness | 3.63 |
| 2043 — | Time | 20190817131233209 |
| 2044 — | Drill hole ID | MPXS004 |
| 2046 — | Location start | 200 |
| 2048 — | Location end | 200.0204 |

Drill core position record

| | |
|---|---|
| Drill core position 1 | 0.00 |
| Time | 20190817131233209 |
| Drill core position 2 | 0.210 |
| Time | 20190817131233210 |
| ... | |

ROCK HARDNESS MEASUREMENT

RELATED APPLICATION

This application is a national phase entry of International Patent Application No PCT/CA2020/051327, filed Oct. 2, 2020, which claims the benefit of U.S. Provisional Application No. 62/910,780 entitled "ROCK HARDNESS MEASUREMENT", filed on Oct. 4, 2019, which is hereby incorporated by reference herein in its entirety.

BACKGROUND

1. Field

Embodiments of this invention relate to hardness measurement and more particularly to hardness measurement of one or more rock samples.

2. Description of Related Art

Some systems for performing hardness measurement of rock samples may be difficult and/or time consuming to use, may provide inaccurate measurements, may be costly to operate, and/or may not associate rock samples from a drill core with a location from which the rock sample was extracted. For example, some systems may need to provide material taken from a conveyor for laboratory testing. Such systems may require a team of operators to stop a mill feed conveyor and sample large quantities of rock material. The material may be processed at a laboratory to measure its size and hardness and the testing may take one to two weeks, for example. Some systems for performing hardness measurement of rock samples may be only carried out when a mill has been stopped, such as for maintenance, and so only a few hardness measurements per year may be performed. Some known systems for performing hardness measurement of rock samples may result in hardness data being generally poorly monitored, such that for mining operations, mining equipment and control systems may not be set up for efficient or productive operation.

SUMMARY

In accordance with various embodiments, there is provided a method of facilitating hardness measurement of a rock sample, the method involving receiving force information representing one or more forces applied to the rock sample during roll crushing of the rock sample by at least one roller, determining size information representing a size of the rock sample, and determining, based on at least the force information and the size information, at least one hardness parameter representing hardness of the rock sample.

Determining the size information may involve determining, based on at least the force information, a processing time during which the one or more forces were applied to the rock sample during the roll crushing of the rock sample.

Determining the processing time may involve determining the processing time as a time period during which the one or more forces applied to the rock sample remained above a threshold force.

Determining the size information may involve determining a size parameter representing the size of the rock sample based at least in part on the processing time and determining the at least one hardness parameter may involve determining the at least one hardness parameter based at least in part on the force information and the size parameter.

The method may involve receiving roller gap information representing a roller gap size provided by the at least one roller during the roll crushing and determining the at least one hardness parameter may involve determining the at least one hardness parameter based at least in part on the roller gap information.

Determining the size information may involve determining the size information based at least in part on the roller gap information.

Determining the at least one hardness parameter may involve determining from the roller gap information, a maximum roller gap size during roll crushing of the rock sample and determining the at least one hardness parameter based at least in part on the maximum roller gap size.

Determining the at least one hardness parameter may involve determining compression distance of the rock sample during roll crushing and multiplying crushing forces of the one or more forces represented by the force information by the compression distance to determine crushing energy.

Determining the at least one hardness parameter may involve determining a maximum force of the one or more forces and determining the at least one hardness parameter based at least in part on the maximum force.

Receiving the force information may involve receiving a representation of one or more sensed roller holding forces holding the at least one roller against at least one gap limiter during the roll crushing and determining the one or more forces based at least in part on the one or more sensed roller holding forces.

The method may involve controlling at least one roller engagement holder to adjust an applied roller gathering force.

Controlling the at least one roller engagement holder may involve controlling at least one hydraulic actuator included in the at least one roller engagement holder to adjust the applied roller gathering force.

The one or more forces may have a sampling period of less than about 1 ms.

The one or more forces have a sampling period of less than about 0.2 ms.

The method may involve associating the at least one hardness parameter with at least one location from which the rock sample was extracted.

The rock sample may be from a drill core, the method further involving receiving core position information representing a position of the drill core relative to the at least one roller, and determining the at least one location based at least in part on the core position information.

Receiving the core position information may involve receiving engager position information, the engager position information representing a position of an engager configured to engage the drill core for urging the drill core towards the at least one roller for roll crushing.

The method may involve causing a guide to guide the engager into engagement with the drill core for urging the drill core towards the at least one roller for roll crushing.

The force information may include roll crushing motor power information representing the one or more forces applied to the rock sample during roll crushing of the rock sample.

In accordance with various embodiments, there is provided a method of facilitating hardness measurement of a plurality of rock samples having varying sizes, the method involving, for each of the plurality of rock samples, performing any one of the above methods to determine at least one hardness parameter for the rock sample.

The method may involve determining an average hardness parameter for a set of the plurality of rock samples.

The method may involve causing a representation of the average hardness parameter to be displayed by a display to a user.

In accordance with various embodiments, there is provided a method of facilitating hardness measurement of a rock sample from a drill core, the method involving receiving force information representing one or more forces applied to the rock sample during roll crushing of the rock sample by at least one roller, determining, based on at least the force information, at least one hardness parameter representing hardness of the rock sample, and associating the at least one hardness parameter with at least one location from which the rock sample was extracted.

The method may involve receiving core position information representing a position of the drill core relative to the at least one roller, and determining the at least one location based at least in part on the core position information.

Receiving the core position information may involve receiving engager position information, the engager position information representing a position of an engager configured to engage the drill core for urging the drill core towards the at least one roller.

The method may involve causing a guide to guide the engager into engagement with the drill core for urging the drill core towards the at least one roller for roll crushing.

Associating the at least one hardness parameter with the at least one location may involve associating the at least one hardness parameter with first location information representing a location of a first end of the rock sample.

Associating the at least one hardness parameter with the at least one location may involve receiving rock sample length information representing a length of the rock sample.

The method may involve determining, based on the first location information and the rock sample length information, second location information representing a location of a second end of the rock sample.

The rock sample may be a first rock sample, the method further involving receiving force information representing one or more forces applied to a second rock sample during roll crushing of the second rock sample by the at least one roller, determining, based on at least the force information, at least one hardness parameter representing hardness of the second rock sample, and associating the at least one hardness parameter representing hardness of the second rock sample with the second location information, the second location information representing a location of a first end of the second rock sample.

The method may involve receiving roller gap information representing a roller gap size provided by the at least one roller during the roll crushing and determining the at least one hardness parameter may involve determining the at least one hardness parameter based at least in part on the roller gap information.

Determining the at least one hardness parameter may involve determining from the roller gap information, a maximum roller gap size during roll crushing of the rock sample and determining the at least one hardness parameter based at least in part on the maximum roller gap size.

Determining the at least one hardness parameter may involve determining compression distance of the rock sample during roll crushing and multiplying crushing forces of the one or more forces represented by the force information by the compression distance to determine crushing energy.

Determining the at least one hardness parameter may involve determining a maximum force of the one or more forces and determining the at least one hardness parameter based at least in part on the maximum force.

Receiving the force information may involve receiving a representation of one or more sensed roller holding forces holding the at least one roller against at least one gap limiter during the roll crushing and determining the one or more forces based at least in part on the one or more sensed roller holding forces.

The method may involve controlling at least one roller engagement holder to adjust an applied roller gathering force applied to the at least one roller.

Controlling the at least one roller engagement holder may involve controlling at least one hydraulic actuator included in the at least one roller engagement holder to adjust the applied roller gathering force.

The one or more forces may have a sampling period of less than about 1 ms.

The one or more forces have a sampling period of less than about 0.2 ms.

In accordance with various embodiments, there is provided a system for facilitating hardness measurement including at least one processor configured to perform any one of the above methods.

In accordance with various embodiments, there is provided a non-transitory computer readable medium having stored thereon codes which when executed by at least one processor cause the at least one processor to perform any one of the above methods.

In accordance with various embodiments, there is provided an apparatus for facilitating hardness measurement of a rock sample, the apparatus including one or more rollers configured to receive and roll crush the rock sample, and at least one force sensor coupled to at least one of the one or more rollers and configured to sense one or more forces applied to the rock sample during roll crushing of the rock sample, wherein the at least one force sensor is configured to produce signals representing the sensed one or more forces for reception by a measurement device configured to receive the signals representing the one or more forces applied to the rock sample during roll crushing of the rock sample, and determine, based on at least the force information, at least one hardness parameter representing hardness of the rock sample.

The apparatus may include at least one gap sensor coupled to at least one of the one or more rollers and configured to sense a roller gap size provided by the one or more rollers during the roll crushing of the rock sample, wherein the at least one gap sensor is configured to produce signals representing the sensed roller gap size for reception by the measurement device, the measurement device configured to determine the at least one hardness parameter based at least in part on the roller gap size.

The rock sample may be from a drill core, the apparatus further including at least one position sensor configured to sense position information representing a position of the drill core relative to the one or more rollers, wherein the at least one position sensor is configured to produce signals representing the position information for reception by the measurement device, the measurement device configured to determine at least one location from which the rock sample was extracted based at least in part on the position information and to associate the at least one hardness parameter with the at least one location.

The apparatus may include an engager configured to engage the drill core for urging the drill core towards the one or more rollers for roll crushing, wherein the at least one position sensor is configured to sense a position of the engager, the position of the engager representing the position of the drill core.

The apparatus may include a guide configured to guide the engager into engagement with the drill core for urging the drill core towards the one or more rollers for roll crushing.

The guide may include a passage configured to guide the engager into engagement with the drill core and to guide the drill core towards the one or more rollers.

The apparatus may include at least one roller engagement holder configured to apply an adjustable gathering force to the one or more rollers.

The at least one roller engagement holder may include one or more hydraulic actuators.

Other aspects and features of embodiments of the invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention,

FIG. 15 is a representation of an exemplary hardness parameter location record that may be used in the system shown in FIG. 11 in accordance with various embodiments;

FIG. 29 is a representation of an exemplary hardness parameter location record that may be used in the system shown in FIG. 24 in accordance with various embodiments;

DETAILED DESCRIPTION

In various embodiments, hardness measurement of rock samples or particles may be important for various applications, such as, for example, mining or mineral processing operations, to allow operators to make decisions and/or configure equipment to work well with the hardness of rock that is being sampled. For example, mineral processing plants may aim to maximize value by crushing and grinding rocks at high throughputs to fine sizes for suitable recovery of economic minerals (copper, gold etc.) and the crushing and grinding equipment may be set and/or optimized according to the hardness and size of material entering the plant. In some embodiments, hardness measurements may be used to evaluate plant performance with respect to the hardness of the ore and/or decide whether changes need to be made to equipment and/or process setpoints need to be adjusted. For example, in some embodiments, a review of historical hardness measurements and plant performance may prompt mill operators to increase or decrease the level of media in mills, such as plant ball mills, to better suit the type of material being processed. In some embodiments, for example, a sudden increase in measured hardness may prompt a control system to decrease the feed rate to a mill to prevent the mill overfilling and shutting down due to overload.

In accordance with various embodiments described herein, there is provided a system for providing online rock hardness measurements for various applications, including, for example, mineral process plants. By making hardness information available, operators may be able to monitor plant performance with respect to the type of feed that was being processed (e.g. softer material should yield higher plant throughputs) and/or changes may be made (automatically by a control system and/or by operators) to suit the type of material being processed. Furthermore, the benefits of Artificial Intelligence (AI) algorithms for process control are increasingly being recognized and in some embodiments, the systems described herein may be able to provide significant input (material hardness) to AI-based control systems.

Figure 1:
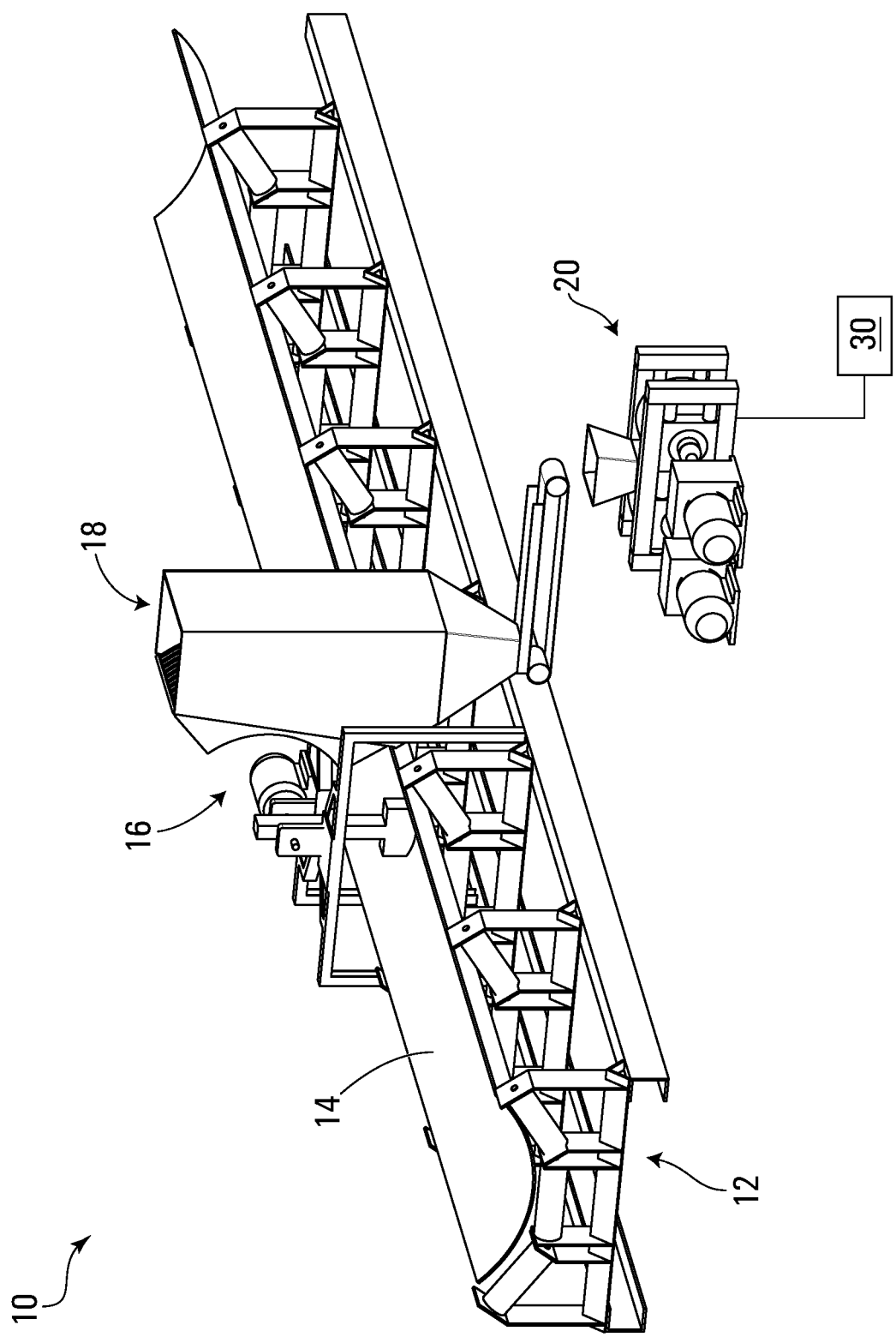
FIG. 1 is a schematic view of a system for facilitating hardness measurement of one or more rock samples, according to various embodiments.

Referring to FIG. 1, there is shown a system 10 for facilitating hardness measurement of one or more rock samples, in accordance with various embodiments. The system 10 includes a rock sample source 12, which may include, for example, a conveyor 14 for conveying crushed rock, a sampler 16 for sampling crushed rock from the conveyor 14 and a screen 18 for receiving the sampled crushed rock via the sampler 16 and outputting a rock sample, a roll crusher 20 configured to crush the rock sample using at least one roller and to measure force applied to the rock sample during crushing of the rock sample, and a measurement device or apparatus 30 for facilitating hardness measurement of the rock sample.

Figure 2:
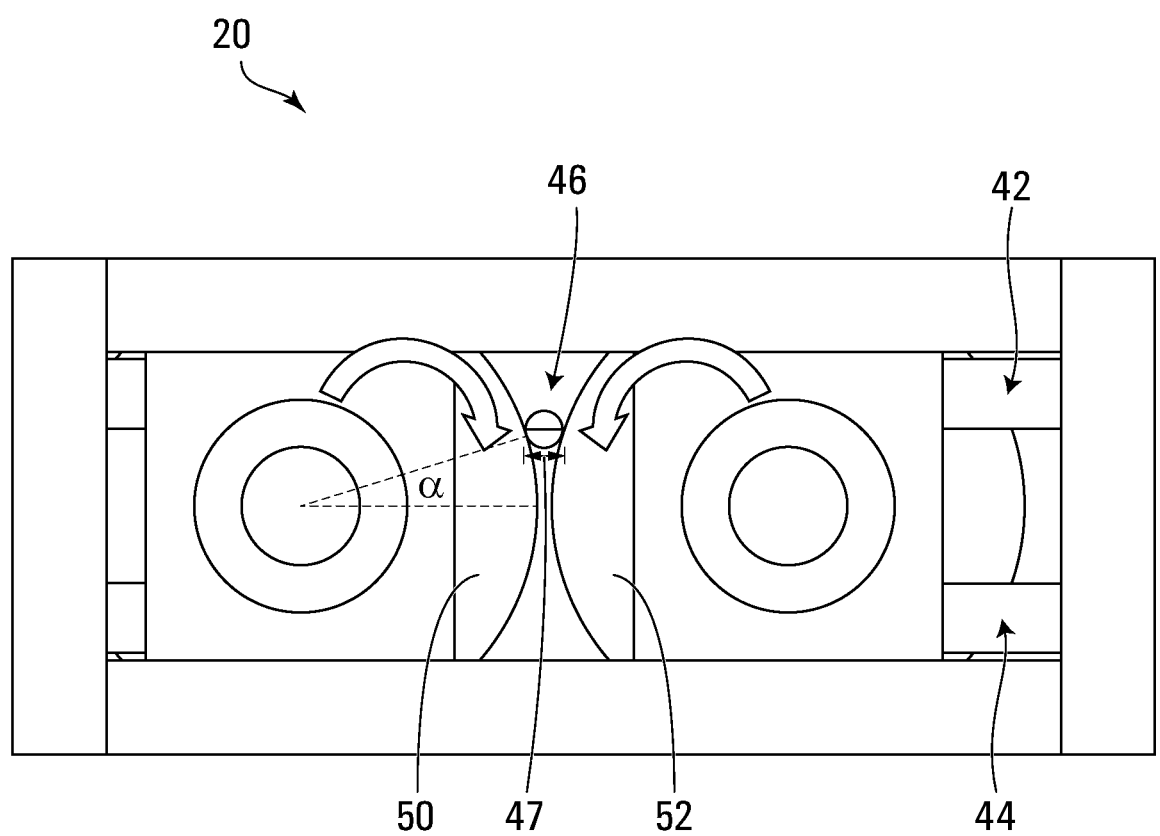
FIG. 2 is a front view of a roll crusher of the system shown in FIG. 1, in accordance with various embodiments.

Referring to FIG. 2, in various embodiments, the roll crusher 20 may include force sensors, two of which are shown at 42 and 44, which may for example include one or more load cells, configured to sense forces applied by the roll crusher 20 to a rock sample 46 during crushing and to generate signals representing force information representing one or more forces applied to the rock sample 46 during roll crushing of the rock sample.

Referring to FIG. 1, the measurement device 30 may be in communication with the force sensors 42 and 44 of the roll crusher 20, such as, for example, via a wired connection. In some embodiments, in operation, the rock sample source 12 may provide the rock sample 46 to the roll crusher 20 and the roll crusher 20 may crush the rock sample 46. In various embodiments, the roll crusher 20 may crush the rock sample by causing motors included in the roll crusher 20 to rotate rollers 50 and 52 in the direction shown by the arrows in FIG. 2. The force sensors 42 and 44 shown in FIG. 2 may sense one or more forces applied to the rock sample 46 during roll crushing of the rock sample by the rollers 50 and 52 of the roll crusher 20 and transmit force information representing the one or more forces to the measurement device 30. In some embodiments, the force information may be transmitted as an analog signal (e.g. a mV signal going from a transducer to an amplifier, wherein an amplifier/signal-conditioner may output 4-20 mA to a data acquisition unit).

In various embodiments, the measurement device 30 may receive the force information representing the one or more forces applied to the rock sample 46 during roll crushing of the rock sample 46 by the rollers 50 and 52. In some embodiments, the measurement device 30 may store a representation of the force information in memory. For example, in some embodiments, the measurement device may store a plurality of forces, each associated with a respective time in memory.

In various embodiments, the measurement device 30 may then determine size information representing a size of the rock sample 46. For example, in some embodiments, the measurement device 30 may determine, based on at least the force information, a processing time during which the one or more forces were applied to the rock sample 46 during the roll crushing of the rock sample 46, the processing time representative of the size of the rock sample. In some embodiments, if the processing time during which the rock sample 46 was crushed is long, this may indicate that the rock sample 46 was large in size. In some embodiments, a size of the rock sample 46 may be derived as a function of the processing time, for example. In various embodiments, the measurement device 30 may determine, based on at least the force information and the size information, at least one hardness parameter representing hardness of the rock sample. For example, in some embodiments, the measurement device 30 may determine a maximum force of the one or more forces applied to the rock sample and the measurement device 30 may determine the hardness parameter based at least in part on the maximum force. In some embodiments, hardness may also depend on the size of the rock sample 46 and the measurement device 30 may apply a function to the maximum force and the determined size information to determine the hardness parameter. In some embodiments, the measurement device 30 may apply a function to the maximum force and the determined size information to determine a milling parameter, which may in some embodiments act as a hardness parameter.

In various embodiments, by determining the size information and then determining the hardness parameter based at least in part on the size information, the measurement device 30 may facilitate accurate determination of hardness for rock samples having varying sizes.

In various embodiments, once the hardness parameter has been determined, the measurement device 30 may store the hardness parameter in memory. In some embodiments, measurement device 30 may generate and store in memory a plurality of hardness parameters, each associated with a respective rock sample received from the rock sample source 12, the hardness parameters indicating various hardness parameters determined for the rock samples.

In some embodiments, where the rock samples are received from the conveyor 14 used in a mineral processing system, the stored hardness parameters may represent near real-time measurements of the hardness of the rock being processed in the mineral processing system. In some embodiments, the measurement device 30 may include a display and the measurement device 30 may generate signals representing the hardness parameters for causing the hardness parameters to be displayed by the display to a user of the system 10. In some embodiments, the user may review the hardness parameters and adjust the mineral processing system to match the hardness of the rock being processed and thereby may increase efficiency of the mineral processing system.

In various embodiments, the measurement device 30 or a measurement device generally similar to the measurement device 30 may be configured to facilitate hardness measurement of a rock sample (or drill core sample) from drill core. In some embodiments, the measurement device may be configured to receive force information representing one or more forces applied to the rock sample during roll crushing of the rock sample by at least one roller. The measurement device may be configured to determine, based on at least the force information, at least one hardness parameter representing hardness of the rock sample, and to associate the at least one hardness parameter with a location from which the rock sample was extracted.

For example, in some embodiments, the measurement device 30 may be configured to associate the at least one hardness parameter with first location information representing a location of a first end of the rock sample. In some embodiments, the first location information may represent the location of the first end of the rock sample before the rock sample was extracted. In some embodiments, the first location information may be user-defined first location information and the measurement device 30 may be configured to receive the user-defined first location information from a user via a user interface, for example.

In some embodiments, the measurement device 30 may be configured to receive rock sample length information representing a length of the rock sample. In some embodiments, the rock sample length information may be user-defined rock sample length information and the measurement device 30 may be configured to receive the user-defined rock sample length information from the user via a user interface, for example.

In some embodiments, the measurement device 30 may be configured to determine, based on the first location information and the rock sample length information, second location information representing a location of a second end of the rock sample. In some embodiments, the second location information may represent the location of the second end of the rock sample before the rock sample was extracted.

For example, in some embodiments, the measurement device 30 may be configured to determine the location of the second end of the rock sample by adding the rock sample length to the location of the first end of the rock sample. In various embodiments, the measurement device 30 may be configured to associate the determined at least one hardness parameter with the location of the second end of the rock sample.

In some embodiments, the rock sample may be a first rock sample and the measurement device 30 may be configured to facilitate hardness measurements of further rock samples, taken from the drill core, generally as described above. In some embodiments, it may be assumed that the second end of the first rock sample is at the same location as a first end of a second rock sample. Accordingly, the measurement device 30 may be configured to associate at least one hardness parameter representing hardness of the second rock sample with the second location information, the second location information representing a location of the first end of the second rock sample. Accordingly, in some embodiments, the user may only need to provide a length for each rock sample subsequent to the first rock sample, and the measurement device 30 may automatically determine locations for the first and second ends of each rock sample based on the input lengths. In various embodiments, this may make it easier for the operator over the course of processing large volumes of core sample (e.g. processing multiple trays of core for the same borehole totaling 300 metres or so) to generate unique hardness data for short (say 5 cm) core interval lengths rather than recording an average of hardness measurements for a large interval length (say 20 cm, for example).

In some embodiments, the user may use the hardness parameters and their corresponding associated locations to review the hardness of material along a borehole, to better understand the hardness of the rock mass, in terms of geotechnical strength parameters for example, at various locations surrounding the borehole. In various embodiments, by having short interval data available a better representation of hardness variability may be obtained and milling equipment may be nominated and sized accordingly. In various embodiments, this may be especially relevant to milling equipment that is sensitive to the presence of hard rocks (e.g., semi-autogenous mill and autogenous mills).

Various alternative embodiments of roll crushers and measurement devices are described in further detail below.

Measurement Device—Processor Circuit

Figure 3:
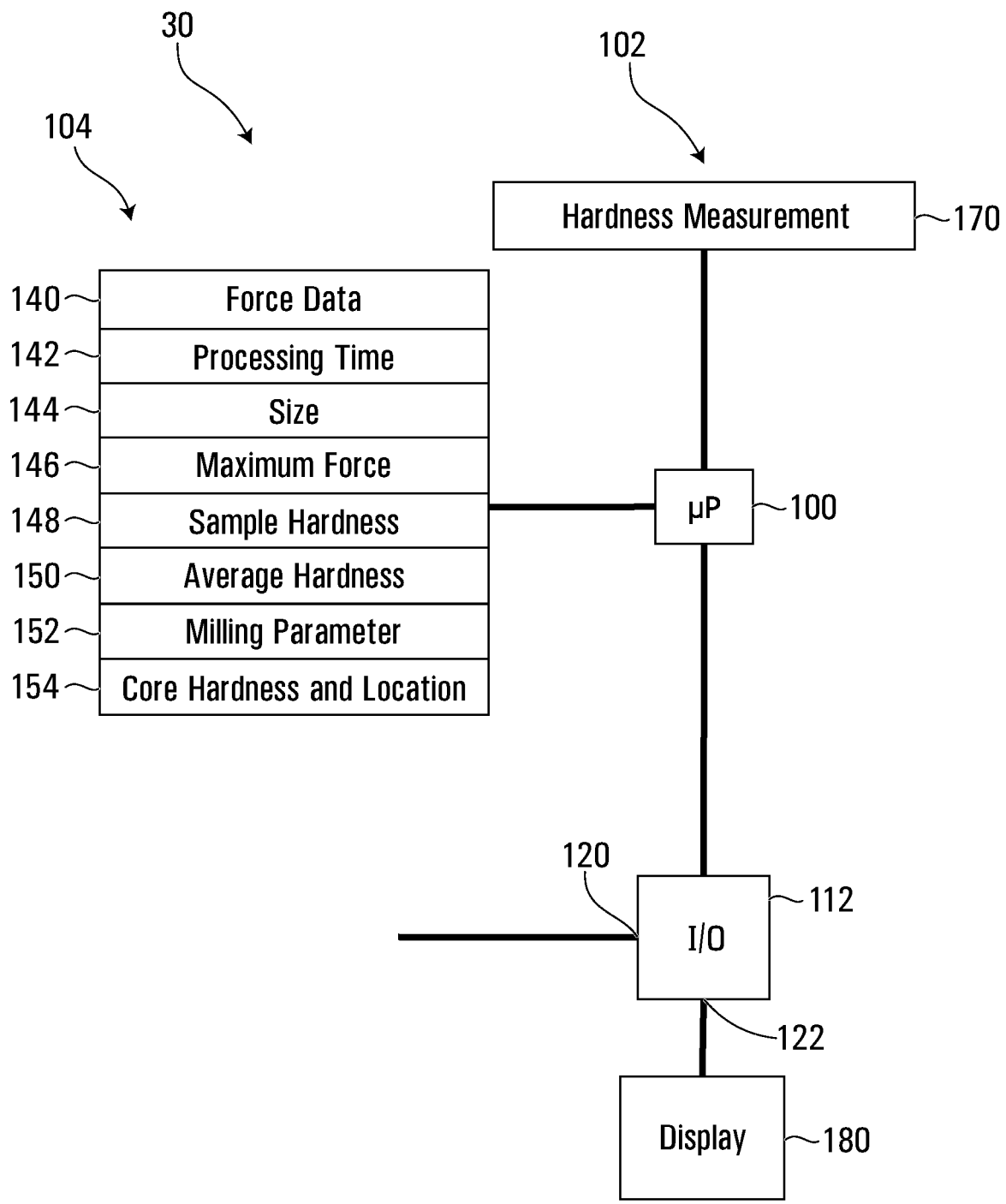
FIG. 3 is a schematic view of a measurement device of the system shown in FIG. 1 including a processor circuit, in accordance with various embodiments.

Referring now to FIG. 3, a schematic view of the measurement device 30 of the system 10 shown in FIG. 1 according to various embodiments is shown. Referring to FIG. 3, the measurement device 30 includes a processor circuit including a processor 100 and a program memory 102, a storage memory 104, and an input/output (I/O) interface 112, all of which are in communication with the processor 100. In various embodiments, the processor 100 may include one or more processing units, such as for example, a central processing unit (CPU), a graphical processing unit (GPU), and/or a field programmable gate array (FPGA). In some embodiments, any or all of the functionality of the measurement device 30 described herein may be implemented using one or more FPGAs.

In the embodiment shown in FIG. 3, the measurement device 30 also includes a display 180 in communication with the processor 100 via an interface 122 of the I/O interface 112. The I/O interface 112 may include an interface 120 for communicating with the force sensors 42 and 44 shown in FIG. 2. In some embodiments, the I/O interface 112 may also include an additional interface for facilitating networked communication through a network such as the Internet. In some embodiments, the interface 120 may facilitate wireless and/or wired communication. In some embodiments, each of the interfaces included in the I/O interface 112 may include one or more interfaces and/or some or all of the interfaces included in the I/O interface 112 may be implemented as combined interfaces or a single interface.

In some embodiments, where a device is described herein as receiving or sending information, it may be understood that the device receives signals representing the information via an interface of the device or produces signals representing the information and transmits the signals to the other device via an interface of the device.

Processor-executable program codes for directing the processor 100 to carry out various functions are stored in the program memory 102. Referring to FIG. 3, the program memory 102 includes a block of codes 170 for directing the measurement device 30 to perform hardness measurement. In this specification, it may be stated that certain encoded entities such as applications or modules perform certain functions. Herein, when an application, module or encoded entity is described as taking an action, as part of, for example, a function or a method, it will be understood that at least one processor (e.g., the processor 100) is directed to take the action by way of programmable codes or processor-executable codes to or instructions defining or forming part of the application.

The storage memory 104 includes a plurality of storage locations including location 140 for storing force data, location 142 for storing processing time data, location 144 for storing size data, location 146 for storing maximum force data, location 148 for storing sample hardness data, location 150 for storing average hardness data, location 152 for storing milling parameter data, and location 154 for storing core hardness and location data. In various embodiments, the storage locations may be stored in a database in the storage memory 104.

In various embodiments, the block of codes 170 may be integrated into a single block of codes or portions of the block of code 170 may include one or more blocks of code stored in one or more separate locations in the program memory 102. In various embodiments, any or all of the locations 140, 142, 144, 146, 148, 150, 152, and 154 may be integrated and/or each may include or be included in one or more separate locations in the storage memory 104.

Each of the program memory 102 and storage memory 104 may be implemented as one or more storage devices including random access memory (RAM), a hard disk drive (HDD), a solid-state drive (SSD), a network drive, flash memory, a memory stick or card, any other form of non-transitory computer-readable memory or storage medium, and/or a combination thereof. In some embodiments, the program memory 102, the storage memory 104, and/or any portion thereof may be included in a device separate from the measurement device 30 and in communication with the measurement device 30 via the I/O interface 112, for example.

Hardness Measurement

As discussed above, in various embodiments, the measurement device 30 shown in FIG. 1 may facilitate hardness measurement of one or more rock samples.

As discussed above, in various embodiments, the rock sample source 12 shown in FIG. 1 may be configured to provide the rock sample 46 to the roll crusher 20 shown in FIG. 2. In some embodiments, the conveyor 14 may be conveying mined rock for processing in a mineral processing system and the sampler 16 may remove a portion of the mined rock from the conveyor 14 for hardness testing. In some embodiments, for example, the conveyor 14 may be conveying mined rock to a mill.

Figure 4:
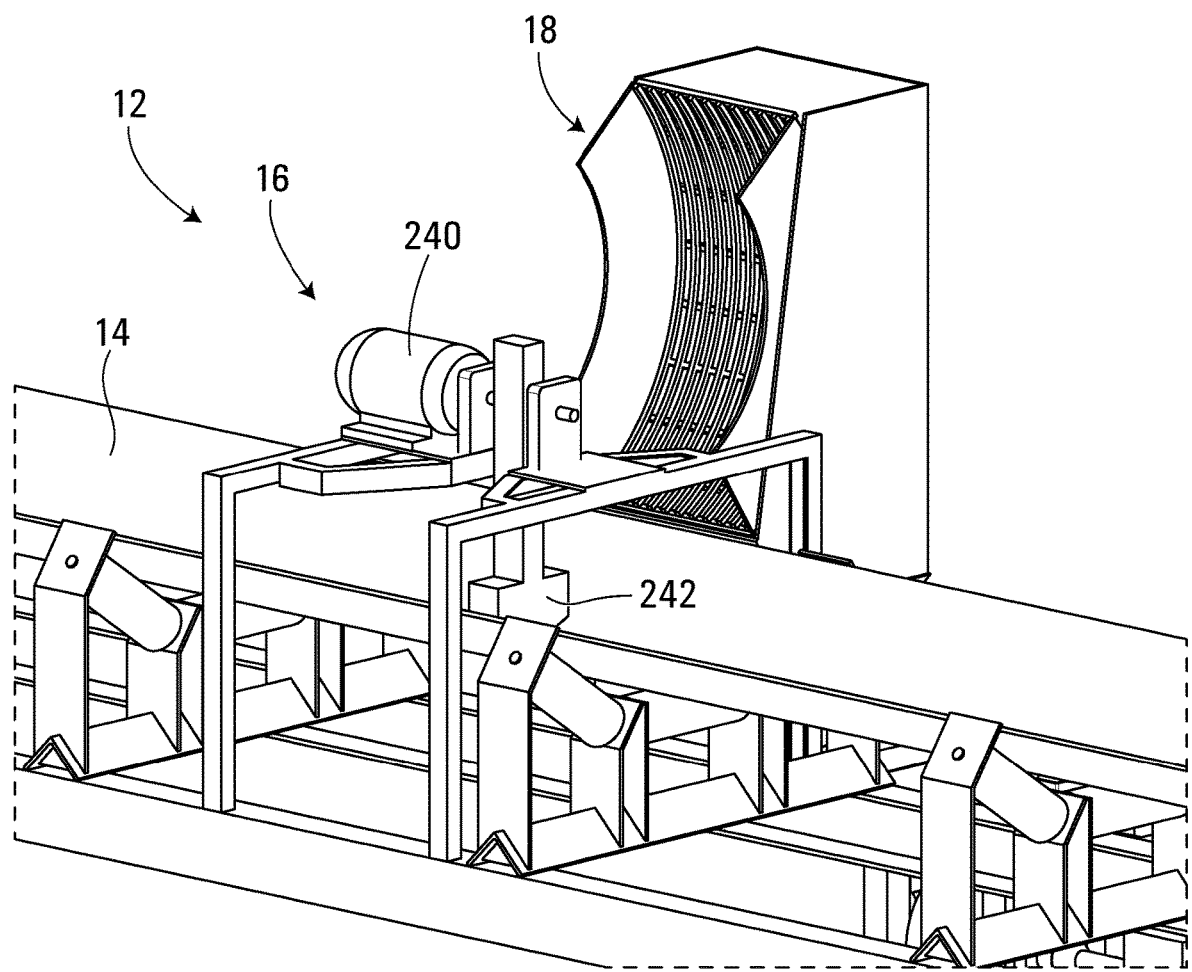
FIG. 4 is a perspective view of a portion of the system shown in FIG. 1, according to various embodiments.

The rock sample source 12 may be configured to cause the removed or sampled portion of the mined rock to pass through the screen or size classifier 18, which may be configured to screen the removed portion for rock samples that are less than a threshold size. Referring to FIG. 4, there is shown the sampler 16 and the screen 18 in accordance with various embodiments. In the embodiment shown in FIG. 4, the sampler 16 includes a motor 240 and a hammer 242 which is configured to rotate 360 degrees and direct material onto the screen 18. In operation, the motor 240 may rotate the hammer 242 to engage with or sweep material being conveyed on the conveyor 14 onto the screen 18. In various embodiments, the screen 18 may have openings that are about 32 mm wide such that material that is 32 mm or less in diameter falls through the screen 18 and is provided to the roll crusher 20 shown in FIG. 1. In various embodiments, the screen 18 may be configured such that material that does not fall through the screen 18 falls back onto the conveyor 14. In some embodiments, the rock sample source 12 may include a vibratory unit mounted to the screen 18 for shaking material through the screen 18 and/or back onto the conveyor 14. In some embodiments, the roll crusher 20 and system feeding the roll crusher may need the feed size to be controlled and the screen 18 may facilitate this control. For example, in some embodiments, if excessively large rocks are swept into the roll crusher feeding system, they could block a feed chute, block a conveyor feeding the roll crusher, and/or plug the roll crusher 20. In some embodiments, for example, anything larger than about 40 mm may not be able to go through the roll crusher 20 and may overload a drivetrain of the roll crusher 20 (stopping the roll crusher 20).

Accordingly, referring to FIG. 2, in various embodiments, the rock sample 46 may be provided by the rock sample source 12 to the roll crusher 20, and the roll crusher 20 may begin crushing the rock sample 46.

Referring to FIG. 2, for example, in some embodiments, the rollers 50 and 52 of the roll crusher 20 may have a fixed gap size therebetween, such as, for example, a roller or roll gap size of about 16 mm, and the rollers 50 and 52 may be driven in the direction shown to draw in the rock sample 46 and to crush the rock sample 46. In some embodiments, the roll crusher 20 may operate at about 10 rpm. In various embodiments, the roller gap size may be the shortest distance between crushing surfaces of the rollers 50 and 52, through which the rock sample 46 passes during roll crushing.

During crushing, the sensors 42 and 44 may sense forces applied to the rock sample 46 by the rollers 50 and 52. For example, in some embodiments, the sensors 42 and 44 may be coupled to a drive shaft of the roller 52 such that the sensors 42 and 44 sense lateral or horizontal forces applied by the rock sample 46 to the roller 52 during crushing. In some embodiments, the sensors 42 and 44 may transmit signals representing forces applied during crushing to the measurement device 30.

Figure 5:
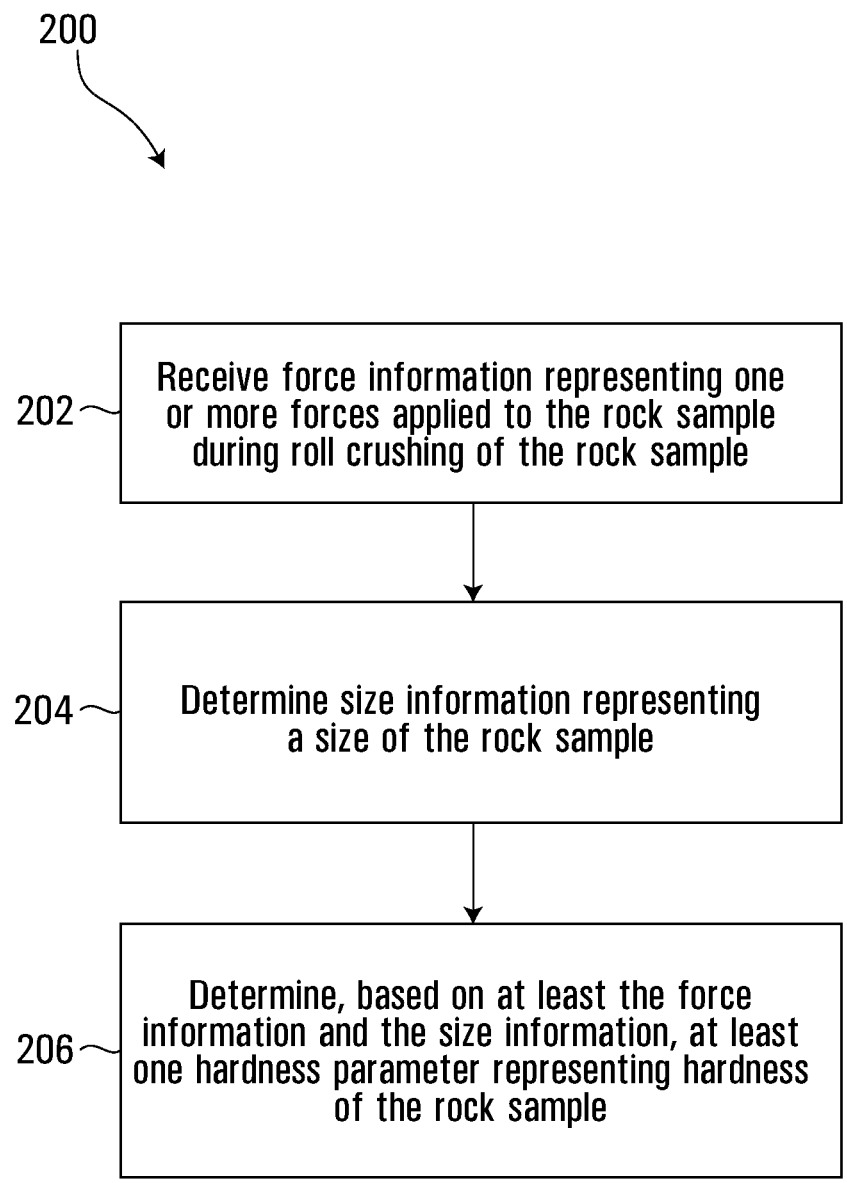
FIG. 5 is a flowchart depicting blocks of code for directing the measurement device shown in FIG. 3 to perform hardness measurement functions, in accordance with various embodiments.

Referring now to FIG. 5, a flowchart depicting blocks of code for directing the processor 100 shown in FIG. 3 to perform hardness measurement functions in accordance with various embodiments is shown generally at 200. The blocks of code included in the flowchart 200 may be encoded in the block of codes 170 of the program memory 102 shown in FIG. 3, for example.

Referring to FIG. 5, the flowchart 200 begins with block 202 which directs the processor 100 shown in FIG. 3 to receive force information representing one or more forces applied to the rock sample 46 during roll crushing of the rock sample 46 by the rollers 50 and 52. In some embodiments, block 202 may direct the processor 100 to receive from the sensors 42 and 44 shown in FIG. 2 via the interface 120 of the I/O interface 112 shown in FIG. 3, signals representing the one or more forces applied to the rock sample 46 during roll crushing of the rock sample.

In some embodiments, for example, the signals may include analog voltage signals and block 202 may direct the processor 100 to convert the analog voltage signals into a plurality of digital values, each representing a total force sensed and each associated with a time at which the force was sensed. In some embodiments, the forces may be associated with sampling times or times that are spaced apart by about 1 ms, for example. In some embodiments, the forces may be associated with sampling times or times that are spaced apart by less than about 1 ms.

In some embodiments, a short time-step of less than about 1 ms may be required by force sensor data acquisition systems to capture force events that adequately describe the hardness of the rock sample being processed. In some embodiments, a short time-step of less than about 0.2 ms may better capture force events to more accurately determine the hardness of the rock sample being processed.

In some embodiments, the force sensors 42 and 44 may provide a mV output which may be amplified by a signal amplifier to V or 4-20 mA output, which may be converted to a digital value via a data acquisition unit, for example. In some embodiments, the signal amplifier and data acquisition unit may be included in the measurement device 30. In some embodiments, block 202 may direct the processor 100 to sum all forces sensed for a given time to determine a total force sensed for each time.

Figure 6:
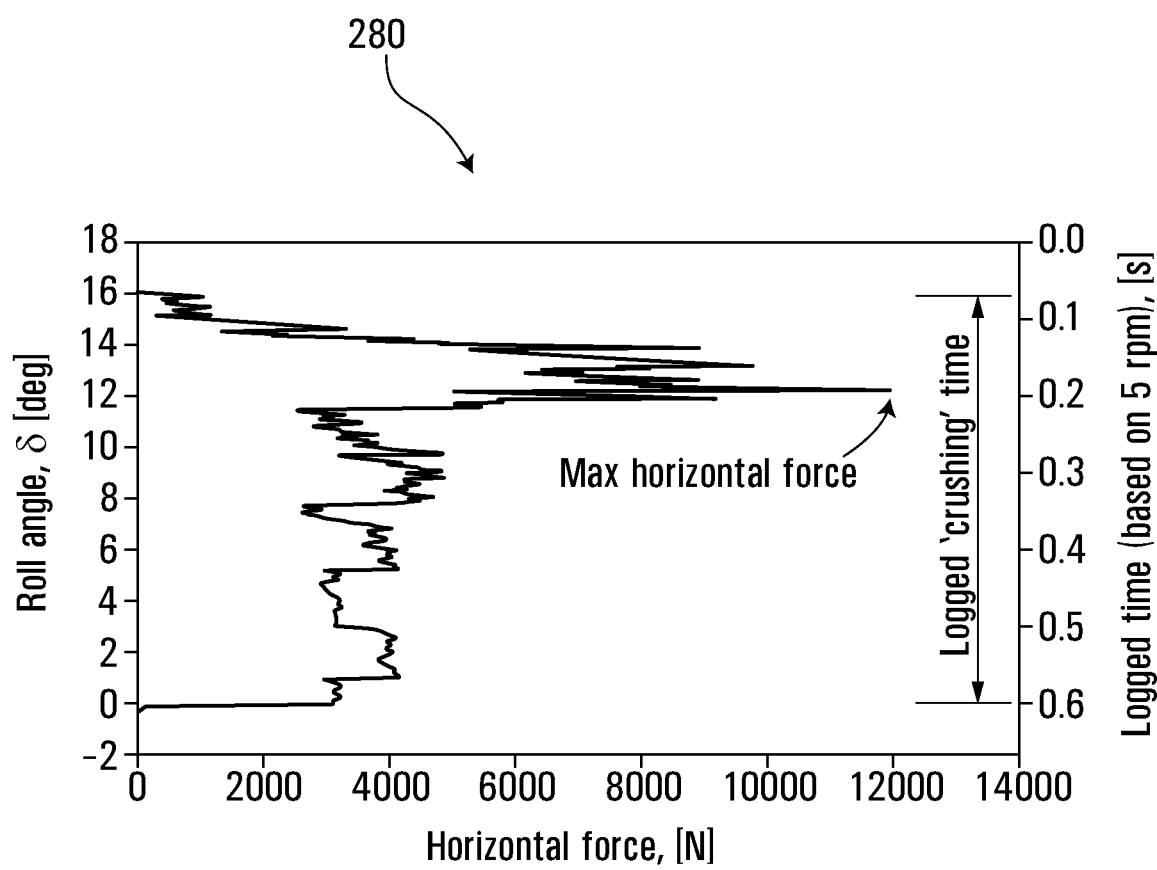
FIG. 6 is a chart representing exemplary force information that may be used in the system shown in FIG. 1 in accordance with various embodiments.

Block 202 may direct the processor 100 to store the forces and associated times in the location 140 of the storage memory 104. For example, in some embodiments, the forces and associated times stored in the location 140 of the storage memory 104 may represent forces and times as shown in the chart 280 shown in FIG. 6. In the chart shown in FIG. 6, roll angles, which may be represented herein with the symbol δ or α, which represent angular position of the rock relative to the rollers, are shown for reference. The roll angles may be derived based on the times associated with each force value. In various embodiments, an angle of 0 in the chart 280 may indicate that the rock is at a location where the roller gap is smallest (e.g. 3 PM or 9 PM on a clock).

Referring back to FIG. 5, block 204 then directs the processor 100 to determine size information representing a size of the rock sample 46. In some embodiments, block 204 may direct the processor 100 to determine, based on at least the force information received at block 202, a processing time during which the one or more forces were applied to the rock sample 46 during the roll crushing of the rock sample, the processing time representative of the size of the rock sample 46. For example, in some embodiments, if the rock sample 46 has been processed for a long time period, this may indicate that the rock sample 46 is large or has a large thickness 47 as shown in FIG. 2.

For example, if the rock sample 46 has a large thickness 47, the rock sample may engage with the rollers 50 and 52 shown in FIG. 3 when a center of mass for the rock sample is at a higher position above the rollers 50 and 52 than if the rock sample 46 has a smaller thickness 47.

Referring to FIG. 5, in some embodiments, block 204 may direct the processor 100 to determine the processing time as a time period during which the one or more forces applied to the rock sample 46 remained above a threshold force. In some embodiments, the threshold force may have been previously set as equal to the minimum measuring force of sensors 42 and 44. In some embodiments, the threshold force may have been set to avoid being triggered when the roll crusher is spinning empty (e.g. background noise). In some embodiments, for the roll crusher 20, the threshold force may be about 0.1 kN, for example.

In various embodiments, block 204 may direct the processor 100 to store a representation of the processing time in the location 142 of the storage memory 104 shown in FIG. 3. For example, in some embodiments, block 204 may direct the processor 100 to determine that the time period during which the forces represented by the force information stored in the location 140 of the storage memory 104 are greater than the threshold force of 0.1 kN is 0.52 seconds. In some embodiments, block 204 may direct the processor 100 to store the processing time of 0.52 seconds in the location 142 of the storage memory 104.

In some embodiments, block 204 may direct the processor 100 to determine a size parameter representing a size of the rock sample from the determined processing time. Block 204 may direct the processor 100 to determine the processing time as described above and to determine an estimate of rock sample feed size or diameter by approximating the rock sample 46 as a sphere and using the known geometry of the roll crusher to determine a diameter of the rock sample. For example, in some embodiments, the following formula may be used to determine the diameter (i.e., 2 times the radius, r) of the rock sample 46:

$$\text{Rock sample diameter} = 2 \cdot r = 2 \cdot \left( \frac{\left(R + \frac{s}{2}\right)}{\cos\left(6 \cdot t \cdot \text{rpm} \cdot \frac{\prod}{180}\right)} - R \right)$$

where R=roller radius (mm), t=processing time (s), s=roller gap setting (mm), and rpm=rotational speed of rollers (rpm). In some embodiments, the roller radius may be about 200 mm, the roller gap setting may be set to 16 mm, and the rotational speed of the rollers may be set to about 5 rpm, for example.

In some embodiments, the sensors 42 and 44 may be configured to only record load values when a sensor threshold value has been exceeded. Accordingly, in some embodiments initial crushing may occur at horizontal loads that are below the sensor threshold value for the sensors 42 and 44. To account for this, in some embodiments, the following equation may be used to determine rock sample diameter in mm:

$$\text{Rock sample diameter} = 2 \cdot \left( \frac{\left(R + \frac{s}{2}\right)}{\cos\left(6 \cdot t \cdot \text{rpm} \cdot \frac{\prod}{180} + c\right)} - R \right)$$

Which may be simplified to:

$$\text{Rock sample diameter} = \frac{D + s}{\cos\left(6 \cdot t \cdot \text{rpm} \cdot \frac{\prod}{180} + c\right)} - D$$

Where D is diameter of the rollers and c is a correction angle (in radians) which represents the roll angle where crushing takes place at loads that are below the load measurement threshold. In various embodiments, c may be related to the dynamic coefficient of friction (between the rock sample and roller material), roll speed and the static coefficient of friction. In some embodiments, c may have been previously determined during a calibration exercise. For example, in some embodiments, rock samples of a known size may have been fed to the roll crusher and a suitable value of c may be determined such that the estimated rock sample diameter (from the equation) is similar to the known size. In some embodiments, c may be 0.5 degrees (or Π/360 radians), for example.

Referring to FIG. 5, block 204 may direct the processor 100 to store the determined size information in the location 144 of the storage memory 104. For example, in some embodiments, the processor 100 may determine that the rock sample 46 has a diameter of 33.0 mm and so block 204 may direct the processor 100 to store a representation of the determined size of 33.0 mm in the location 144 of the storage memory 104.

Referring to FIG. 5, block 206 then directs the processor 100 to determine, based on at least the force information and the size information, at least one hardness parameter representing hardness of the rock sample 46. In some embodiments, block 206 may direct the processor 100 to determine a maximum force of the one or more forces and to determine the at least one hardness parameter based on the maximum force as measured by the force sensors 42 and 44. In some embodiments, the maximum force may represent a maximum total force measured by the force sensors 42 and 44 and may be measured just prior to a critical breakage event occurring for the sample being processed and so the maximum force may represent the resistance of the sample to compression breakage, which may be considered a suitable indicator of sample hardness.

In some embodiments, block 206 may direct the processor 100 to read the force information stored in the location 140 of the storage memory 104 to determine a maximum force during the processing time. In some embodiments, the processor 100 may determine that the maximum force of the forces stored in the location 140 of the storage memory 104 is 12,000 N and block 206 may direct the processor 100 to store a representation of the maximum force in the location 146 of the storage memory 104 shown in FIG. 3.

Referring to FIG. 5, block 206 may direct the processor 100 to use the determined maximum force to determine a rock hardness of the rock sample 46. For example, in some embodiments, block 206 may direct the processor 100 to use a process similar to that set out by the American Society for Testing and Materials (ASTM) guidelines for determination of the Point Load Strength Index of Rock. In some embodiments, block 206 may direct the processor 100 to apply the following formula to determine hardness:

$$\text{Rock Hardness } (MPa) = \left(\frac{x}{f}\right)^m \cdot \frac{F}{x^2}$$

Where x is the rock sample diameter determined at block 204 and stored at the location 144 of the storage memory 104, F is the determined maximum force determined at block 206 and stored at the location 146 of the storage memory 104, f is a reference feed size (e.g., 20 mm) and m is a material parameter. In various embodiments, an example value for m may be about 0.45.

Accordingly, in various embodiments, the hardness parameter may include a ratio of force to approximate diameter of the rock sample squared. In various embodiments, alternative or additional hardness parameters may be determined at block 206 of the flowchart 200. In various embodiments, block 206 may direct the processor 100 to determine a milling parameter, generally as described in further detail below, for example, and the milling parameter may act as a hardness parameter.

Figure 7:
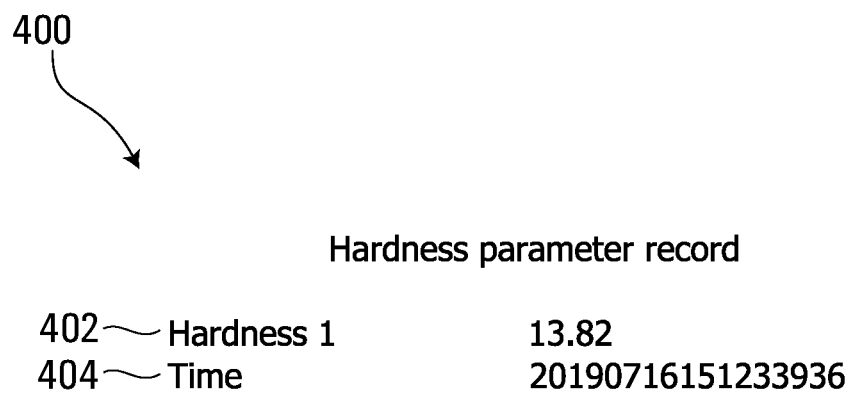
FIG. 7 is a representation of an exemplary hardness parameter record that may be used in the system shown in FIG. 1 in accordance with various embodiments.

In some embodiments, block 206 may direct the processor 100 to store the hardness determined at block 206 as a hardness parameter in the location 148 of the storage memory 104. In some embodiments, for example, block 206 may direct the processor 100 to store the hardness parameter in a hardness parameter record 400 as shown in FIG. 7. The hardness parameter record 400 includes a first hardness parameter field 402 for storing a hardness of a first rock sample, for example, for storing a value representing 13.82 MPa, and an associated first time field 404 for storing a time at which the first rock sample was measured or crushed. In some embodiments the time stored in the first time field 404 may represent time accurate up to 1 ms in the format Year-Month-Day-Hour-Minute-Second-Millisecond, for example. In some embodiments, higher or lower resolutions of time may be used. In some embodiments, the time stored in the time field 404 may act as a rock sample identifier. In various embodiments, block 206 may direct the processor 100 to set the first hardness parameter field 402 to the hardness parameter determined at block 206.

Block 206 may direct the processor 100 to determine a time to be associated with the determined hardness parameter based on the force information stored at the location 140 of the storage memory 104. In some embodiments, block 206 may direct the processor 100 to determine the time as the starting time at which the force applied to the rock sample 46 was first greater than the threshold force. In various embodiments, block 206 may direct the processor 100 to store the determined time as a global time representing the year, month, day, and time, in the first time field 404 of the hardness parameter record 400, in association with the first hardness parameter field 402.

Figure 8:
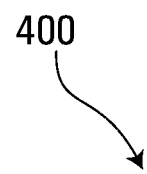
FIG. 8 is a representation of an exemplary hardness parameter record that may be used in the system shown in FIG. 1 in accordance with various embodiments.

In various embodiments, the flowchart 200 shown in FIG. 5 may be repeatedly and/or continuously executed for a plurality of rock samples such that a plurality of hardness parameters and associated times are determined and stored in the hardness parameter record 400 in the location 148 of the storage memory 104, as shown in the updated hardness parameter record 400 shown in FIG. 8, which, for exemplary purposes, includes 30 of the most recently recorded hardness parameters, each associated with a time at which an associated rock sample was crushed and hardness was measured.

In some embodiments, the block of codes 170 of the program memory 102 shown in FIG. 3 may include blocks of code for directing the processor 100 to cause a representation of the at least one hardness parameter to be output and/or displayed. In some embodiments, the blocks of code may direct the processor 100 to cause a representation of the determined hardness parameters for a plurality of rock samples to be output and/or displayed. For example, referring to FIG. 9, there is shown a flowchart 440 depicting blocks of code that may be included in the block of codes 170 in accordance with various embodiments. In various embodiments, the flowchart 440 may be repeatedly executed, such as, for example, each time that the block 206 is completed.

In various embodiments, the flowchart 440 may include block 442 which directs the processor 100 to determine an average hardness for a set of determined hardness parameters representing hardnesses of a set of rock samples. In some embodiments, block 442 may direct the processor 100 to determine an average hardness parameter based on a plurality of the hardness parameters stored in the location 148 of the storage memory 104. For example, in some embodiments, block 442 may direct the processor 100 to determine the average hardness parameter for a number of the most recently determined hardness parameters, such as for example the most recent hardness parameters for the last minute and to store the determined average hardness in the location 150 of the storage memory 104.

In various embodiments, the determined average hardness parameter may be useful for determining how to configure a mineral processing system that is processing rocks from the conveyor 14. For example, in some embodiments, an operator of processing (or milling) operations using the rocks from the conveyor 14 may use the determined average hardness parameter to determine how to configure their processing system. In some embodiments, determining the average hardness may reduce issues that may arise from anomalies in any particular one of the rock samples.

In some embodiments, block 442 may direct the processor 100 to determine additional or alternative statistical descriptors or metrics based on the hardness parameters stored in the location 148 of the storage memory 104. For example, in some embodiments, block 442 may direct the processor 100 to determine, for the most recent hardness parameters in the last minute, a median, a distribution skew, a maximum, a minimum, a range, and/or a hardness parameter for a top percentile (such as, a 90th percentile, for example) of the hardness parameters, for example. In some embodiments, block 442 may direct the processor 100 to store the determined statistical descriptor(s) in the storage memory 104.

In various embodiments, the performance of milling technologies including, for example, Autogenous Mills (AG) and Semi-Autogenous Mills (SAG) may be sensitive to the quantity of hard material that is present in mill feed. Since material may need to be ground to a certain size before being able to leave the mill, AG or SAG mills may overload when significant quantities of hard material are present in mill feed (due to mill feed rates being greater than mill discharge rates). For at least this reason, the output of an online hardness measurement device including statistical descriptors for mill feed hardness (in addition to the average, for example) may help to facilitate improved mill performance. For example, in some embodiments, the $90^{th}$ percentile of the hardness of rocks that were processed during a minute of operation may indicate to an operator whether hard material is present within the mill feed and a decision may need to be made to ensure that mill performance is satisfactory. In some embodiments, depending on the displayed output for the $90^{th}$ percentile, the operator may decide to decrease the mill feed rate, speed up the mill or to turn on a pebble crusher to crush the coarser components and reduce the mill circulating load.

In some embodiments, block 442 may direct the processor 100 to store the average hardness parameter in association with a time at which the average hardness was determined. For example, in some embodiments, block 442 may direct the processor 100 to store the average hardness parameter in association with the most recent time included in the hardness parameter record 400. In various embodiments, this may allow a historical record of the average hardness parameter to be kept. In some embodiments, any or all of the statistical descriptors determined at block 442 may similarly be stored in association with the most recent time included in the hardness parameter record 400.

In some embodiments, the flowchart 440 also includes block 444, which directs the processor 100 to determine a milling parameter. In some embodiments, the milling parameter may act as an additional or alternative hardness parameter compared to the hardness parameter determined at block 206. In some embodiments, block 444 may direct the processor 100 to determine the milling parameter based on the average hardness parameter determined at block 442. For example, block 444 may direct the processor 100 to convert the average hardness parameter to an industry standard milling parameter such as a Drop Weight Index or a Bond Crushing Work Index. In some embodiments, block 444 may direct the processor 100 to convert the average hardness parameter to the milling parameter using a regression fit from parameters previously defined from previously executed experimental results. For example, in some embodiments, the Drop Weight Index may be determined or estimated using the following equation, which may have been previously determined using a regression fit based on experimental results:

$$y=0.62h^{0.82}$$

Where y is the Drop Weight Index and h is the hardness parameter and the regression was fit with an $R^2$ of 0.79 using a roller gap of 16 mm and an m value of 0.45 and a reference feed size f value of 20 mm, for example.

Block 444 may direct the processor 100 to store the determined milling parameter in the location 152 of the storage memory 104. In various embodiments, the milling parameter of the measured material may be comparable to the milling performance of the actual plant (mill). The units of the milling parameter may be in $kWh/m^3$ (kWh of energy per volume of rock) and may be compared to the kWh of the mill motors per volume of mill feed (or per tonne of mill feed by assuming a rock density). In various embodiments, the milling parameter may be used in any or all of the following ways, for example:

Display milling parameter data to operators or integrate with a control system to make changes to mill operation (mill speed, mill water addition, mill feed rate etc.) to suit the type of incoming material Gauge the difference in plant performance after making equipment changes. E.g. a new type of mill liner may have been installed and operated for three months. To assess the benefits of the new mill liner type, historical 'milling parameter' and 'mill data (kWh/t)' can be reviewed. With the milling parameter available, the change in mill performance (due to mill liner change) may be assessed while taking into account the differences in the hardness of rock being processed during the before/after operating periods. E.g. without the milling parameter, it may not be clear if changes in milling performance were due to the equipment change or the type of material being processed When a mine is being proposed for a mineral deposit, milling parameters, such as the Drop Weight Index, may be determined using tests carried out on exploratory drill core. After the mine has been approved, designed and built, the milling parameter that is being output by an online hardness measuring system (for example, the system shown in FIG. 1) may be used to determine how well the plant is performing in comparison to expected results from drill core testing. This may aid in reviewing the suitability of plant design.

In some embodiments, block 444 may direct the processor 100 to store the milling parameter in association with a time at which the milling parameter was determined. For example, in some embodiments, block 444 may direct the processor 100 to store the milling parameter in association with the time associated with the average hardness parameter from which the milling parameter was derived.

Figure 9:
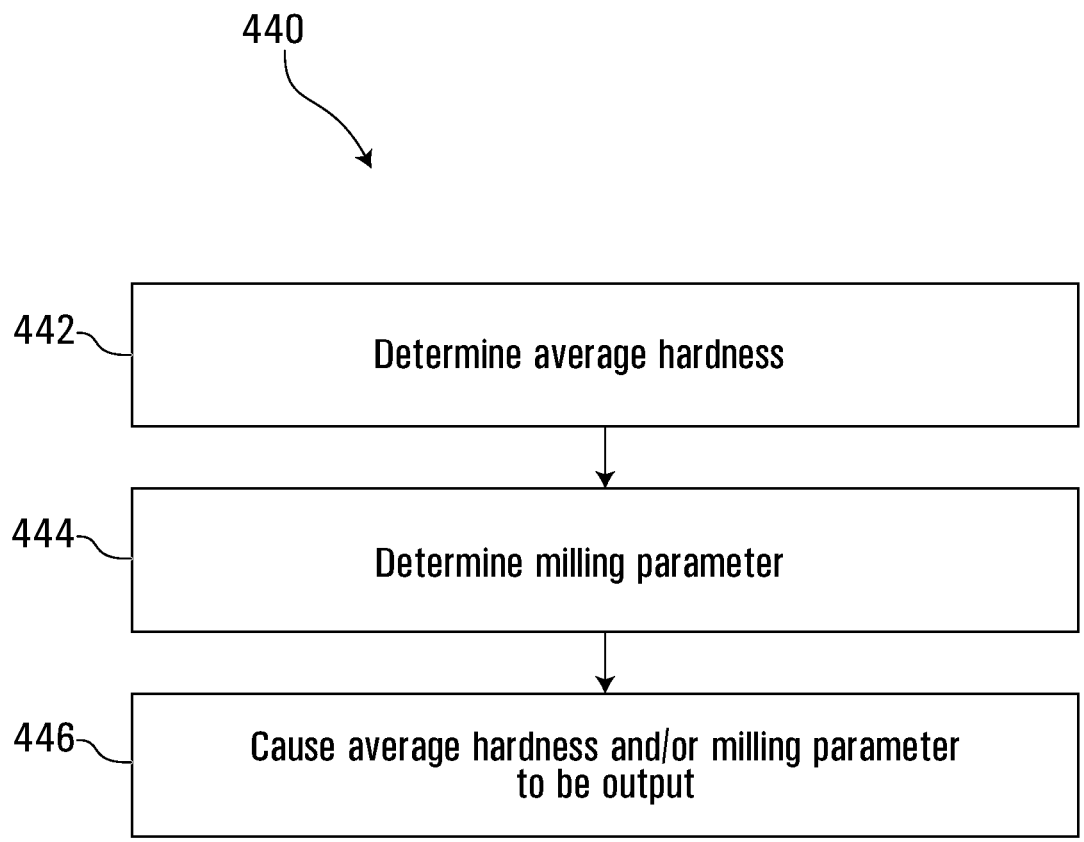
FIG. 9 is a flowchart depicting blocks of code that may be included in the flowchart shown in FIG. 5, in accordance with various embodiments.

Referring to FIG. 9, in various embodiments, the flowchart 440 may include block 446 for directing the processor 100 to cause the average hardness and/or the milling parameter to be output or displayed. For example, in some embodiments, a user may wish to view the average hardness parameter and/or the milling parameter determined at blocks 442 and 444 of the flowchart 440, since these values may be helpful in determining how to configure processing of the rock from which rock samples were taken for hardness measurement. Accordingly, in various embodiments, block 446 may direct the processor 100 to cause the average hardness and the milling parameter to be displayed.

For example, in some embodiments, the measurement device 30 may include the display 180 shown in FIG. 3 and block 446 may direct the processor 100 to transmit signals representing the average hardness parameter stored in the location 150 of the storage memory 104 and the milling parameter stored in the location 152 of the storage memory 104 to the display 180 for causing a representation of the average hardness parameter and the milling parameter to be displayed by the display 180 to a user.

Figure 10:
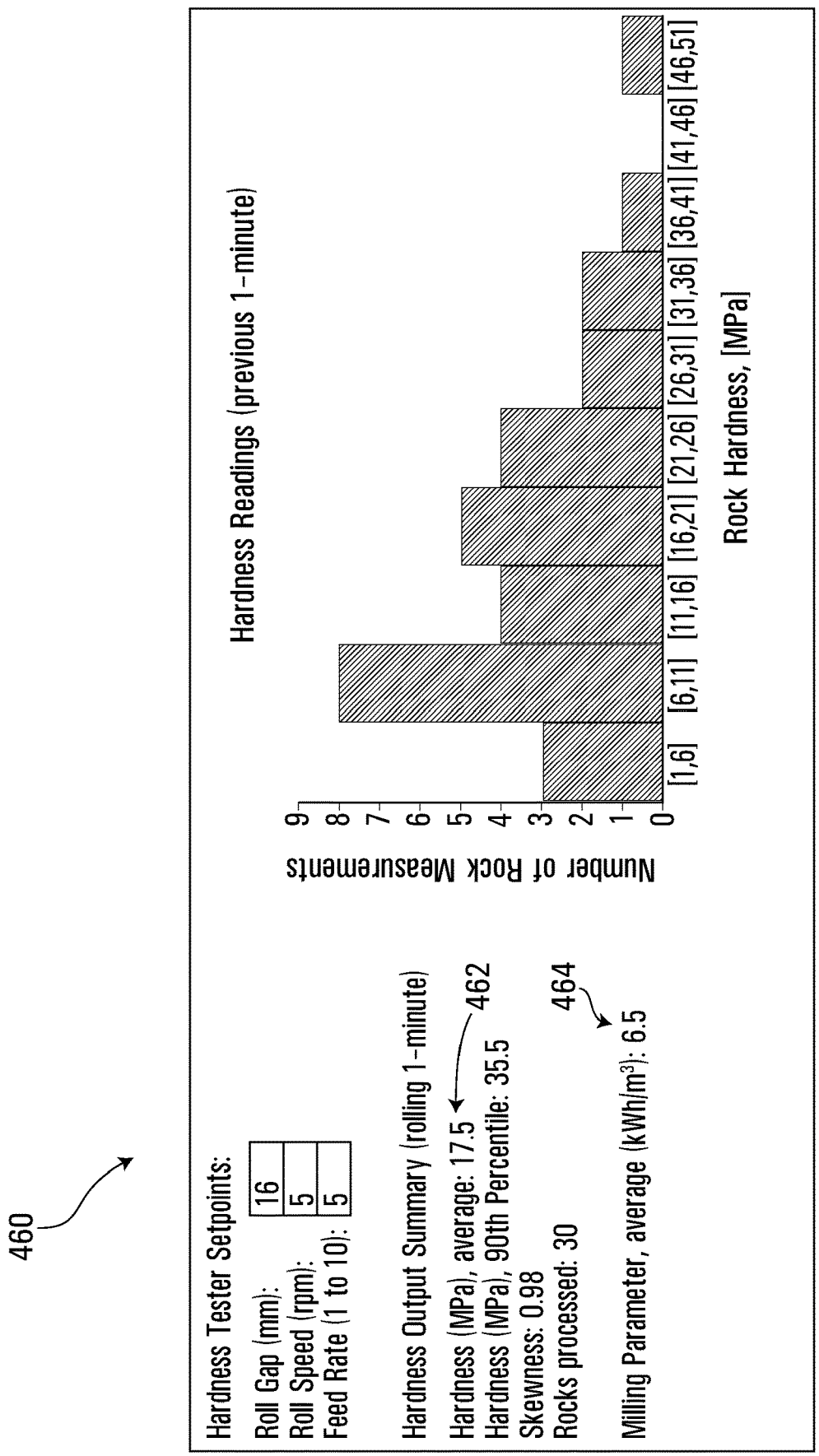
FIG. 10 is a representation of an exemplary display that may be provided in the system shown in FIG. 1 in accordance with various embodiments.

Referring to FIG. 10, there is shown an exemplary display 460 that may be provided, in accordance with various embodiments. The display 460 includes a representation of the average hardness parameter 462 and a representation of the milling parameter 464. In various embodiments, block 446 may direct the processor 100 to produce signals for causing other statistical descriptors determined at block 442 to be displayed by the display 180, as shown in the display 460, for example.

In some embodiments, the flowchart 440 may be executed repeatedly and blocks 442 and 444 may direct the processor 100 to store a plurality of average hardness parameters and/or other statistical descriptors, and a plurality of milling parameters in the locations 150 and 152 of the storage memory 104, each associated with a respective time. In various embodiments, block 446 may direct the processor 100 to output the historical hardness parameters, statistical descriptors, and/or milling parameters along with the associated times from the location 150 and 152 of the storage memory 104. For example, in some embodiments, this information may be output to another device and/or a display to allow changes in the various parameters over time to be monitored.

As described above, by making this data available, operators may be able to monitor plant performance with respect to the type of feed that was being processed (e.g. softer material should yield higher plant throughputs and/or finer product sizes). In some embodiments, changes may be made (automatically by a control system and/or by operators) to suit the type of material being processed. Furthermore, the benefits of AI algorithms for process control are increasingly being recognized and in some embodiments, the measurement device 30 may provide a significant input (material hardness) to AI-based control systems. In some embodiments, for example, block 446 may direct the processor 100 to cause the determined average hardness parameters and milling parameter to be transmitted and/or provided to a machine learning system, such as a system configured to train a neural network. In some embodiments, additional or alternative raw or partially processed information may be displayed and/or provided to a machine learning system, such as, for example, the hardness parameter record 400 shown in FIG. 8 and/or the force information stored in the location 140 of the storage memory 104.

Core Hardness Measurement

In some embodiments, the measurement device 30 described above or a device generally similar to the measurement device 30 may be configured to measure the hardness of rock core samples from drill core. In such embodiments, the measurement device 30 may be used at laboratories or on exploration sites, for example. In some embodiments, it may be important to keep track of locations from which rock samples were extracted and associated hardness parameters of the extracted rocks and so in various embodiments, the measurement device 30 may be configured to associate each hardness parameter with at least one location from which the rock sample that is associated with the hardness parameter was extracted.

Figure 11:
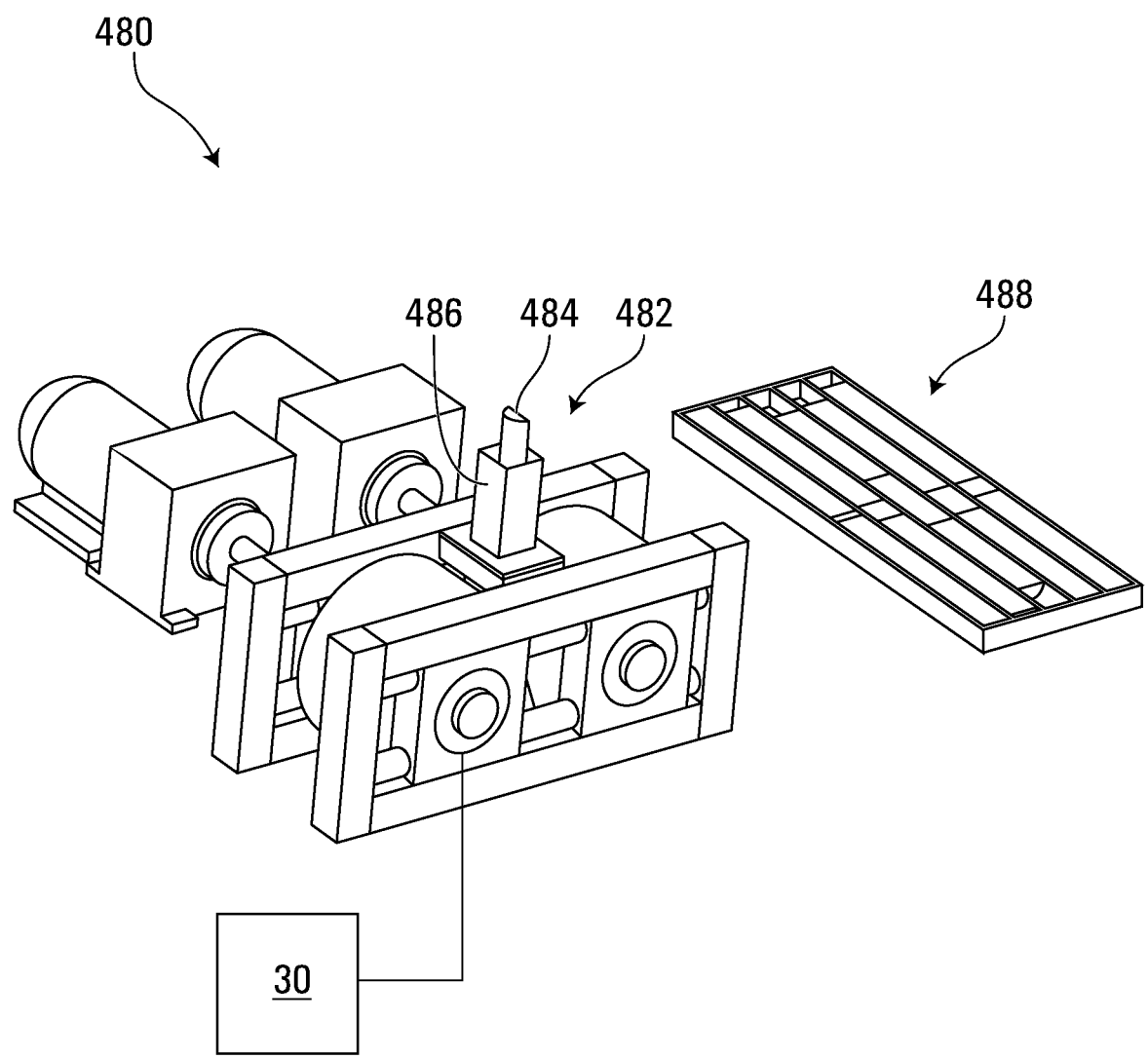
FIG. 11 is a schematic view of a system for facilitating hardness measurement in a rock sample from drill core, according to various embodiments.

In some embodiments, there may be provided a system 480 as shown in FIG. 11 for facilitating hardness measurement in a rock sample from drill core, which may include the measurement device 30 and a roll crusher 482 generally similar to the roll crusher 20 shown in FIG. 1, the roll crusher 482 configured to receive a rock sample, such as a rock core sample or drill core 484. In various embodiments, the roll crusher 482 may include a feed collar 486 for receiving the drill core with the core-axis oriented perpendicular to the axis of the rollers. In various embodiments, the drill core 484 may be taken from a set of rock drill cores 488, which were extracted from a site together, but which may have broken apart during extraction and/or examination.

In such embodiments, sensors generally similar to the sensors 42 and 44 may be included in the system 480 and may function generally as described above and may provide force information to the measurement device 30.

Figure 12:
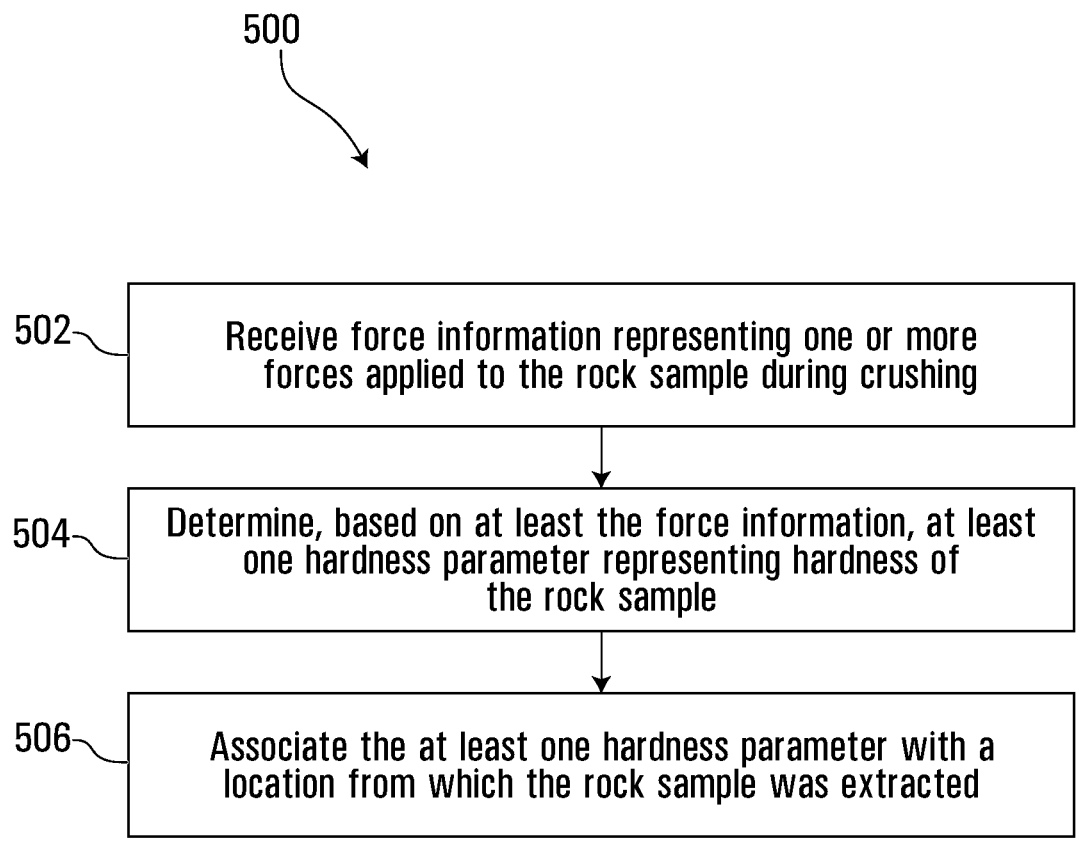
FIG. 12 is a flowchart depicting blocks of code for directing the measurement device shown in FIG. 3 to perform hardness measurement functions, in accordance with various embodiments.

In various embodiments, the block of codes 170 of the program memory 102 of the measurement device 30 may have stored thereon blocks of code depicted in flowchart 500 shown in FIG. 12, for directing the processor 100 to facilitate hardness measurement of a rock sample from a drill core.

Referring to FIG. 12, the flowchart 500 begins with block 502 which directs the processor 100 to receive force information representing one or more forces applied to the rock sample during roll crushing of the rock sample by at least one roller. In some embodiments, block 502 may be generally similar to block 202 of the flowchart 200 shown in FIG. 5 and described above, such that after execution of block 502, a plurality of forces and associated times are stored in the location 140 of the storage memory 104. In various embodiments, a user may provide the rock sample from the set of drill cores 488 to the feed collar 486 for crushing.

Block 504 may then direct the processor 100 to determine, based on at least the force information, one or more hardness parameters representing hardness of the rock sample. In some embodiments, block 504 may include code for directing the processor to determine size information and then to determine the one or more hardness parameters generally as described above having regard to blocks 204 and 206 of the flowchart 200 shown in FIG. 5. However, in some embodiments, block 504 may direct the processor 100 to determine the one or more hardness parameters without determining size information as described above. For example, in some embodiments, because the rock sample may be a solid rock core sample (which may be called drill core), a diameter of the core sample may already be known and so determining rock sample size may not be necessary to determine hardness.

Accordingly, in various embodiments, block 504 may direct the processor 100 to apply the following formula to determine a hardness parameter for the rock sample:

$$\text{Rock Hardness } (MPa) = \left(\frac{D_{core}}{f}\right)^m \cdot \left(\frac{F}{D_{core}^2}\right) \cdot CF$$

Where $D_{core}$ is the diameter of the drill core, F is the maximum sensed force, f is the reference feed size (e.g., 20 mm), m is a material parameter and CF is a correction factor that is applied according to the shape of the core e.g. cylindrical core, half-core or quarter core. In various embodiments, values for $D_{core}$, f, m, and CF may have been previously provided by a user with knowledge of the drill core from which the sample is taken. For example, in some embodiments, $D_{core}$=47.6 mm, f=20 mm, m=0.45, CF=0.5. In some embodiments, the maximum sensed force may be F=10,000 N.

Figure 13:
FIG. 13 is a representation of an exemplary hardness parameter record that may be used in the system shown in FIG. 11 in accordance with various embodiments.

In various embodiments, block 504 may direct the processor 100 to store the determined rock hardness in a hardness parameter record 520 as shown in FIG. 13, for example. The hardness parameter record 520 may include a hardness parameter field 522 for storing a hardness parameter, such as, for example, for storing a value representing 3.26 MPa, and an associated time field 524. Block 206 may direct the processor 100 to determine the time to be associated with the determined hardness parameter based on the force information stored at the location 140 of the storage memory 104, generally as described above. In some embodiments, block 504 may direct the processor 100 to determine and store an additional or alternative hardness parameter, such as, for example, a milling parameter, such as a Drop Weight Index, generally as described above.

Block 506 then directs the processor 100 to associate the at least one hardness parameter with at least one location from which the rock sample was extracted. In some embodiments, a user may have provided the rock sample to the roll crusher and the user may be able to provide location information for association with the rock sample. Accordingly, in various embodiments, block 506 may direct the processor 100 to receive user-defined location information representing at least one user-defined location to be associated with the rock sample and to associate the at least one hardness parameter with the at least one user-defined location.

For example, in some embodiments, the user may interact with the display 180 of the measurement device 30 shown in FIG. 3 and/or a user interface system for receiving user input and block 506 may direct the processor 100 to receive from the display 180 and/or the user interface system, user-defined location information representing at least one user-defined location of the rock sample as provided by the user.

Figure 14:
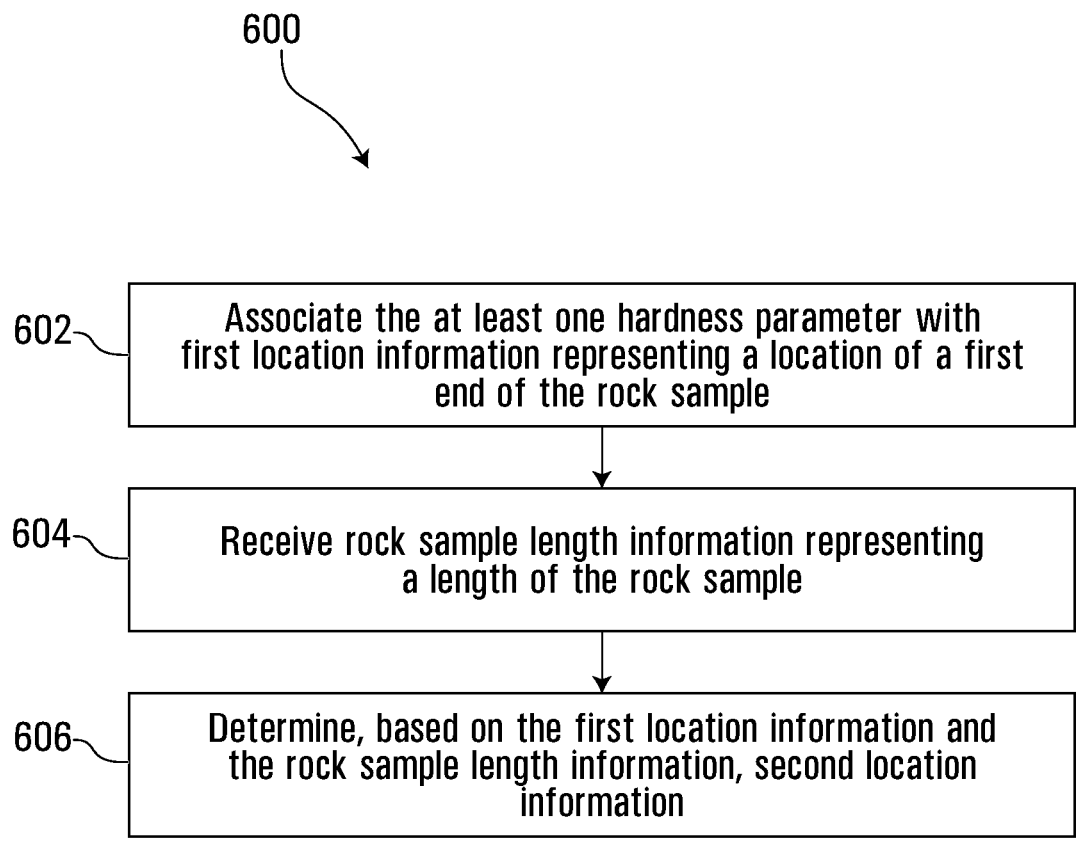
FIG. 14 is a flowchart depicting blocks of code that may be included in the flowchart shown in FIG. 12, in accordance with various embodiments.

Referring to FIG. 14, there is shown a flowchart 600 depicting blocks of code that may be included in the block 506 shown in FIG. 12 in accordance with various embodiments. The flowchart 600 begins with block 602 which directs the processor 100 to associate the at least one hardness parameter with first location information representing a location of a first end of the rock sample. In some embodiments, the first location information may represent the location of the first end of the rock sample before the rock sample was extracted. In some embodiments, the first location information may be user-defined first location information and block 602 may direct the processor 100 to receive the user-defined location first information from a user via a user interface, for example.

In some embodiments, for example, block 602 may direct the processor 100 to produce signals for causing the display 180 to display a user interface having a first location input field to prompt the user to provide first location information representing the location of the first end of the rock sample. For example, the first location information may represent a starting location or depth of the rock sample. In some embodiments, the first location information may include a starting location or depth value, such as, for example, 300 m, and a drill hole identifier for uniquely identifying the drill hole from which the rock sample was extracted.

In various embodiments, block 602 may direct the processor 100 to receive the first location information and to generate and store a hardness parameter location record 540 as shown in FIG. 15, based on the input drill hole identifier and depth value.

The hardness parameter location record 540 includes a hardness parameter field 542 for storing the hardness parameter for the rock sample being considered, a time field 543 for storing the time at which the rock was crushed, a drill hole identifier field 544 for storing an identifier identifying the drill hole for the rock sample, and a location start field 546 for storing a first location or starting location of the rock sample. In various embodiments, block 506 may direct the processor 100 to store the hardness parameter location record 540 in the location 154 of the storage memory 104.

Referring to FIG. 14, in various embodiments, the flowchart 600 may include block 604 which directs the processor 100 to receive rock sample length information representing a length of the rock sample. In some embodiments, the rock sample length information may be user-defined rock sample length information and block 604, which may be executed concurrently with block 602, may direct the processor 100 to produce signals for causing the display 180 to include in the user interface, a rock sample length field to prompt the user to provide rock sample length information representing the length of the rock sample. In some embodiments, the user may physically measure the rock sample with a ruler/tape measure, for example, and may input the rock sample length into the rock sample length field. Block 604 may direct the processor 100 to receive the rock sample length information and store the rock sample length information in storage memory 104.

Figure 16:
FIG. 16 is a representation of an exemplary hardness parameter location record that may be used in the system shown in FIG. 11 in accordance with various embodiments.

Block 606 then directs the processor 100 to determine, based on the first location information and the rock sample length information, second location information representing a location of a second end of the rock sample. In some embodiments, the second location information may represent the location of the second end of the rock sample before the rock sample was extracted. For example, in some embodiments, block 606 may direct the processor 100 to determine the location of the second end of the rock sample by adding the rock sample length to the location of the first end of the rock sample. For example, block 606 may direct the processor 100 to add the rock sample length to the value from the location start field 546 of the hardness parameter location record 540 to determine a second location value, which should represent the location of the second end of the rock sample. In various embodiments, block 606 may direct the processor 100 to update the hardness parameter location record 540 as shown in FIG. 16 to include a second location or location end field 548 storing the determined second location value, to associate the second location information with the hardness stored in the hardness parameter field 542.

In various embodiments, after the rock core sample 484 has been passed through the roll crusher 482, the user may return the rock core sample 484 to a tray including the rest of the set of drill cores 488.

In various embodiments, blocks 502, 504, and 506 may be executed for a plurality of rock samples included in a drill core sample, such that a plurality of hardness parameter location records having a format generally similar to the hardness parameter location record 540 are stored in the location 154 of the storage memory 104. In some embodiments, for any rock sample subsequent to the first rock sample tested from the drill core, block 602 of the flowchart 600 may direct the processor to use the second location value of the last hardness parameter location record generated as the first location value of the subject hardness parameter location record, since it may be assumed that the next rock sample starts where the last rock sample ends.

Accordingly, in various embodiments, hardness of a drill core at various locations in the drill core may be determined. In various embodiments, the flowchart 500 may further include an output block of codes which may be executed after the blocks 502, 504, and 506 have been executed for the entire core sample. In some embodiments, the output block of codes may direct the processor 100 to cause the hardness parameters and associated locations to be output. In some embodiments, the output block may direct the processor 100 to transmit to the display 180 of the measurement device 30, a representation of the hardness parameters and the locations from the hardness parameter location records stored in the location 154 of the storage memory 104, for causing the display 180 to display the hardness parameters and the locations to a user.

In various embodiments, various locations in the drill core may be scanned with hyperspectral cameras, x-ray fluorescence sensors and/or magnetic susceptibility meters prior to testing with the roll crusher 482 shown in FIG. 11 and the measured hardness of the drill core at various locations in the drill core may be compared to the hyperspectral camera responses, x-ray fluorescence sensor outputs and/or measured magnetic susceptibility at the corresponding locations in the drill core. In some embodiments, for example, a device, such as the measurement device 30, for example, may be configured to compare hyperspectral, x-ray fluorescence, magnetic susceptibility and/or other logged information to hardness to relate hardness to rock types that have certain hyperspectral, x-ray fluorescence and/or magnetic susceptibility features. In various embodiments, the device may be configured to identify correlations between hyperspectral, x-ray fluorescence and/or magnetic susceptibility features, and hardness to sufficiently reliably estimate drill core hardness based on the hyperspectral, x-ray fluorescence and/or magnetic susceptibility characteristics. In some embodiments, this may enable hardness determination without requiring traditional or roll crushing hardness testing of certain sections of drill core from the same mineral deposit.

In some embodiments, core hardness information represented by the hardness parameter location records stored in the location 154 may be included in a deposit block model. In various embodiments, the core hardness testing performed by the system 480 as described herein may be cheaper and/or quicker than current industry processes, and so greater proportions of available core may be characterised for the same testing budget.

In various embodiments, the variability of hardness occurring within a deposit from which the drill cores are taken may then be better defined within the deposit block model. In some embodiments, for a case where a mine is being proposed for a deposit, the block model (containing the hardness information represented by the hardness parameter location records stored in the location 154 of the storage memory 104) may be used for mine and mill design purposes. In some embodiments, for each mine production scenario which may be designed in view of the block model, appropriate milling equipment may be sized and nominated to estimate associated capital and operating costs. In some embodiments, for an operating mine, data included in the block model may be used for throughput forecasting, grind size optimization and to support blending strategies.

In various embodiments, the system 480 shown in FIG. 11 may facilitate measurement of hardness parameters along sections of drill core at small interval lengths (e.g., in some embodiments about 5 cm intervals). In various embodiments, hard and soft rocks types may therefore be better identified and used for mine design and operating purposes compared to some current industry practices for hardness testing where composite core samples may be used with samples taken from sections of core spanning a wide overall length and used to generate one milling parameter, such that, only one datapoint may be representative of a large area in the deposit and/or such that the compositing of samples results in the loss of information about variability in hardness.

In some embodiments, when measuring hardness of a core sample that includes a plurality of rock samples, a user may select from two different processes for generating the hardness parameter records depending on the properties of the particular rock sample. In some embodiments, if the rock sample is intact (i.e., the thickness of the rock sample is the same as the thickness of the core sample), the user may cause hardness of the rock sample to be measured using the flowchart 500 show in FIG. 12. Alternatively, if the rock sample is granular or not intact (i.e., the thickness of the rock sample is less than the thickness of the core sample), the user may cause hardness of the rock sample to be measured generally as described with respect to the flowchart 200 shown in FIG. 5 such that a hardness parameter record 400 as shown in FIG. 7 is generated and stored and then a block generally similar to the block 506 of the flowchart 500 shown in FIG. 12 may be executed to generate a hardness parameter location record generally similar to the hardness parameter location record 540 shown in FIG. 16.

Accordingly, in various embodiments, the measurement device 30 may be configured to facilitate hardness measurement and location recordal for drill core samples regardless of whether they are intact or not.

In various embodiments, after rock samples for a drill core have been processed, the user may replace the rock samples back into a sample holder, in order. Accordingly, in various embodiments, the contents and locations of the measured rock samples from the drill core may be retained for future testing or measurement.

Various Embodiments

Figure 17:
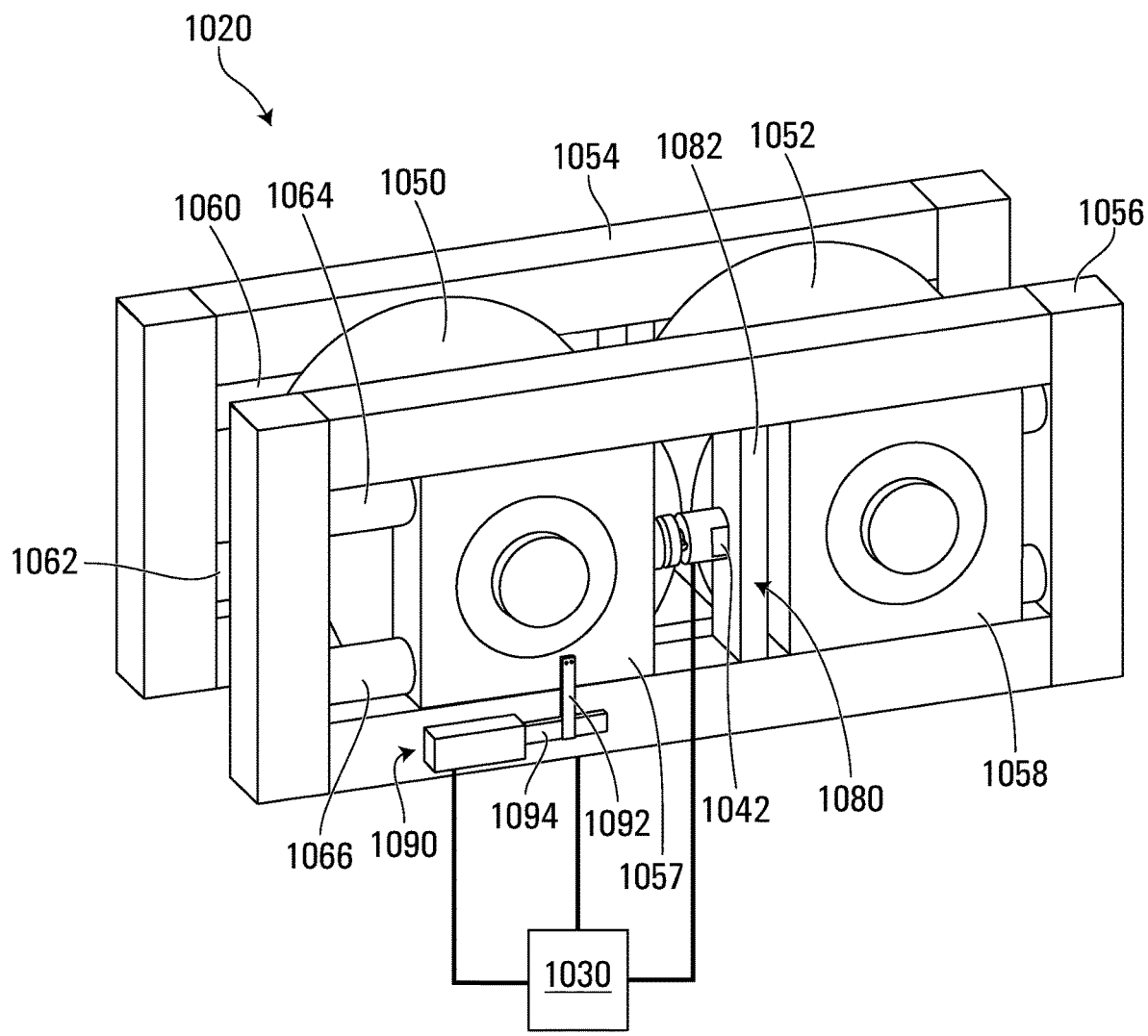
FIG. 17 is a front isometric and schematic view of part of a roll crusher and a measurement device that may be included in the system shown in FIG. 1, in accordance with various embodiments.
Figure 18:
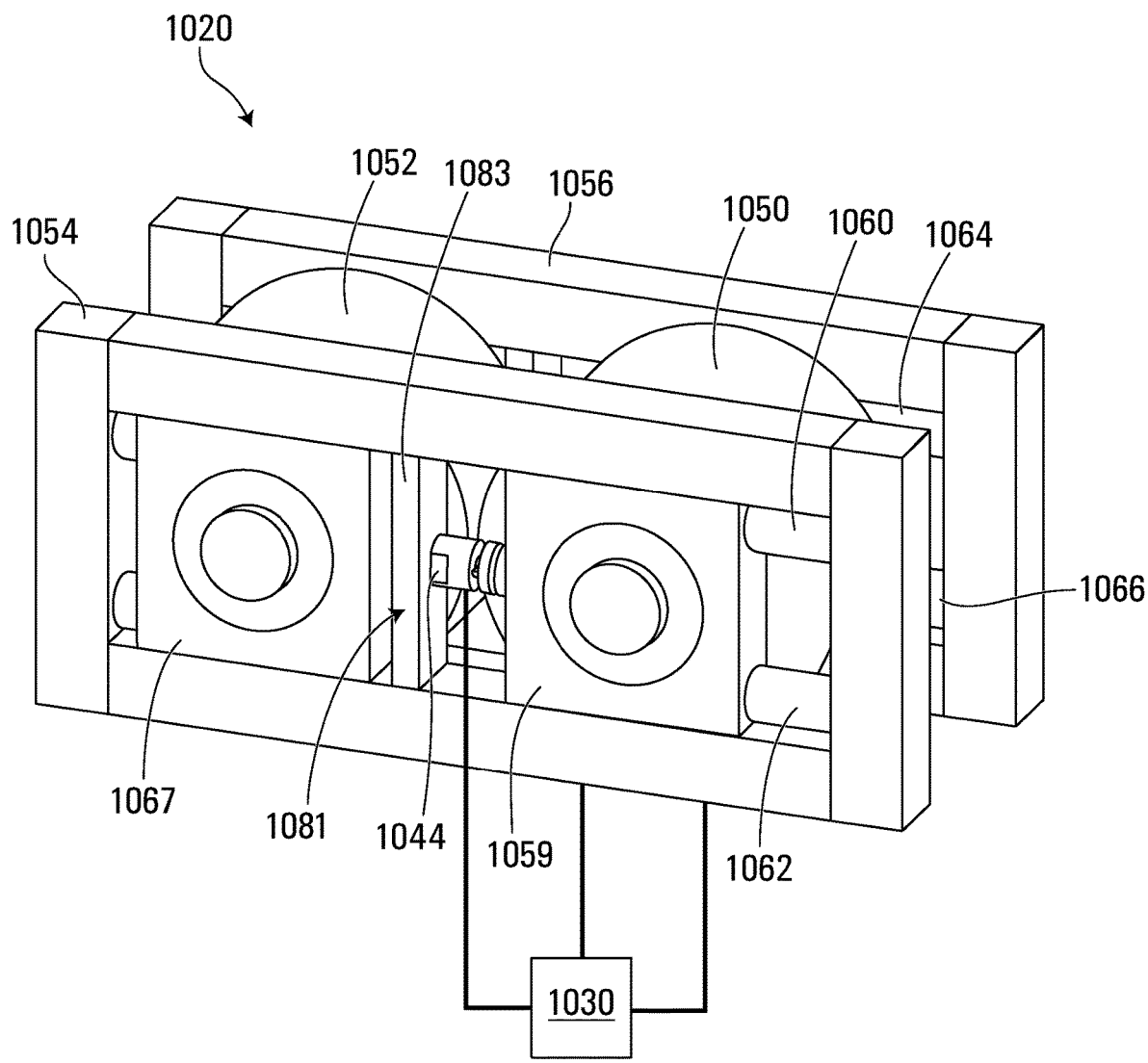
FIG. 18 is a back isometric and schematic view of the part of the roll crusher and the measurement device shown in FIG. 17, in accordance with various embodiments.

Referring now to FIGS. 17 and 18, there is shown a roll crusher 1020 from front and back views and a measurement device 1030 according to various embodiments, which may be used in the system 10 shown in FIG. 1 in place of the roll crusher 20 and the measurement device 30 in various embodiments. The roll crusher 1020 shown in FIGS. 17 and 18 is shown without certain elements, such as motors for driving the rollers, for illustration purposes to promote viewing of the features. The roll crusher 1020 may be configured to crush rock samples and to measure force applied to the rock sample during crushing and the measurement device 1030 may be configured to facilitate hardness measurement of the rock sample.

Referring to FIGS. 17 and 18, in various embodiments, the roll crusher 1020 includes rollers 1050 and 1052 configured to receive and roll crush rock sample. In various embodiments, the roll crusher 1020 may include axle mounts 1057 and 1059 and 1058 and 1067 configured to hold the rollers 1050 and 1052, respectively. In various embodiments, the axle mounts 1058 and 1067 holding the roller 1052 may be mounted to frames 1054 and 1056 and held in place. In various embodiments, the axle mounts 1057 and 1059 holding the roller 1050 may be slidable relative to the roller 1052 via slidable connectors such that the roller 1050 is slidable towards and away from the roller 1052. In various embodiments, the slidable connectors may include a roller bearing and Teflon pads below bearing pads to reduce friction to facilitate sliding of the axle mounts 1057 and 1059.

In various embodiments, the roll crusher 1020 may include roller engagement holders 1060, 1062, 1064, and 1066 coupled to the roller 1050 and configured to apply gathering forces to the roller 1050 relative to the roller 1052 to bring the rollers together. In various embodiments, the roller engagement holders 1060-1066 may be controllable to adjust the gathering forces applied to the roller 1050 by the roller engagement holders 1060-1066. For example, in some embodiments, the roller engagement holders 1060-1066 may each include an adjustable hydraulic actuator or piston coupled between one of the frames 1054 and 1056 and the roller 1050 and configured to urge the roller 1050 towards the roller 1052.

In some embodiments, use of the roller engagement holders 1060-1066 may allow roll crushing force to be measured by placing force sensors on gap limiters between the rollers 1050 and 1052, such as between vertical frame beams and the axle mounts 1057 and 1059. In various embodiments, use of hydraulic actuators to apply pressing forces to the rollers 1050 and 1052 during roll crushing may allow the pressing force to be set to a nominated setting that is suitable for the rock type or size being processed. For example, if the rock type is found to be too competent to be broken by the selected pressing force, a user may increase the hydraulic pressure for subsequent samples to make sure that the pressing force is high enough to break the samples. In various embodiments, use of hydraulic actuators may allow high confidence in the force being applied. In some embodiments, the roller engagement holders 1060-1066 may be in communication with the measurement device 1030 or another device configured to control the roller engagement holders 1060-1066 to adjust the gathering forces applied to the roller 1050 by the roller engagement holders 1060-1066.

Referring to FIGS. 17 and 18, in various embodiments, the roll crusher 1020 includes gap limiters 1080 and 1081 configured to limit movement of the roller 1050 to relative to the roller 1052 such that a minimum gap between the rollers is provided. In some embodiments, the gap limiters 1080 and 1081 may include vertical frame beams 1082 and 1083 rigidly mounted to the frames 1056 and 1054.

Referring still to FIGS. 17 and 18, the roll crusher 1020 includes force sensors 1042 and 1044 coupled to at least one of the rollers 1050 and 1052 and configured to sense one or more forces applied to the rock sample during roll crushing of the rock sample. In some embodiments, the force sensors 1042 and 1044 may be configured to sense a roller holding force holding the roller 1050 against the gap limiters 1080 and 1081 during crushing. In various embodiments, the total sensed roller holding force from the force sensors 1042 and 1044 may be equal to the difference between the roller gathering force applied to the roller 1050 by the roller engagement holders 1060-1066 and the crushing reaction forces applied in the opposite direction to the rollers 1050 and 1052 during roll crushing by the rock sample. In various embodiments, the force sensors 1042 and 1044 may be configured to produce signals representing the sensed roller holding force for reception by the measurement device 1030.

In various embodiments, the gap limiters 1080 and 1081 may include the force sensors 1042 and 1044, respectively, coupled between the rollers 1050 and 1052. For example, in some embodiments, the force sensor 1042 may be coupled between the axle mount 1057 for the roller 1050 and the vertical frame beam 1082, which may in turn be mounted to the frame 1056 and the force sensor 1044 may be coupled between the axle mount 1059 for the roller 1050 and the vertical frame beam 1083, which may in turn be mounted to the frame 1054. In some embodiments, the force sensors 1042 and 1044 may each include a piezoelectric force sensor, for example. In various embodiments, a piezoelectric sensor may provide a fast reaction time such that forces may be sensed at small sampling periods (e.g., less than about 0.2 ms in some embodiments). In some embodiments, the force sensors 1042 and 1044 may each have an adjustable length to adjust a roller gap size provided by the roll crusher 1020. For example, in some embodiments, each of the force sensors 1042 and 1044 may include a threaded member, such as a bolt, that may be turned to adjust a length of the force sensor. In various embodiments, including the force sensors 1042 and 1044 in the gap limiters 1080 and 1081 may facilitate measurement of crushing forces during roll crushing of the rock sample, while using roller engagement holders that are configured to adjust the roller gathering force applied to the roller 1050.

In various embodiments, the total sensed roller holding force may be a measurement of the force applied by the rollers on the gap limiter. For example, in various embodiments, when the rollers 1050 and 1052 of the roll crusher 1020 are not engaging rocks, the force sensors 1042 and 1044 may sense the roller gathering forces applied by the roller engagement holders 1060-1066 to the roller 1050. In various embodiments, during crushing, the rock being crushed by the rollers 1050 and 1052 may apply a force that is counter to the applied roller gathering forces, thereby relieving the force applied to the force sensors 1042 and 1044. Thus, during crushing, the sensed roller holding forces sensed by the force sensors 1042 and 1044 may be equal to the roller gathering forces applied by the roller engagement holders 1060-1066 minus the roll crushing force. In various embodiments, since the roller gathering forces applied by the roller engagement holders 1060-1066 may be known and constant (and in some embodiments, controllable), the roll crushing force may be determined from the sensed roller holding forces using the following formula:

$$F_{crushing} = F_{roller\ gathering} - F_{sensed\ roller\ holding}$$

Where $F_{sensed\ roller\ holding}$ is the total sensed roller holding force, which may be a sum of the roller holding forces sensed by the force sensors 1042 and 1044. In some embodiments, the force sensors 1042 and 1044 may each include a piezoelectric sensor, which under static load has an output that drops to zero. Accordingly, in some embodiments, when the hydraulic actuators are charged and the roll crusher 1020 is empty, the output from the force sensors 1042 and 1044 may drop to zero instead of a positive force provided by the applied roller gathering force. Thus, during crushing the piezoelectric sensors may provide negative values (due to relief of the load from the sensor) and so in the case of the force sensors 1042 and 1044 each including a piezoelectric sensor, the roll crushing force may be determined from the sensed roller holding force sensed by the force sensors 1042 and 1044 using the following formula:

$$F_{crushing} = -F_{sensed\ roller\ holding}$$

Where $F_{crushing}$ is the crushing force and $F_{sensed\ roller\ holding}$ is the total force sensed by the force sensors 1042 and 1044. In various embodiments, the measurement device 1030 may be configured to determine the crushing force (e.g., using one of the above equations) and then to treat the crushing force generally similarly to as described above having regard to the forces sensed by the force sensors 42 and 44 and the measurement device 30 shown in FIGS. 1 and 3.

In some embodiments, the roll crusher 1020 may include a gap sensor 1090 coupled to at least one of the rollers 1050 and 1052 and configured to sense a roller gap size provided by the rollers 1050 and 1052 during the roll crushing. In some embodiments, the gap sensor 1090 may be coupled between the rollers 1050 and 1052 and configured to measure the roller gap size provided by the rollers 1050 and 1052 during crushing. For example, referring to FIG. 17, in various embodiments, the gap sensor 1090 may include an arm 1092 mounted to the axle mount 1057 and movable with the axle mount 1057 when the roller 1050 slides towards and away from the roller 1052. The gap sensor 1090 may include a sensing portion 1094 mounted to the frame 1056 such that the arm 1092 moves relative to the sensing portion 1094 when the roller 1050 slides towards and away from the roller 1052. In various embodiments, the gap sensor 1090 may be configured to produce signals representing the sensed roller gap size for reception by the measurement device 1030.

In various embodiments, a user may control the roller engagement holders 1060-1066 to adjust the applied roller gathering force. In some embodiments, the roller engagement holders may be set such that they allow for roller gap expansion (e.g. lateral movement of the moving roller 1050). For example, in some embodiments, the roller engagement holders 1060-1066 may each include a hydraulic actuator and a user may control the hydraulic actuators via a hydraulic system and/or device, for example, to adjust the applied roller gathering force. In various embodiments, this may facilitate a user choosing a pressure setting that results in the roller gap expanding during roll crushing of the rock sample while still achieving some rock breakage. In various embodiments, such a pressure setting may be desirable to facilitate a lower pressing force to be applied that may extend the life of rollers and/or roller linings (higher roll forces may shorten the life of the rollers and/or roller linings). In various embodiments, the use of a hydraulic system for controlling pressing force may provide flexibility to apply a force setting where both breakage and roller movement occur.

In various embodiments, both breakage and roller movement may be desirable because they may facilitate recordal of force data for a larger range of feed sizes at one gap setting. This may be achieved by setting a small gap, by adjusting lengths of the force sensors 1042 and 1044, for example, while setting a low hydraulic pressure (which may result in the roller 1052 moving and excessive roll forces being avoided). This means that in some embodiments, for a set range of feed sizes (e.g., 32 mm to 10 mm), one could set a gap of about 9 mm and record force and gap data during processing.

In various embodiments, measuring gap size may negate the requirement of setting a large gap size in relation to the feed size to try to avoid forces becoming excessive when the gap is very small (in relation to the feed size). In various embodiments, measuring gap size may avoid requiring a high pressing force to make sure that a force reading is provided, as gap information will also contribute to rock sample hardness information.

In various embodiments, measuring the roller gap size and more particularly, the maximum roller gap size measured during crushing of a rock sample, may inform the top size (or coarsest size) of the rock sample (or broken rock samples resulting from breakage of the rock sample) after crushing has been completed.

In various embodiments, using the gap sensor 1090 may facilitate determination of a hardness parameter based at least in part on the sensed roller gap size. For example, in some embodiments, using the gap sensor 1090 may facilitate determination of a normalized rock hardness and/or a Drop Weight Index. In some embodiments, the measurement device 1030 may be configured to determine a maximum roller gap size sensed during roll crushing of the rock sample and to determine the hardness parameter based at least in part on the determined maximum roller gap size.

Figure 19:
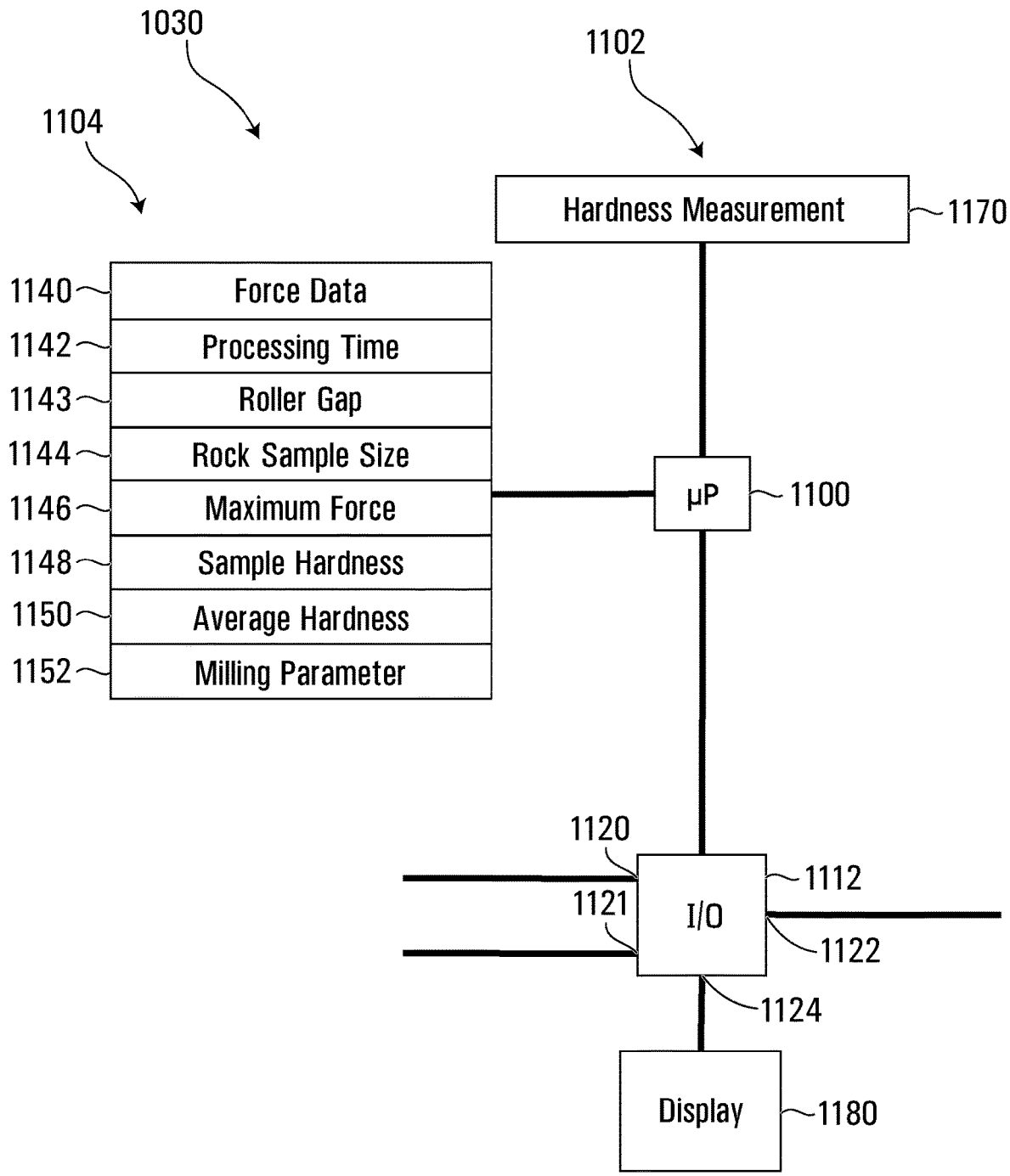
FIG. 19 is a schematic view of the measurement device shown in FIG. 17 including a processor circuit, in accordance with various embodiments.

Referring now to FIG. 19, a schematic view of the measurement device 1030 shown in FIG. 17 according to various embodiments is shown. In some embodiments, the measurement device 1030 may be configured to perform generally similar functionality to that of the measurement device 30 shown in FIG. 3. Referring to FIG. 19, the measurement device 1030 includes a processor circuit including a processor 1100 and a program memory 1102, a storage memory 1104, and an input/output (I/O) interface 1112, all of which are in communication with the processor 1100.

In the embodiment shown in FIG. 19, the measurement device 1030 also includes a display 1180 in communication with the processor 1100 via an interface 1124 of the I/O interface 1112. The I/O interface 1112 may include an interface 1120 for communicating with the force sensor 1042, an interface 1121 for communicating with the force sensor 1042, and an interface 1122 for communicating with the gap sensor 1090. In some embodiments, the I/O interface 1112 may also include an additional interface for facilitating networked communication through a network such as the Internet. In some embodiments, the interface 1120 and/or the interface 1122 may facilitate wireless and/or wired communication. In some embodiments, each of the interfaces included in the I/O interface 1112 may include one or more interfaces and/or some or all of the interfaces included in the I/O interface 1112 may be implemented as combined interfaces or a single interface.

Processor-executable program codes for directing the processor 1100 to carry out various functions are stored in the program memory 1102. Referring to FIG. 19, the program memory 1102 includes a block of codes 1170 for directing the measurement device 1030 to perform hardness measurement.

The storage memory 1104 includes a plurality of storage locations including location 1140 for storing force data, location 1142 for storing processing time data, location 1143 for storing roller gap size data, location 1144 for storing rock sample size data, location 1146 for storing maximum force data, location 1148 for storing sample hardness data, location 1150 for storing average hardness data, and location 1152 for storing milling parameter data. In various embodiments, the storage locations may be stored in a database in the storage memory 1104.

In various embodiments, the block of codes 1170 may be integrated into a single block of codes or portions of the block of codes 1170 may include one or more blocks of code stored in one or more separate locations in the program memory 1102. In various embodiments, any or all of the locations 1140-1152 may be integrated and/or each may include or be included in one or more separate locations in the storage memory 1104.

Each of the program memory 1102 and storage memory 1104 may be implemented as one or more storage devices including random access memory (RAM), a hard disk drive (HDD), a solid-state drive (SSD), a network drive, flash memory, a memory stick or card, any other form of non-transitory computer-readable memory or storage medium, and/or a combination thereof. In some embodiments, the program memory 1102, the storage memory 1104, and/or any portion thereof may be included in a device separate from the measurement device 1030 and in communication with the measurement device 1030 via the I/O interface 1112, for example.

Figure 20:
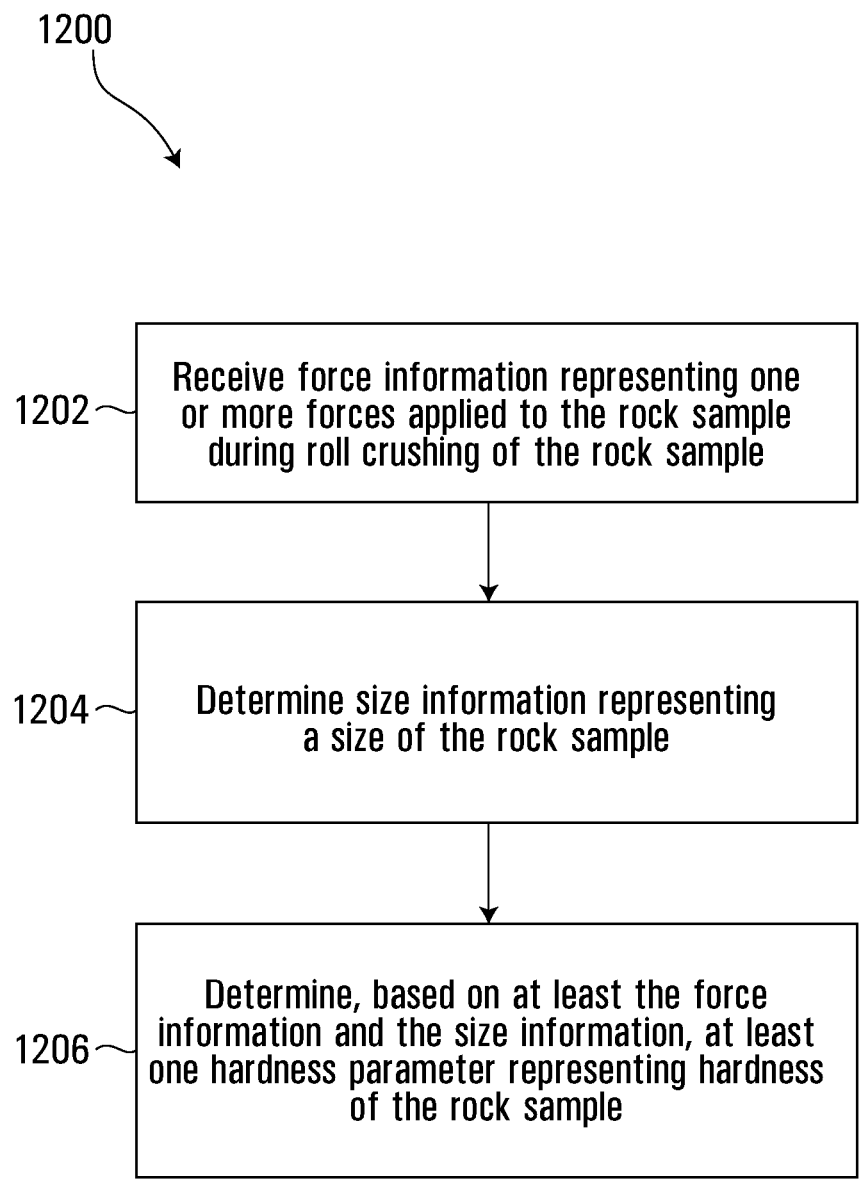
FIG. 20 is a flowchart depicting blocks of code for directing the measurement device shown in FIG. 19 to perform hardness measurement functions, in accordance with various embodiments.

Referring now to FIG. 20, there is shown a flowchart 1200 depicting blocks of code for directing the processor 1100 shown in FIG. 19 to perform hardness measurement functions in accordance with various embodiments. The blocks of code included in the flowchart 1200 may be encoded in the block of codes 1170 of the program memory 1102 shown in FIG. 19, for example.

Referring to FIG. 20, the flowchart 1200 begins with block 1202 which directs the processor 1100 shown in FIG. 19 to receive force information representing one or more forces applied to a rock sample during roll crushing of the rock sample by at least one roller. In some embodiments, block 1202 may direct the processor 1100 to receive from the force sensors 1042 and 1044 shown in FIGS. 17 and 18 via the interfaces 1120 and 1121 of the I/O interface 1112 shown in FIG. 19, signals representing the one or more forces applied to the rock sample during roll crushing of the rock sample.

Figure 21:
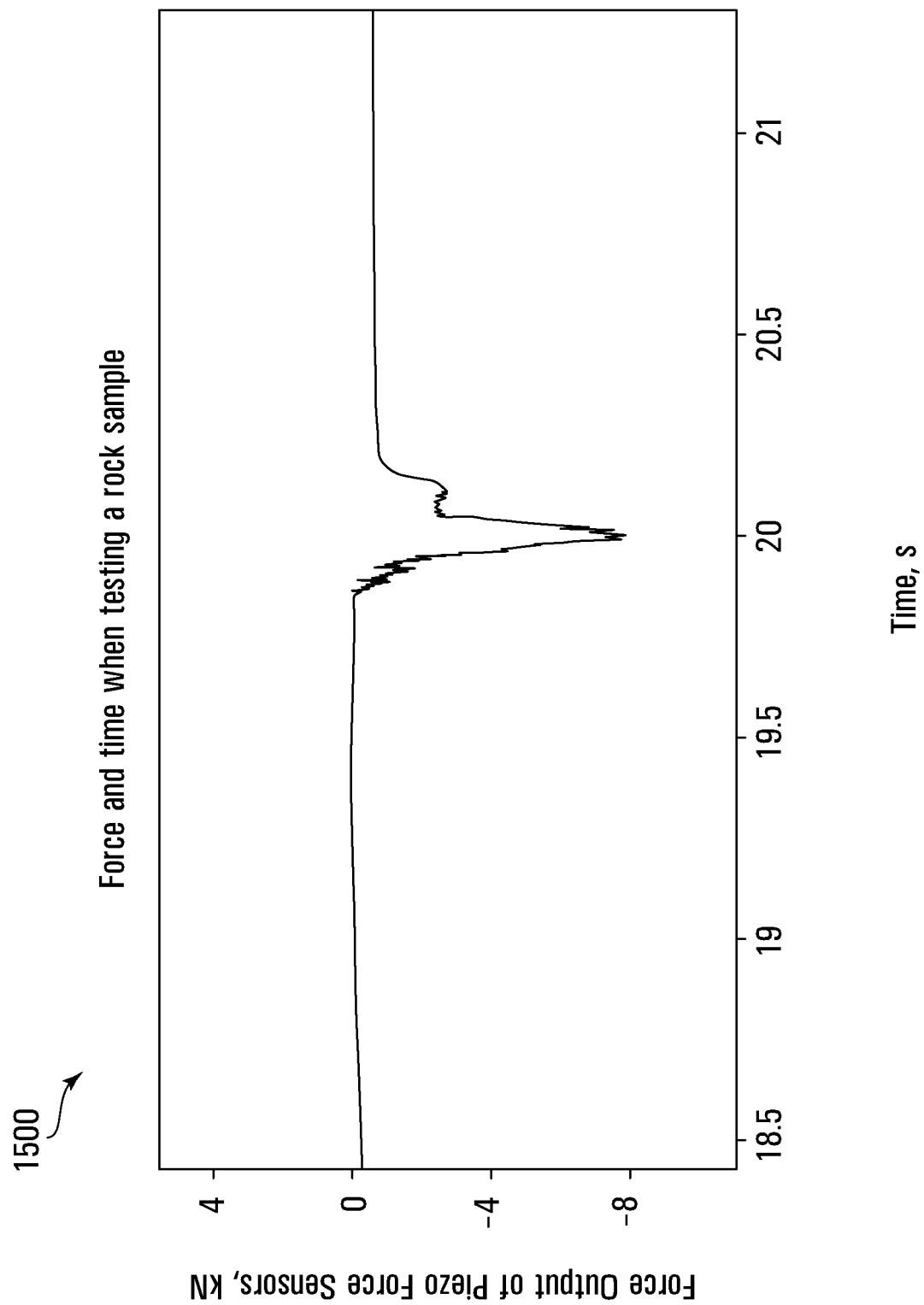
FIG. 21 is a chart representing exemplary force information that may be used by the measurement device shown in FIG. 17 in accordance with various embodiments.

For example, in some embodiments, block 1202 may direct the processor 1100 to receive analog voltage signals from the force sensors 1042 and 1044 representing a sensed roller holding force sensed by the force sensors over time. In various embodiments, for example, when the force sensors 1042 and 1044 each include a piezoelectric force sensor, the total forces sensed by the force sensors may be those shown in the chart 1500 in FIG. 21.

Block 1202 may direct the processor 1100 to convert the analog voltage signals into a plurality of digital values and sum the forces, such that the summed forces represent respective roller holding forces sensed and each roller holding force is associated with a time at which the force was sensed. In various embodiments, a piezoelectric sensor may be used in the force sensors 1042 and 1044, in which case the crushing forces may be equal to the absolute value of the relative drop in measured force (without reference to the hydraulic force/roller holder force). Accordingly, block 1202 may direct the processor to convert the roller holding forces to crushing forces using the below equation:

$$F_{crushing} = -F_{sensed\ roller\ holding}$$

Block 1202 may direct the processor 1100 to determine the crushing forces using the above equation. Block 1202 may direct the processor 1100 to store the determined crushing forces and associated times in the location 1140 of the storage memory 1104.

Figure 22:
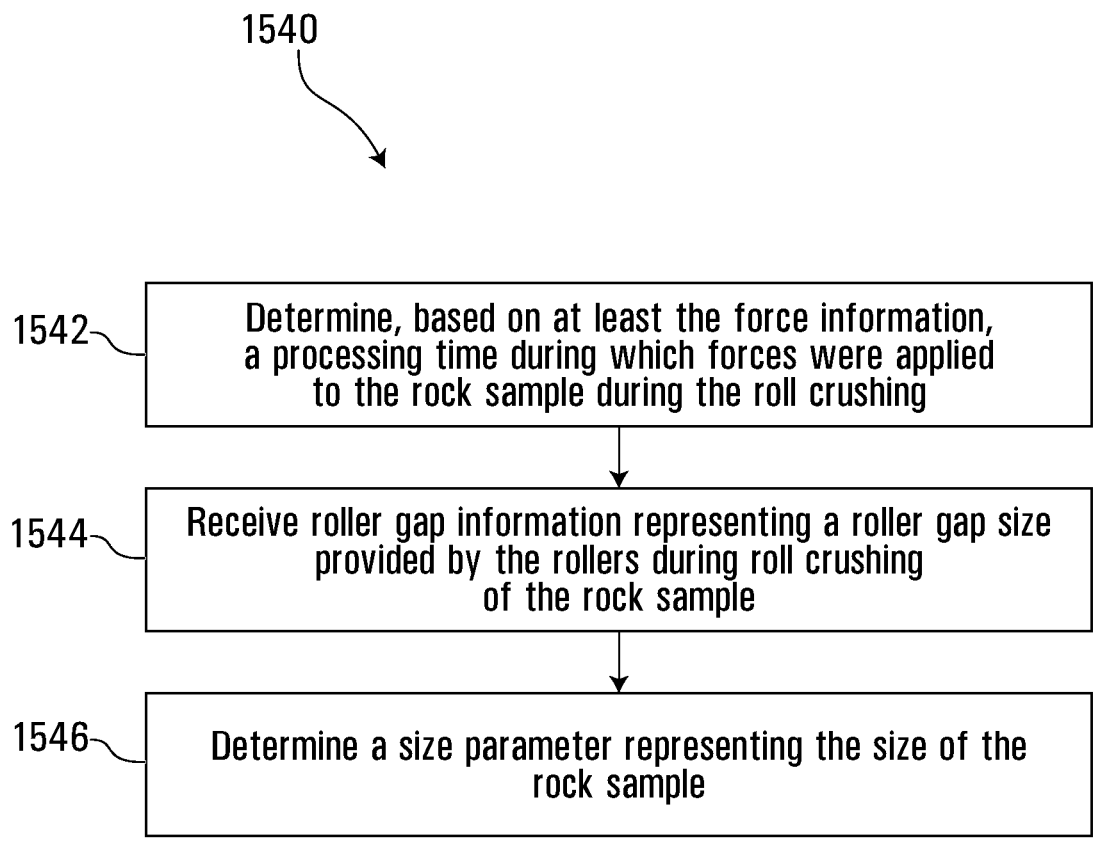
FIG. 22 is a flowchart depicting blocks of code that may be included in the flowchart shown in FIG. 20, in accordance with various embodiments.

Referring to FIG. 20, block 1204 directs the processor 1100 to determine size information representing a size of the rock sample. In some embodiments, block 1204 may include some code generally similar to code included in block 204 of the flowchart 200 shown in FIG. 5. Referring to FIG. 22, there is provided a flowchart 1540 depicting blocks of code that may be included in the block 1204 of the flowchart 1200 shown in FIG. 20, in accordance with various embodiments.

Referring to FIG. 22, the flowchart 1540 begins with block 1542, which directs the processor 1100 to determine, based on at least the force information received at block 1202, a processing time during which the one or more forces were applied to the rock sample during the roll crushing of the rock sample. In some embodiments, block 1542 may direct the processor 1100 to determine the processing time as a time period during which the one or more forces applied to the rock sample remained above a threshold force. In some embodiments, for the roll crusher 1020, the threshold force may be about 0.1 kN, for example.

In various embodiments, block 1542 may direct the processor 1100 to store a representation of the determined processing time in the location 1142 of the storage memory 1104 shown in FIG. 19. For example, in some embodiments, block 1542 may direct the processor 1100 to determine that the time period during which the forces represented by the force information stored in the location 1140 of the storage memory 1104 are greater than the threshold force of 0.1 kN is 0.30 seconds. In some embodiments, block 1542 may direct the processor 1100 to store the processing time of 0.30 seconds in the location 1142 of the storage memory 1104.

Figure 23:
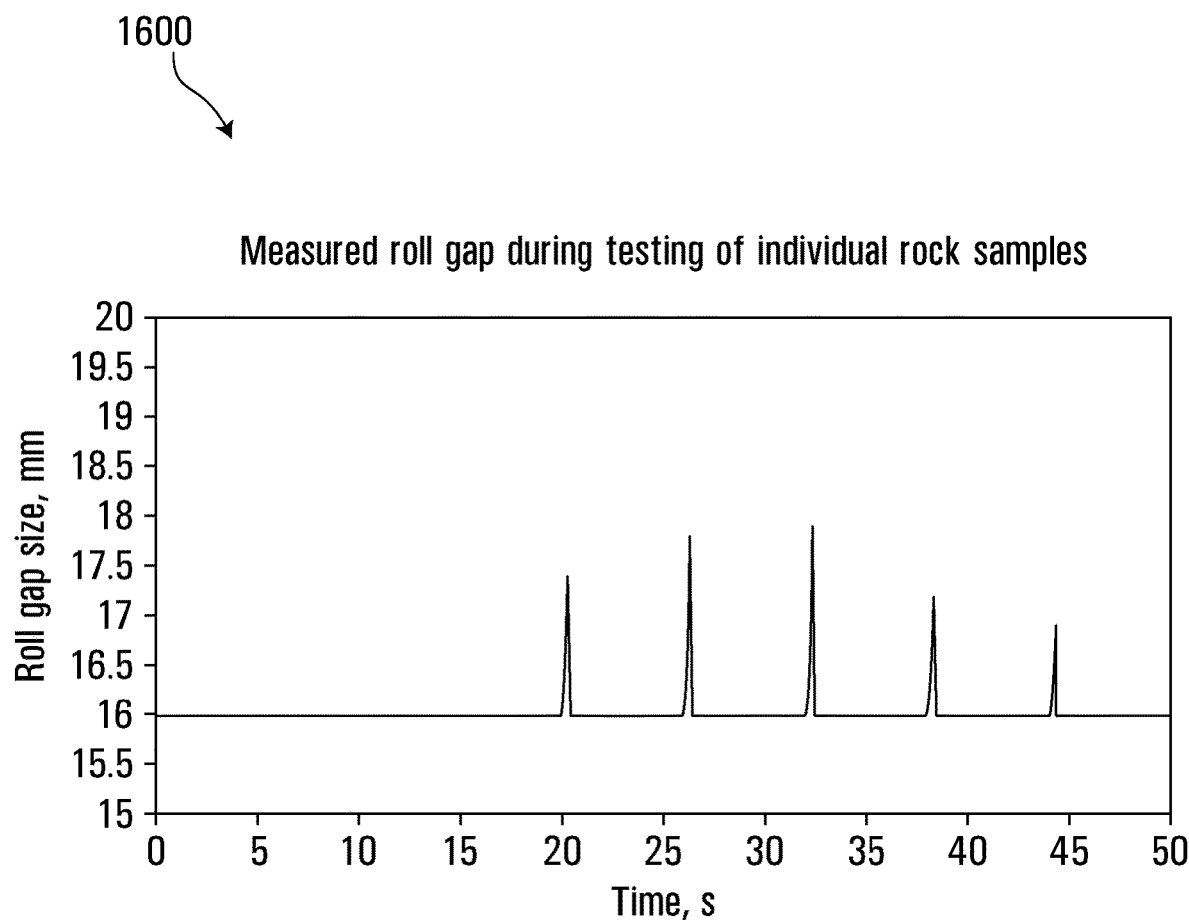
FIG. 23 is a chart representing exemplary roller gap information that may be used by the measurement device shown in FIG. 17 in accordance with various embodiments.

Referring to FIG. 22, block 1544 directs the processor 1100 to receive roller gap information representing a roller gap size provided by the rollers during roll crushing of the rock sample. In various embodiments, block 1544 may direct the processor 1100 to receive the roller gap information from the gap sensor 1090 shown in FIG. 17 via the interface 1122 shown in FIG. 19. For example, in various embodiments, block 1544 may direct the processor 1100 to receive a representation of the roller gap sizes depicted in the chart 1600 shown in FIG. 23. In various embodiments, block 1544 may direct the processor 1100 to store the roller gap sizes in the location 1143 of the storage memory 1104. In some embodiments, a change in roller gap sizes sensed by the gap sensor 1090 may lag the change in forces sensed by the force sensors 1042 and 1044. For example, in some embodiments, they may lag by about 0.3 s.

Referring to FIG. 22, block 1546 then directs the processor 1100 to determine a size parameter representing the size of the rock sample. Block 1546 may direct the processor 1100 to determine an estimate of rock sample feed size or diameter by approximating the rock sample as a sphere and using geometry of the roll crusher to determine a diameter of the rock sample. For example, in some embodiments, the following formula may be used to determine the diameter of the rock sample:

$$\text{Rock sample diameter} = 2 \cdot r = 2 \cdot \left( \frac{\left(R + \frac{s}{2}\right)}{\cos\left(6 \cdot t \cdot \text{rpm} \cdot \frac{\Pi}{180}\right)} - R \right)$$

where R=roller radius (mm), t=processing time (s), s=roller gap size (mm), and rpm=rotational speed of rollers (rpm). In some embodiments, the roller radius may be about 200 mm and the rotational speed of the rollers may be set to about 5 rpm, for example.

In various embodiments, block 1546 may direct the processor 1100 to determine from the roller gap information, a maximum roller gap size during roll crushing of the rock sample. In various embodiments, block 1546 may direct the processor 1100 to use the determined maximum roller gap size in the above equation.

In some embodiments, the force sensors 1042 and 1044 may be configured to only record load values when a sensor threshold value has been exceeded. Accordingly, in some embodiments initial crushing may occur at horizontal loads that are below the sensor threshold value for the force sensors 1042 and 1044. To account for this, in some embodiments, the following equation may be used to determine rock sample diameter in mm:

$$\text{Rock sample diameter} = 2 \cdot \left( \frac{\left(R + \frac{s}{2}\right)}{\cos\left(6 \cdot t \cdot \text{rpm} \cdot \frac{\Pi}{180} + c\right)} - R \right)$$

Which may be simplified to:

$$\text{Rock sample diameter} = \frac{D + s}{\cos\left(6 \cdot t \cdot \text{rpm} \cdot \frac{\Pi}{180} + c\right)} - D$$

Where D is diameter of the rollers and c is a correction angle (in radians) which represents the roll angle where crushing takes place at loads that are below the load measurement threshold. In various embodiments, c may be related to the dynamic coefficient of friction (between the rock sample and roller material), roll speed and the static coefficient of friction. In some embodiments, c may have been previously determined during a calibration exercise. For example, in some embodiments, rock samples of a known size may have been fed to the roll crusher and a suitable value of c may be determined such that the estimated rock sample diameter (from the equation) is similar to the known size. In some embodiments, c may be 0.5 degrees (or Π/360 radians), for example. In various embodiments, block 1546 may direct the processor 1100 to use the determined maximum roller gap size in the above equations.

In various embodiments, using the roller gap size information and more particularly, the maximum roller gap size to determine the rock sample diameter may facilitate more accurate determination or estimation of the diameter of the rock sample, while allowing for some movement of the rollers 1050 and 1052.

Referring to FIG. 22, block 1546 may direct the processor 1100 to store the determined size information in the location 1144 of the storage memory 1104. For example, in some embodiments, the processor 1100 may determine that the rock sample has a diameter of 20.4 mm and so block 1546 may direct the processor 1100 to store a representation of the determined size of 20.4 mm in the location 1144 of the storage memory 1104.

Referring back to FIG. 20, block 1206 directs the processor 1100 to determine, based on at least the force information and the size information, at least one hardness parameter representing hardness of the rock sample. In various embodiments, block 1206 may include some code generally similar to code included in block 206 of the flowchart 200 shown in FIG. 5.

Referring to FIG. 20, in various embodiments, block 1206 may direct the processor 1100 to determine a maximum force of the one or more forces sensed during roll crushing of the rock sample being considered and to determine the at least one hardness parameter based on the maximum force as measured by the force sensors 1042 and 1044. In some embodiments, block 1206 may direct the processor 1100 to read the force information stored in the location 1140 of the storage memory 1104 to determine a maximum force during the processing time. In some embodiments, the processor 1100 may determine that the maximum force of the forces stored in the location 1140 of the storage memory 1104 is 14,500 N and block 1206 may direct the processor 1100 to store a representation of the maximum force in the location 1146 of the storage memory 1104 shown in FIG. 19.

In some embodiments, block 1206 may direct the processor 1100 to apply the following formula to determine a normalized rock hardness for the rock sample:

$$\text{Rock Hardness } (MPa) = \left(\frac{x}{f}\right)^m \cdot \frac{F}{x^2} \cdot e^{-0.161 \cdot (s_{reference} - s_{measured})}$$

Where x is the rock sample diameter determined at block 1204 and stored at the location 1144 of the storage memory 1104, F is the determined maximum force determined at block 1206 and stored at the location 1146 of the storage memory 1104, f is a reference feed size (e.g., 20 mm) and m is a material parameter. In various embodiments, an example value for m may be about 0.45. In the above equation, sreference is a reference gap size (e.g., 16 mm), and $s_{measured}$ is the maximum gap size that was measured during the roll crushing of the rock sample. The normalized rock hardness may be used in a regression formula to estimate an additional or alternative milling parameter, such as the Drop Weight index, using the following regression that may apply to a reference gap value of 16 mm.

$$y = 0.62 h^{0.82}$$

Where y is the Drop Weight Index and h is the hardness parameter and the regression was fit with an $R^2$ of 0.79 using a roller gap of 16 mm and an m value of 0.45 and a reference feed size f value of 20 mm, for example In various embodiments, using the roller gap size information and more particularly, the maximum roller gap size to determine the hardness may facilitate more accurate determination or estimation of the hardness of the rock sample, while allowing for some movement of the rollers 1050 and 1052.

In some embodiments, block 1206 may direct the processor 1100 to store the above-noted normalized rock hardness and/or Drop Weight Index determined at block 1206 as a hardness parameter in the location 1148 of the storage memory 1104. Block 1206 may include further code regarding the hardness parameter, generally as described above regarding block 206 of the flowchart 200 show in FIG. 5, such that after execution of block 1206 a hardness parameter record generally similar to the hardness parameter record 400 shown in FIG. 7, may be stored in the location 1148 of the storage memory 1104. In various embodiments, additional or alternative hardness parameters may be determined at block 1206 and stored in the hardness parameter record.

In various embodiments, the flowchart 1200 shown in FIG. 20 may be repeatedly and/or continuously executed such that a plurality of hardness parameters and associated times are determined and stored in the hardness parameter record in the location 1148 of the storage memory 1104.

In some embodiments, the block of codes 1170 of the program memory 1102 shown in FIG. 19 may include blocks of code for directing the processor 1100 to cause a representation of the at least one hardness parameter to be output and/or displayed, generally as described above, for example, regarding the flowchart 440 shown in FIG. 9.

Figure 24:
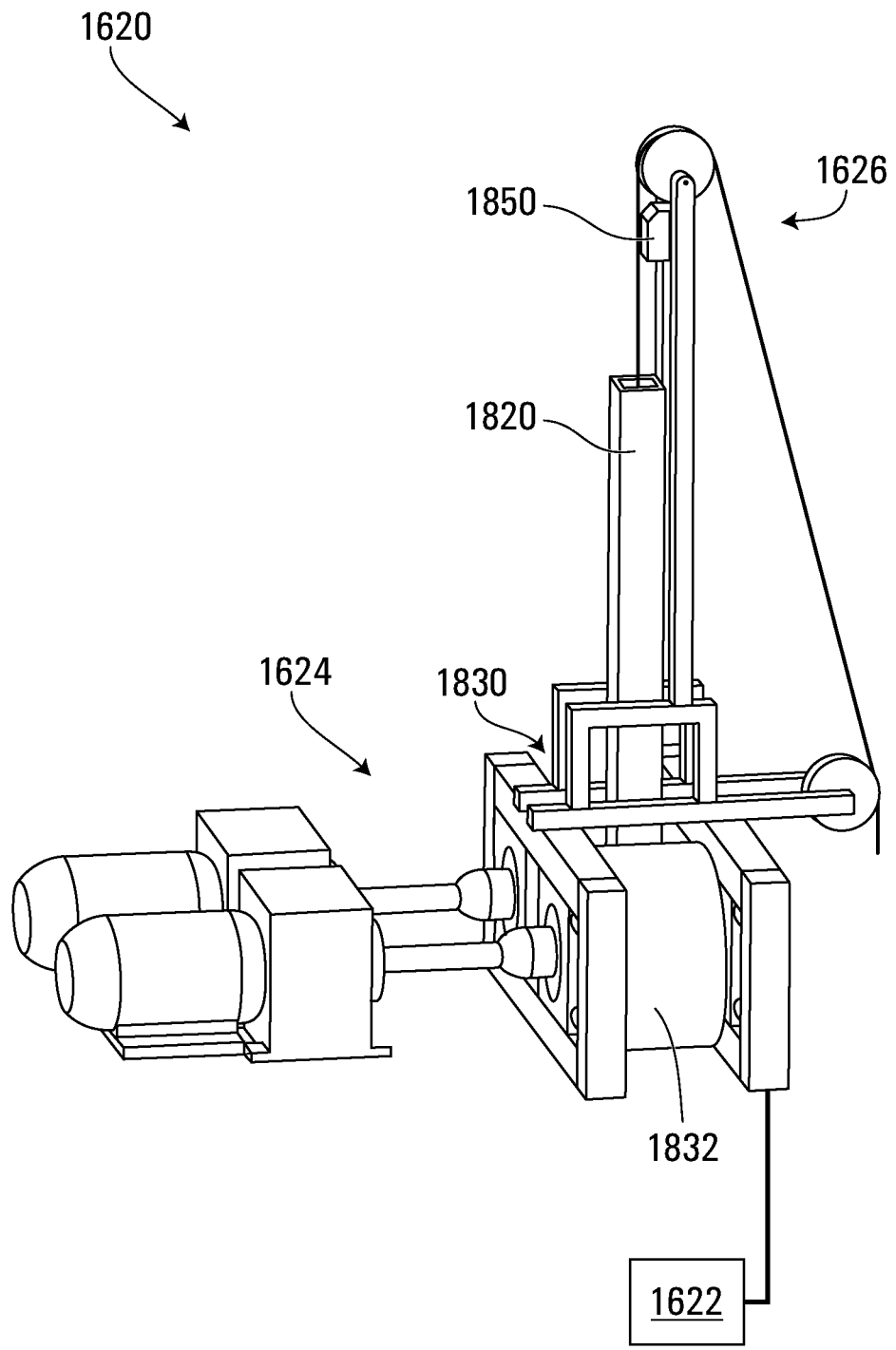
FIG. 24 is an isometric and schematic view of a system for facilitating hardness measurement in a rock sample from drill core, in accordance with various embodiments.

Referring now to FIG. 24, in various embodiments, there may be provided a system 1620 including a measurement device 1622, a roll crusher 1624 and a core feeder 1626. In various embodiments, the system 1620 may be configured to facilitate hardness measurement in a rock sample from drill core, generally similarly to as described for the system 480 shown in FIG. 11. In various embodiments, the roll crusher 1624 may include generally similar elements to the roll crusher 1020 shown in FIGS. 17 and 18 and described above.

Figure 25:
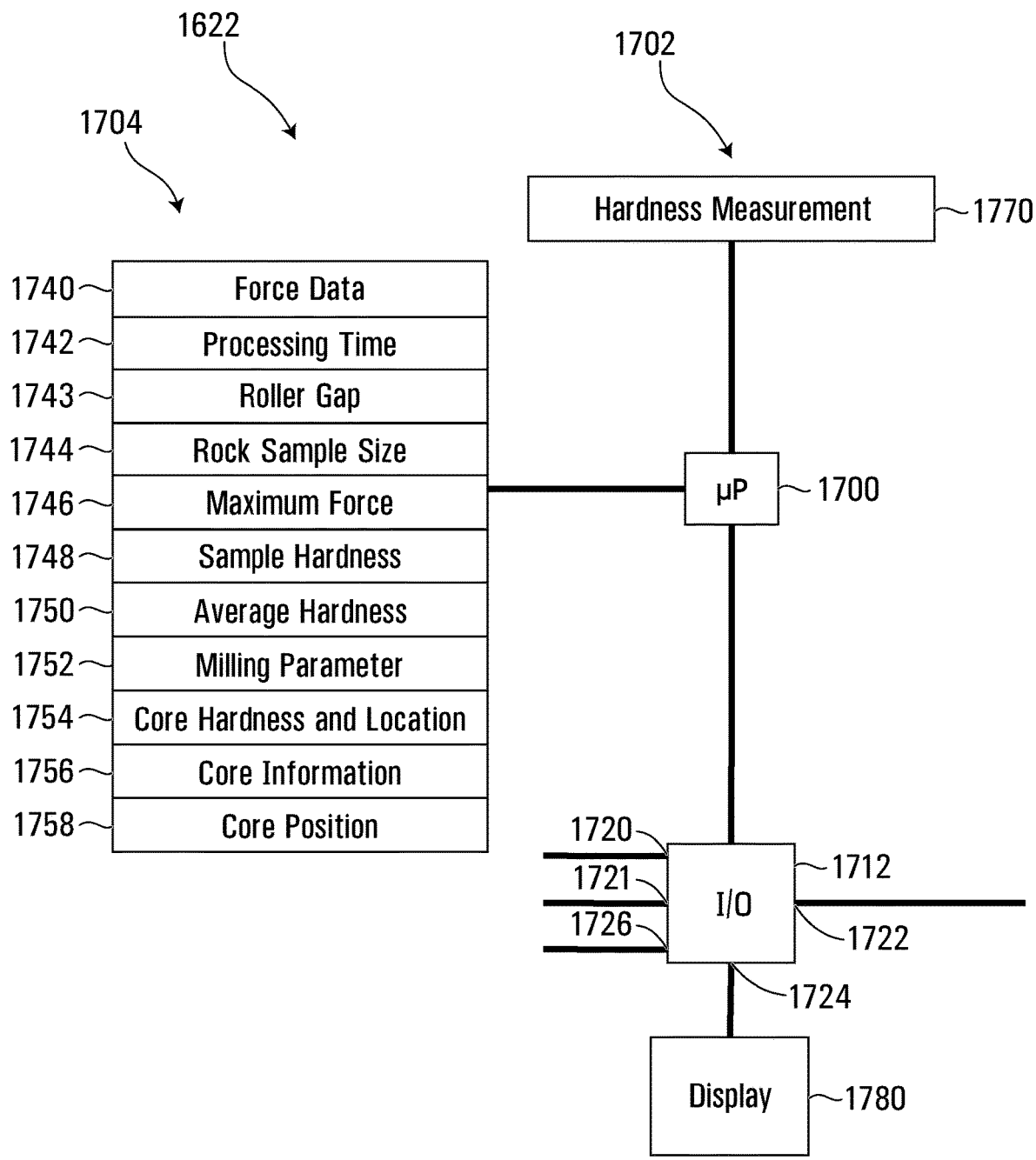
FIG. 25 is a schematic view of a measurement device of the system shown in FIG. 24 including a processor circuit, in accordance with various embodiments.

Referring to FIG. 25, a schematic representation of the measurement device 1622 is shown. In various embodiments, the measurement device 1622 may include generally similar elements to those of the measurement device 1030, but may also be configured to facilitate hardness measurement in a rock sample from drill core. Referring to FIG. 25, the measurement device 1622 includes a processor circuit including a processor 1700 and a program memory 1702, a storage memory 1704, and an input/output (I/O) interface 1712, all of which are in communication with the processor 1700.

In the embodiment shown in FIG. 25, the measurement device 1622 also includes a display 1780 in communication with the processor 1700 via an interface 1724 of the I/O interface 1712. The I/O interface 1712 may include interfaces 1720 and 1721 for communicating with force sensors, an interface 1722 for communicating with a gap sensor, and an interface 1726 for communicating with a position sensor 1850 shown in FIG. 24.

Processor-executable program codes for directing the processor 1700 to carry out various functions are stored in the program memory 1702. Referring to FIG. 25, the program memory 1702 includes a block of codes 1770 for directing the measurement device 1622 to perform hardness measurement of rock samples from drill core.

The storage memory 1704 includes a plurality of storage locations including location 1740 for storing force data, location 1742 for storing processing time data, location 1743 for storing roller gap size data, location 1744 for storing rock sample size data, location 1746 for storing maximum force data, location 1748 for storing sample hardness data, location 1750 for storing average hardness data, location 1752 for storing milling parameter data, location 1754 for storing core hardness and location data, location 1756 for storing drill core information, and location 1758 for storing core position information. In various embodiments, the storage locations may be stored in a database in the storage memory 1704.

Figure 26:
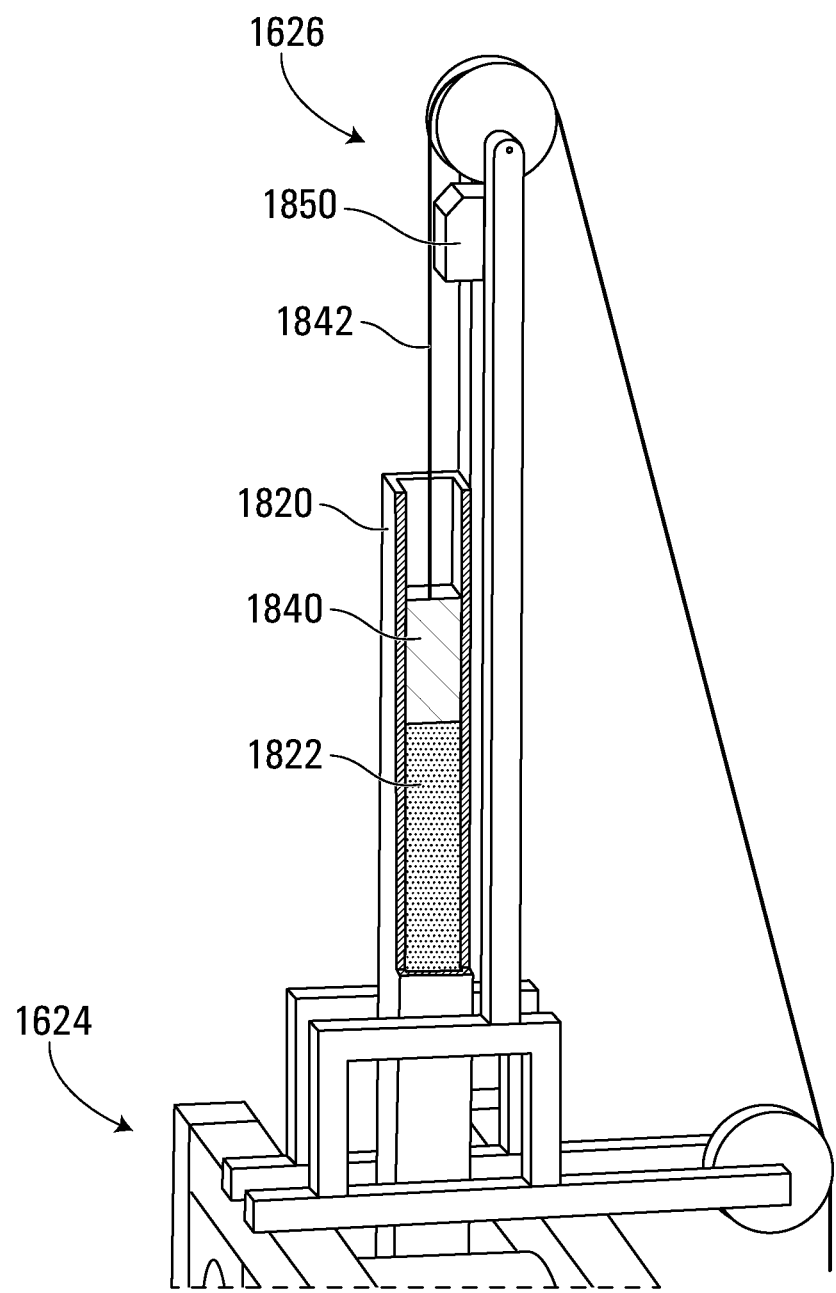
FIG. 26 is an isometric partially cut away view of part of the system shown in FIG. 24, in accordance with various embodiments.
Figure 27:
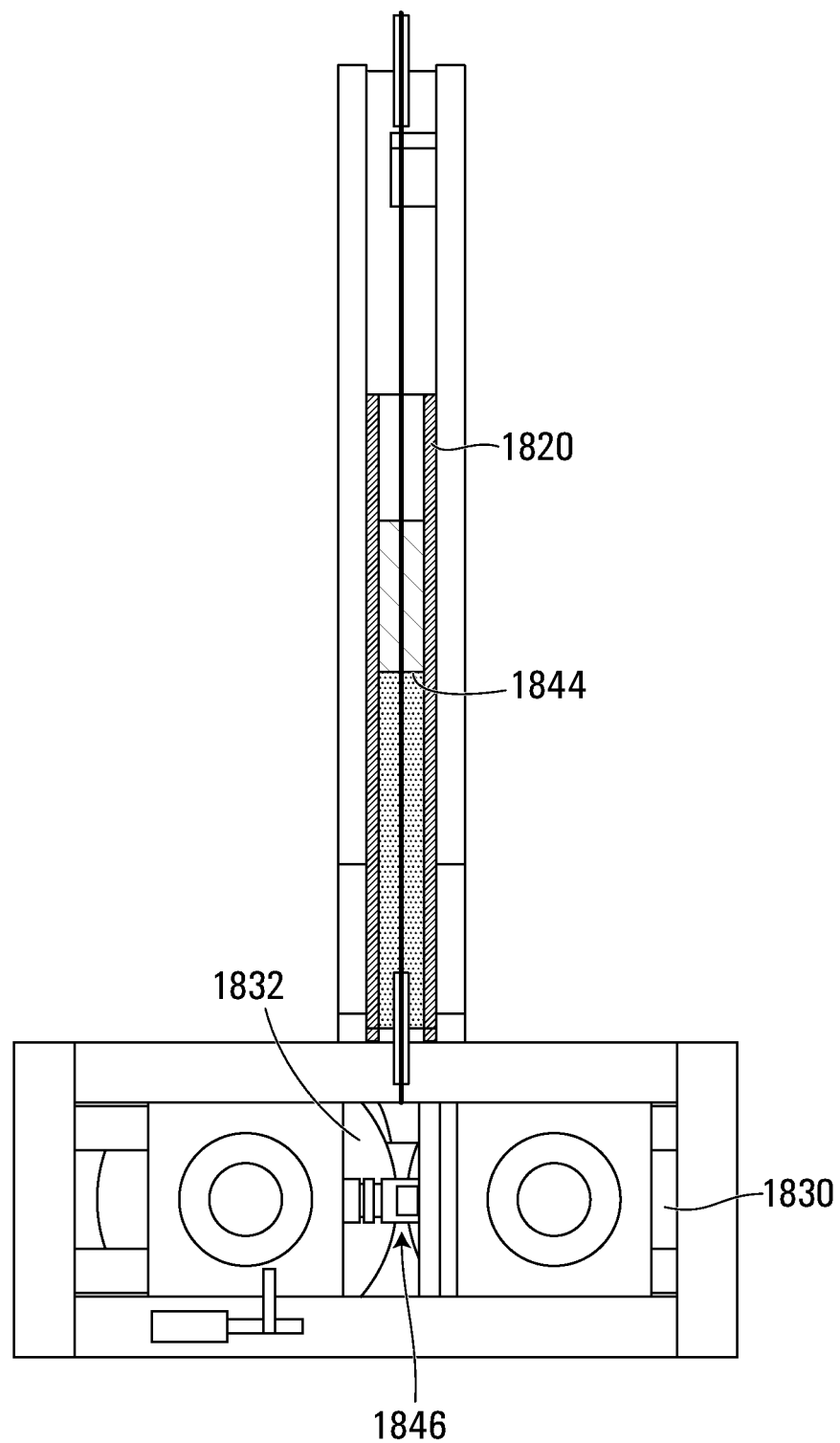
FIG. 27 is a front partially cut away view of part of the system shown in FIG. 24, in accordance with various embodiments.

Referring to FIG. 26, the core feeder 1626 is shown in further detail. The core feeder 1626 includes a guide 1820 (shown cut away for illustration purposes in FIG. 26) configured to guide the drill core 1822 into the roll crusher 1624 shown in FIG. 25 for crushing, the drill core 1822 including one or more rock samples. In various embodiments, the guide 1820 may be mounted above a roller nip point 1846 between the rollers 1830 and 1832 of the roll crusher 1624 as shown in FIG. 27.

In various embodiments, including the guide 1820 may facilitate linear crushing of the drill core such that rock samples included in the drill core are crushed in order from one end of the drill core to the other. In various embodiments, the guide 1820 may facilitate crushing of the rock samples included in the drill core while limiting rotation of the rock samples and/or the drill core prior to crushing.

Referring to FIG. 26, in various embodiments, the core feeder 1626 includes an engager 1840 configured to engage the drill core 1822 for urging the drill core towards the rollers 1830 and 1832 (shown in FIG. 24) for roll crushing. In various embodiments, the engager 1840 may use its weight to engage with a top of the drill core 1822 and urge the drill core downwards towards the rollers. In various embodiments, for example, the engager 1840 may weigh about 20 kg. In various embodiments, the engager 1840 may be made of a malleable material, such as, lead. In various embodiments, use of a malleable material may reduce damage to the rollers 1830 and 1832 if the engager 1840 passes between the rollers 1830 and 1832. In various embodiments, the engager 1840 may prevent the core rock sample from rising or "popping" up from between the rollers 1830 and 1832. In some embodiments, the core feeder 1626 may include a restraint 1842 coupled to the engager 1840 and configured to limit downward movement of the engager 1840, so that the engager 1840 is not crushed by the rollers 1830 and 1832. In some embodiments, the restraint 1842 may include at least one cable and/or a pulley system, for example.

In various embodiments, the guide 1820 may have a length about equal to a sum of the length of a drill core and the length of the engager 1840. In various embodiments, the guide 1820 may be configured to guide the engager 1840 into engagement with the drill core 1822 for urging the drill core towards the rollers 1830 and 1832 for roll crushing. In some embodiments, the guide 1820 may provide a rectangular passage for the drill core and the engager when semi-circular half core is used, and may provide a square passage when full drill core is used. For half-core the cross-sectional length of the rectangular passage may be equal to the diameter of the drill core (+2 mm allowance) and the cross sectional width may be equal to half the diameter of the drill core (+2 mm allowance). For full circular core, the passage provided by the guide 1820 may be square shape with side-length equal to the diameter of the drill core+2 mm allowance. In various embodiments, the passage of the guide 1820 may be configured to guide the engager 1840 into engagement with the drill core and to guide the drill core towards the one or more rollers. In various embodiments, using the guide and/or the engager may facilitate linear crushing of rock samples included in the drill core.

In various embodiments, the guide 1820 may extend close to the rollers 1830 and 1832. In some embodiments, a bottom section of the guide 1820 may have a cut-out that matches the diameter of the rolls. In various embodiments, the cutout may allow the guide to be placed closer to the rollers. In some embodiments, a vertical location of the guide 1820 may be adjustable, such as by shims, to facilitate positioning the guide 1820 as close to the rollers 1830 and 1832 as possible.

In some embodiments the engager 1840 may be coupled to weights external of the guide 1820, so that a greater weight can be applied vertically. For example, in some embodiments, the engager 1840 and weights may have a mass of about 50 kg.

Referring to FIGS. 24 and 26, in some embodiments, the core feeder 1626 may include the position sensor 1850 configured to sense position information representing a position of the drill core 1822 relative to the rollers 1830 and 1832. In various embodiments, the position sensor 1850 may be configured to produce signals representing the position information for reception for the measurement device 1622. In various embodiments, the position sensor 1850 may be in communication with the measurement device 1622 shown in FIG. 25, for example via an interface 1726 of an I/O interface 1712 of the measurement device 1622 shown in FIG. 25. In some embodiments, the position sensor 1850 may be configured to sense a distance from the position sensor 1850 to a top surface of the engager 1840 and this distance may represent a position of the engager 1840 and thus a position of the drill core 1822 relative to the rollers 1830 and 1832. In various embodiments, measuring a position of the engager 1840 as a representation of the position of the drill core 1822 may be more consistently achieved than trying to measure a position of the drill core 1822 directly.

Referring to FIG. 27, in some embodiments, the position sensor 1850 may be configured to measure a distance from the top of the engager 1840 to the position sensor 1850 and this may be converted to a distance from a bottom surface 1844 of the engager 1840 to the roller nip point 1846 (i.e., a position directly between the rollers 1830 and 1832 where the horizontal distance between the roller surfaces is at a minimum). For example, in some embodiments, the distance from the bottom surface 1844 of the engager 1840 to the roller nip point 1846 may be determined as follows:

$$h_{engager\ bottom} = h_{position\ sensor} - d_{position\ sensor\ to\ engager\ top} - l_{engager}$$

Where $h_{engager\ bottom}$ is the distance from the engager bottom surface 1844 to the roller nip point 1846, $h_{position\ sensor}$ is the distance from the position sensor to the roller nip point 1846 (which may be a known constant that has previously been provided and/or stored in memory), $d_{position\ sensor\ to\ engager\ top}$ is the sensed distance from the position sensor to the top of the engager 1840, and $l_{engager}$ is the length of the engager 1840 (which may be a known constant that has previously been provided and/or stored in memory).

In various embodiments, the distance from the engager bottom surface 1844 to the roller nip point 1846 may act as core position information representing a position of the drill core relative to the rollers 1830 and 1832.

In some embodiments, the position sensor 1850 may include a long-range time-of-flight laser sensor pointed at the engager 1840, for example.

In some embodiments, if the distance from the bottom surface 1844 of the engager 1840 to the roller nip point 1846 is sensed or determined and a length of the drill core 1822 is known, then a position of the rock sample being crushed at the roller nip point 1846 within the drill core may be calculated. For example, in various embodiments, the following equation may be used:

$$p_{crush} = l_{drill\ core} - h_{engager\ bottom}$$

Where $p_{crush}$ is the position within the drill core being crushed, $l_{drill\ core}$ is the length of the drill core and $h_{engager\ bottom}$ is the drill core position which may be the distance from the bottom surface 1844 of the engager 1840 to the roller nip point 1846. In some embodiments, $l_{drill\ core}$ may be determined to be the distance from the bottom surface 1844 of the engager 1840 to the roller nip point 1846 at a time when roll crushing forces are first sensed (i.e., exceed a threshold value) and thus a first end of the drill core is being crushed.

Figure 28:
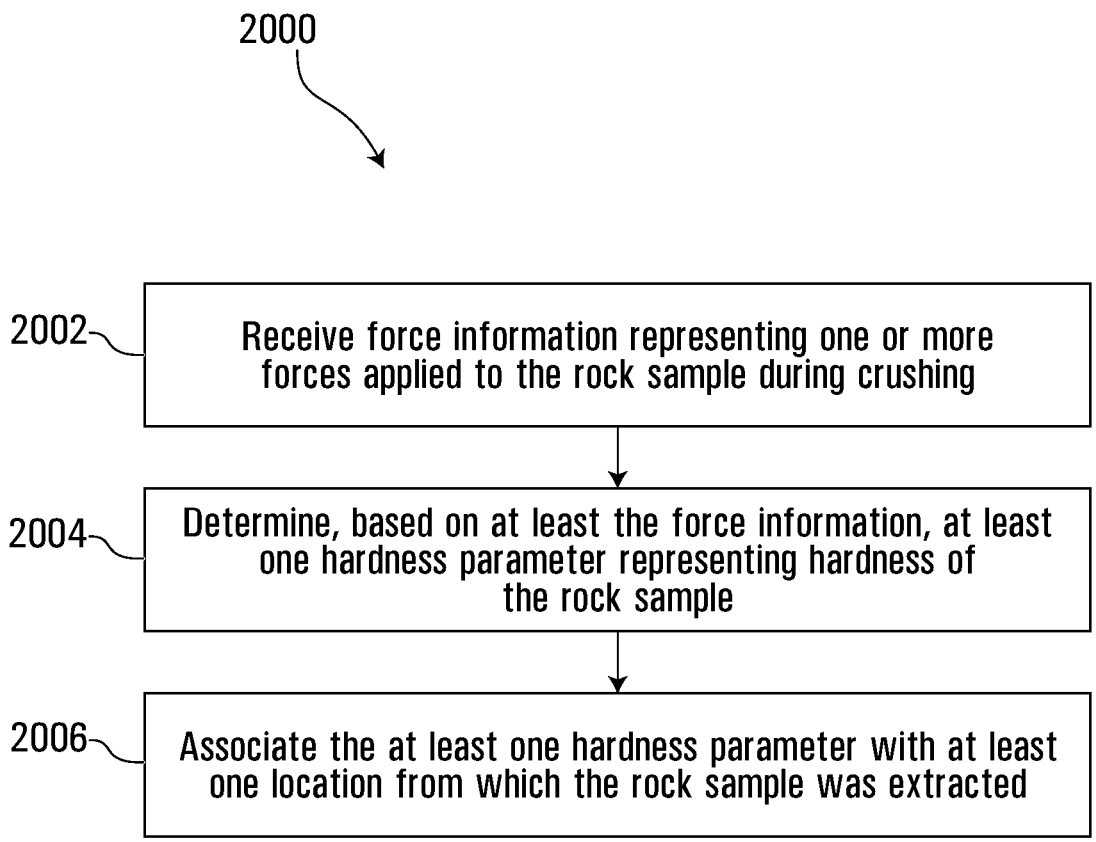
FIG. 28 is a flowchart depicting blocks of code for directing the measurement device shown in FIG. 25 to perform hardness measurement functions in a rock sample from drill core, in accordance with various embodiments.

Referring now to FIG. 28, there is shown a flowchart 2000 depicting blocks of code for directing a processor 1700 of the measurement device 1622 shown in FIG. 25 to perform hardness measurement of a rock sample from a drill core in accordance with various embodiments. In various embodiments, the blocks of code included in the flowchart 2000 may be encoded in a block of codes 1770 of a program memory 1702 shown in FIG. 25, for example. In some embodiments, the blocks of code included in the flowchart 2000 may provide generally similar functionality to the blocks of code included in the flowchart 500 shown in FIG. 12.

In various embodiments, a user may have provided the drill core 1822 or section of drill core including the rock sample into the guide 1820 shown in FIG. 26, the user may have caused the engager 1840 to engage a top surface of the drill core 1822, and the drill core 1822 may be crushed by the rollers 1830 and 1832.

Referring to FIG. 28, the flowchart 2000 begins with block 2002 which directs the processor 1700 shown in FIG. 25 to receive force information representing one or more forces applied to the rock sample during roll crushing of a rock sample. In some embodiments, block 2002 may be generally similar to block 1202 of the flowchart 1200 shown in FIG. 20 and described above, such that after execution of block 1202, a plurality of crushing forces and associated times are stored in a location 1740 of a storage memory 1704 of the measurement device 1622 shown in FIG. 25.

Referring to FIG. 28, block 2004 may then direct the processor 1700 to determine, based on at least the force information, at least one hardness parameter representing hardness of the rock sample.

In some embodiments, block 2004 may include code for directing the processor to determine size information and then to determine the one or more hardness parameters generally as described above having regard to blocks 1204 and 1206 of the flowchart 1200 shown in FIG. 20. However, in some embodiments, block 2004 may direct the processor 1700 to determine the one or more hardness parameters without determining size information. For example, in some embodiments, because the rock sample may be a solid rock core sample (which may be called drill core), a diameter of the core sample may already be known and so determining rock sample size may not be necessary to determine hardness. In some embodiments, block 2004 may be generally similar to the block 504 of the flowchart 500 shown in FIG. 12.

Referring still to FIG. 28, block 2006 then directs the processor 1700 to associate the at least one hardness parameter with at least one location from which the rock sample was extracted. In some embodiments, block 2006 may direct the processor 1700 to generate and store a hardness parameter location record 2040 as shown in FIG. 29 for the rock sample and to store the hardness parameter location record 2040 in the location 1754 of the storage memory 1104. Referring to FIG. 29, the hardness parameter location record 2040 includes a hardness parameter field 2042 for storing the hardness parameter for the rock sample being considered, a time field 2043 for storing the time at which the rock was crushed, a drill hole identifier field 2044 for storing an identifier identifying the drill hole for the rock sample, a location start field 2046 for storing a first location or starting location of the rock sample and a location end field 2048 for storing a second location or end location of the rock sample.

In some embodiments, block 2006 may direct the processor 1700 to store the hardness parameter determined at block 2004 in the hardness parameter field 2042 of the hardness parameter location record 2040. Block 2006 may direct the processor 1700 to determine the time to be stored in the time field 2043 based on the force information stored at the location 1740 of the storage memory 1704, generally as described above, having regard to block 504 of the flowchart 500 shown in FIG. 12 or block 206 of the flowchart 200 shown in FIG. 5, for example. Block 2006 may direct the processor 1700 to store values for the drill hole identifier field 2044, the location start field 2046, and the location end field 2048. In various embodiments, the fields 2044, 2046, and 2048 may together act as location information identifying at least one location of the rock sample.

Figure 30:
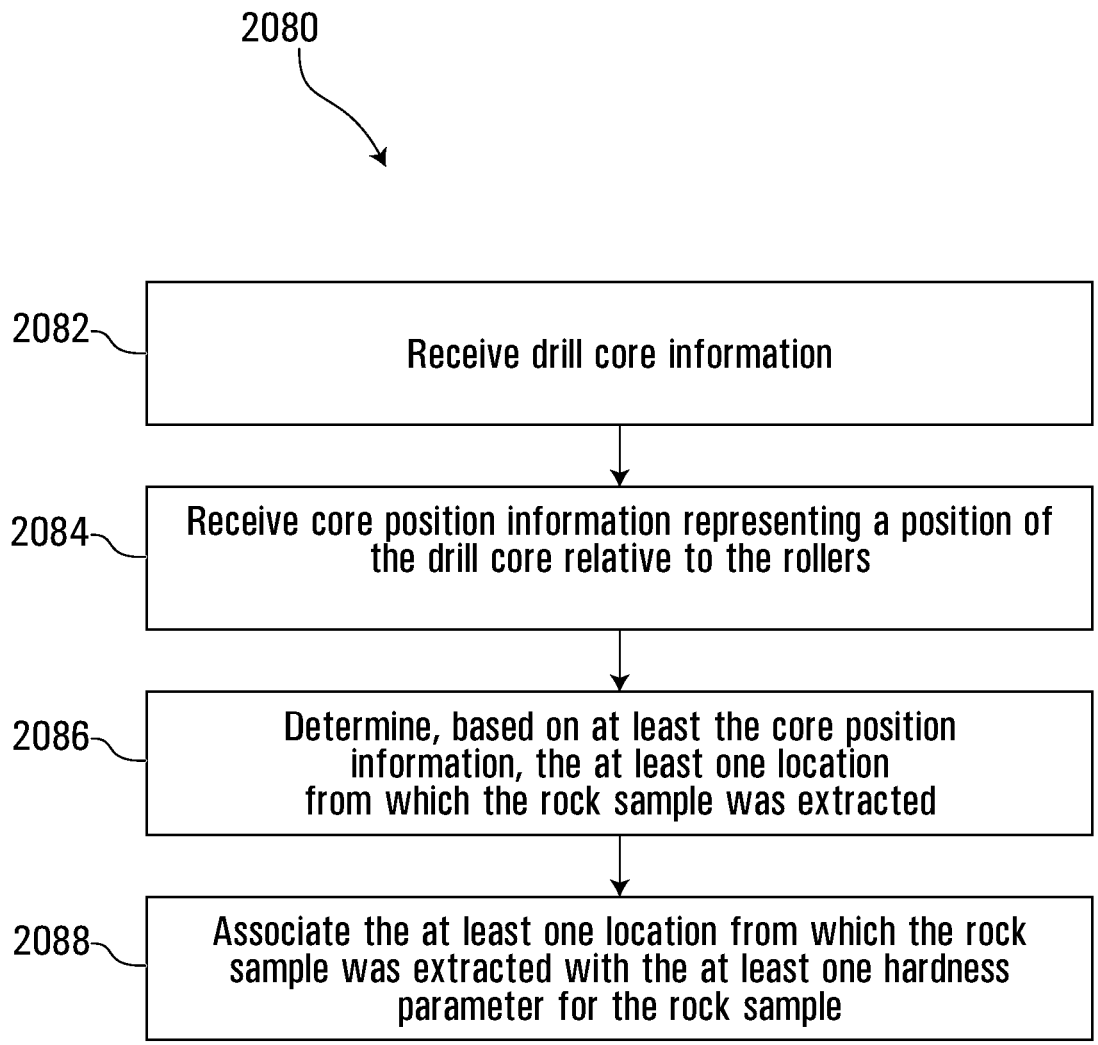
FIG. 30 is a flowchart depicting blocks of code that may be included in the flowchart shown in FIG. 28, in accordance with various embodiments.

Referring now to FIG. 30, there is shown a flowchart 2080 depicting blocks of code that may be included in the block 2006 in accordance with various embodiments. The flowchart 2080 begins with block 2082 which directs the processor 1700 to receive drill core information. In some embodiments, the drill core information may include a starting location or starting depth value for the drill core 1822, such as, for example, 200 m. In various embodiments, the drill core information may include a drill hole identifier for uniquely identifying the drill hole from which the rock sample was extracted. In various embodiments, the drill core information may include an end location or end depth value for the drill core 1822. In some embodiments, the end location (depth value) for the drill core may correspond to a lowest depth of the drill core. In various embodiments, the drill core information may be provided by a user of the measurement device 1622, via a user interface, generally as described above, for example. In some embodiments, the starting location or starting depth value for the drill core 1822 may be omitted from the received drill core information.

Block 2082 may direct the processor 1700 to store the received drill core information in the location 1756 of the storage memory 1704. Block 2082 may direct the processor 1700 to store the drill hole identifier from the drill core information in the drill hole identifier field 2044 of the hardness parameter location record 2040 shown in FIG. 29, in the location 1754 of the storage memory 1704.

Referring to FIG. 30, block 2084 of the flowchart 2080 directs the processor 1700 to receive core position information representing a position of the drill core relative to the rollers 1830 and 1832 roll crushing the rock sample. In various embodiments, block 2084 may direct the processor 1700 to receive from the position sensor 1850 via the interface 1726 of the I/O interface 1712 shown in FIG. 25, signals representing a distance from the position sensor 1850 to the top of the engager 1840. In various embodiments, block 2084 may direct the processor 1700 to convert the sensed distances from the position sensor 1850 to the top of the engager 1840 to distances from the bottom of the engager 1840 to the roller nip point 1846, as discussed above.

Figure 31:
FIG. 31 is a representation of an exemplary drill core position record that may be used in the system shown in FIG. 24 in accordance with various embodiments.

In various embodiments, each determined distance over time from the bottom of the engager 1840 to the roller nip point 1846 between the rollers may act as a position of the drill core relative to the rollers 1830 and 1832. In various embodiments, the to positions of the drill core relative to the rollers 1830 and 1832 over time may be stored in a drill core position record 2120 as shown in FIG. 31 stored in the location 1758 of the storage memory 1704 of the measurement device 1622. In various embodiments, the drill core position record 2120 may store drill core positions over time. In some embodiments, the drill core positions may be stored in mm and the sampling period may be in steps of 1 ms, for example.

Block 2086 then directs the processor 1700 to determine at least one location from which the rock sample was extracted based at least in part on the core position information. In some embodiments, block 2086 may direct the processor 1700 to determine first and second positions of first and second ends respectively of the rock sample within the drill core. Block 2086 may direct the processor 1700 to add the first and second positions to the starting location or depth value of the drill core to determine first and second locations acting as locations from which the rock sample was extracted. Block 2086 may direct the processor 1700 to use the following equation to determine the first and second positions within the drill core:

$$p_{crush} = l_{drill\ core} - h_{engager\ bottom}$$

Where $p_{crush}$ is the position within the drill core being crushed, $l_{drill\ core}$ is the length of the drill core and $h_{engager\ bottom}$ is the drill core position which may be the distance from the bottom surface 1844 of the engager 1840 to the roller nip point 1846. In some embodiments, block 2086 may direct the processor 1700 to determine $l_{drill\ core}$ as equal to the distance from the bottom surface 1844 of the engager 1840 to the roller nip point 1846 as determined by the position sensor 1850 at a time when roll crushing forces are first sensed and thus a first end of the drill core is being crushed. In some embodiments, block 2086 may direct the processor 1700 to determine $l_{drill\ core}$ from the drill core information previously received at block 2082 of the flowchart 2080 shown in FIG. 30.

In various embodiments, block 2086 may direct the processor 1700 to determine the Zo position within the drill core being crushed, at a first time, when the rock sample is first being crushed and at a second time when the rock sample is no longer being crushed, to determine the first and second positions of the first and second ends of the rock sample within the drill core. In various embodiments, block 2086 may direct the processor 1700 to determine the first and second times by analyzing the force information stored in the location 1740 of the storage memory 1704, such as, by determining the first and second times as those when the force first exceeds a threshold force and when the force drops below the threshold force, respectively, for example. In various embodiments, the threshold force may be about 0.1 kN, for example.

Block 2086 may direct the processor 1700 to use the determined first and second times to determine or look up drill core positions from the drill core position record 2120 and then to convert the drill core positions using the following equation (discussed above):

$$p_{crush} = l_{drill\ core} - h_{engager\ bottom}$$

Where $p_{crush}$ is the position within the drill core being crushed, $l_{drill\ core}$ is the length of the drill core and $h_{engager\ bottom}$ is the drill core position which may be the distance from the bottom surface 1844 of the engager 1840 to the roller nip point 1846.

Figure 32:
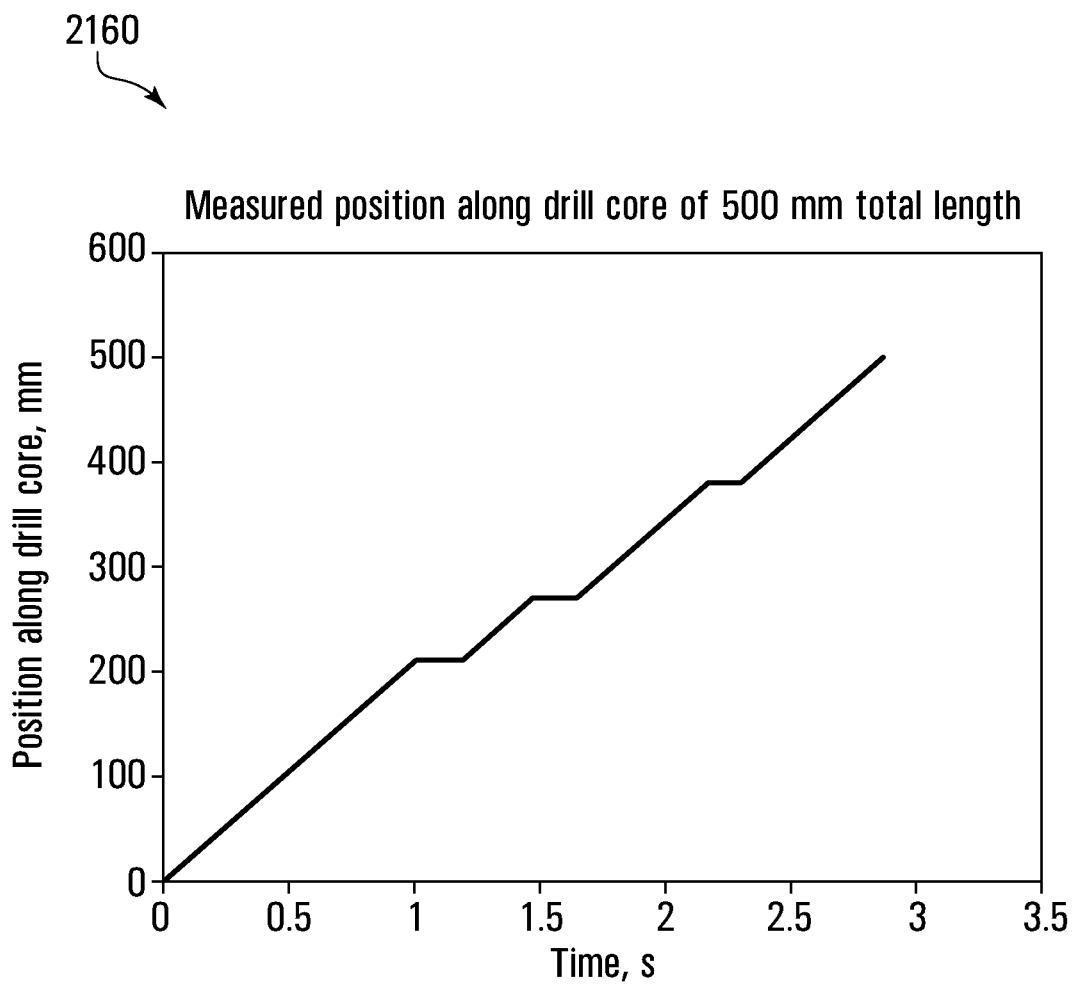
FIG. 32 is a chart representing exemplary positions along drill core over time in the system shown in FIG. 1 in accordance with various embodiments.

Referring to FIG. 32, there is shown a graph 2160 showing how the position within the drill core being crushed may change over time. In various embodiments, flat portions of the graph 2160 may correspond to a change in rate of change in position due to core slippage between the rollers 1830 and 1832, for example.

Block 2086 may direct the processor 1700 to determine, based on the core position information, the at least one location from which the rock sample was extracted. In some embodiments, block 2086 may direct the processor 1700 to add the end location or lowest depth value for the drill core to each of the determined positions to determine first and second locations representing depths or locations of first and second ends of the rock sample. In various embodiments these locations may act as locations from which the rock sample was extracted.

Block 2088 directs the processor 1700 to associate the at least one location from which the rock sample was extracted with the at least one hardness parameter for the rock sample. In various embodiments, block 2088 may direct the processor 1700 to store the first and second locations determined at block 2086 in the location start field 2046 and the location end field 2048 of the hardness parameter location record 2040 shown in FIG. 29.

In various embodiments, using the position sensor 1850 to determine positions within the drill core for rock samples may facilitate comparing a record of hardness and position values for small length increments along the drill core to core information generated by other equipment, such as hyperspectral or x-ray fluorescence sensors, that correspond to the same positions along the drill core. In some embodiments, relationships between hyperspectral and/or x-ray fluorescence signatures and hardness may then be made. In various embodiments, the same length of drill core sample may be composed of different rock types and using the position sensor 1850 may facilitate having hardness and position measurements along the drill core which may allow determination of relationships between rock type and hardness. For example, one section of the drill core sample may be oxidized and associated with a lower hardness value. In some embodiments, such information can then be included in a geometallurgical model of the deposit. In various embodiments, using the position sensor 1850 to determine positions within the drill core for rock samples may facilitate measuring and recording hardness at short length intervals, such that the range of hardness values within drill core sample can be captured and used to inform geotechnical and geometallurgical models of the deposit.

In various embodiments, the hardness parameter location record 2040 shown in FIG. 29 may be treated generally as described above regarding the hardness parameter location record 540 shown in FIG. 16.

In various embodiments, blocks 2002, 2004, and 2006 of the flowchart 2000 may be executed for a plurality of rock samples included in a drill core sample, such that a plurality of hardness parameter location records having a format generally similar to the hardness parameter location record 2040 shown in FIG. 29 are stored in the location 1754 of the storage memory Accordingly, in various embodiments, hardness of a drill core at various locations in the drill core may be determined. In various embodiments, the flowchart 2000 may further include an output block of codes which may be executed after the blocks 2002, 2004, and 2006 have been executed for the entire core sample. In some embodiments, the output block of codes may be generally similar to the output block of codes described above in connection with the hardness parameter location records stored in the location 154 of the storage memory 104. In some embodiments, the output block of codes may direct the processor 1700 to cause the hardness parameters and associated locations to be output. In some embodiments, the output block may direct the processor 1700 to transmit to the display 1780 of the measurement device 1622, a representation of the hardness parameters and the locations from the hardness parameter location records stored in the location 1754 of the storage memory 1704, for causing the display 1780 to display the hardness parameters and the locations to a user.

In various embodiments, alternative or additional ways of determining size information or diameter of rock samples may be used. For example, in some embodiments, a system generally similar to the systems described herein, such as the system 10 shown in FIG. 1, may include one or more cameras for capturing images of a rock sample and a block generally similar to block 204 of the flowchart 200 shown in FIG. 5 may include code for directing a processor of a measurement device to receive image representations of the rock sample and determine the size information or diameter for the rock sample using an image-based size analysis based on the received image representations.

In various embodiments, a device generally similar to the measurement devices described herein may be configured to determine various alternative or additional hardness parameters to those described above.

For example, the device may be configured to determine a hardness parameter similar to Young's modulus (stress/strain), such as by using the following equation to determine a hardness parameter E:

$$E = \frac{\sigma}{\varepsilon}$$

Where E is the Young's Modulus in MPa;
σ is the uniaxial stress in MPa; and
ε is the strain (change in rock thickness divided by original rock thickness), unitless.

The uniaxial stress, σ, may be determined by dividing the measured maximum horizontal roll force by the surface area of the rock sample that is in contact with the roller surface. In various embodiments, the rock surface area may be measured by cameras or estimated by making an assumption about the shape of the rock (i.e. ratio of thickness to width and ratio of thickness to length, where the thickness could be estimated from the processing time)

The strain, E, may be determined from the initial rock thickness (measured by cameras, for example, or estimated from the processing time) and the minimum gap between the rollers (an equipment parameter).

In some embodiments, the device may be configured to determine a hardness parameter based on specific energy consumption, which may be calculated by recording the energy (kWh) used by the roller motors during crushing of a sample divided by the sample mass (t). In various embodiments, the energy may be representative of forces that were applied to the rock sample during crushing.

To determine the specific energy consumption (kWh/t), the sample mass may be estimated from the sample thickness or a rock volume may be estimated using cameras and multiplied by an assumed sample density. For a rock sample, a hardness parameter may be determined by multiplying the average motor power recorded during processing by the time taken to process the rock (in hours, for example) divided by the estimated rock mass (in tonnes, for example).

In some embodiments, the device may be configured to use the maximum force measured for each rock sample as a hardness parameter. For example, when processing a rock sample, the largest horizontal roller force measured during the time taken for the rock to enter and leave the roll crusher may be recorded as the hardness parameter.

In some embodiments, the device may be configured to determine a hardness parameter based on a feed size, product size (measured by cameras) and force measurements or information. Feed size may be rock size before crushing and may be measured by cameras and/or processing time. Product size may be rock size after crushing. Product size may be measured by cameras that can observe roll crusher product, which may be the rocks which are output from the roll crusher and may be a collection of smaller rocks. In some embodiments, a metric for crusher product size that may be used is 'the side-length of a square sieve that allows 80% of the granular material to pass through'. A typical calculation for a hardness parameter may involve determining specific energy divided by (1/product size–1/feed size). In various embodiments, energy may be in units of kWh, and specific energy, W, may be in kWh/t (t=tonne of rock).

For example, an equation similar to that for determining the Bond Work Index may be used:

$$\text{Work Index} = \frac{W}{\left(10 \cdot \left(\frac{1}{P80} - \frac{1}{F}\right)\right)}$$

Where Work Index represents the rock hardness, in units of kWh/t, W is the specific energy consumption (kWh/t) which may be determined as described above, P80 is the side-length of a square sieve that allows 80% of the product material output by the roll crusher to pass through, in microns, and F is the feed size in microns.

In various embodiments, cameras may observe roll crusher product or vibrating sieves placed downstream of the roll crusher and may be used to estimate the P80 size. The feed size, F, may be determined from the processing time and/or cameras.

In some embodiments, a block generally similar to the block 206 of the flowchart 200 may direct a processor to determine the average hardness using additional or alternative methods, such as, for example, by determining the average hardness parameter out of all hardness parameters recorded over a most recent number of samples. For example, the most recent number of processed rock samples may be about 40 rock samples.

In some embodiments, a roll crusher generally similar to the roll crusher 20 shown in FIGS. 1 and 2 or the roll crusher 1020 shown in FIG. 17 may include power sensors for sensing motor power information supplied to motors driving the roll crusher. In various embodiments, the motor power information may represent the one or more forces applied to the rock sample during roll crushing of the rock sample. In various embodiments, the power sensors may transmit signals representing the motor power information to a measurement device described herein, such as the measurement device 30, and the measurement device may use the motor power information generally as described above regarding the force information received from the force sensors described herein. In some embodiments, alternative or additional ways of determining crushing force may be used, such as, for example, other force sensors strain gauges on roll crusher frame components, and/or strain gauges on shafts connected to the rollers and motor output shaft.

In some embodiments, torque sensors may be included in addition to or alternatively to the force sensors described herein and the torque sensors may be configured to measure torque at the roller shafts during crushing. In various embodiments, torque measurement information may act as force information. In various embodiments, the torque measurement information may be indicative of the resistance of the rock sample to breakage and can be used to determine a hardness parameter, generally as described above regarding force information sensed by the force sensors described herein.

In some embodiments, the second location value representing a location of the second end of the rock sample may be manually input by the user.

In some embodiments, a block generally similar to the block 604 of the flowchart 600 shown in FIG. 14 may direct a processor to determine or estimate the rock sample length by the time taken to process the total length of the core sample (i.e. the time during which a force threshold was exceeded).

In some embodiments, such as, for example, during real-time hardness measurement (next to a conveyor with a sampler), there may be times when an oversized rock sample enters the roll crusher 1020 and does not go through the roller nip point. In some embodiments, the roll crusher 1020 may be configured to eject such rocks samples by retracting the roller 1050 using hydraulic actuators acting as the roller engagement holders 1060-1066 and then continuing operation with minimal disruption. In various embodiments, the measurement device 1030 may be configured to detect oversize rock samples by monitoring the force-duration time. In various embodiments, the measurement device 1030 may be configured to compare a force duration time for crushing the rock sample to a threshold crushing time (e.g., 2 seconds) and if the force duration time is greater than the threshold crushing time, the measurement device 1030 may be configured to cause the roller engagement holders 1060-1066 to retract the roller 1050, such as by causing at least one control signal to be sent to hydraulic actuators acting as the roller engagement holders.

In some embodiments, the core position sensor 1850 shown in FIG. 27 may include a linear position sensor or ultrasonic sensor for distance, for example.

In various embodiments, the measurement devices 30 and 1030, when used for certain applications, such as in the system 10, may omit certain elements that are not used. For example, in some embodiments, some blocks of code related to drill core hardness analysis may be omitted from the program memory and some storage memory of the measurement devices 30 and 1030 such as the location 154 may be omitted form the storage memory 104 of the measurement device 30.

In various embodiments, the measurement devices 30 and 1030, when used for certain applications, such as in the system 480 shown in FIG. 11, may omit certain elements that are not used. For example, in some embodiments some blocks of code not related to drill core hardness analysis may be omitted from the program memory and/or the storage memory.

Figure 33:
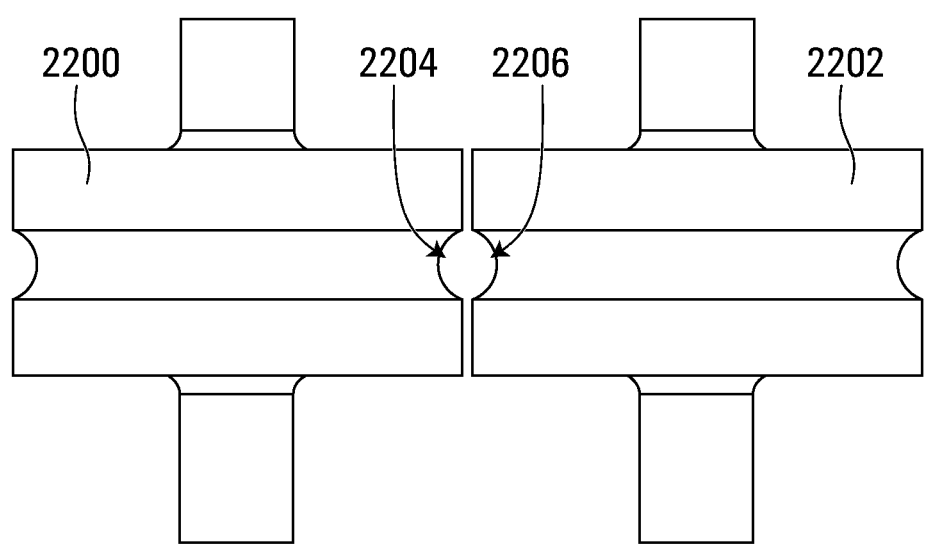
FIG. 33 is a top view of rollers for a roll crusher, in accordance with various embodiments.

Referring now to FIG. 33, in some embodiments, rollers 2200 and 2202 may be used in place of other rollers described herein. In some embodiments, the rollers 2200 and 2202 may include grooves 2204 and 2206 that generally match an outer shape of the drill core to be crushed. In some embodiments, this may facilitate processing of core samples by providing better crushing results. In some embodiments, use of the rollers 2200 and 2202 may facilitate better processing of full cylindrical core.

In various embodiments, use of the rollers 2200 and 2202 having a concave outer surface that corresponds to the shape of the drill core may distribute loads onto the surface of the drill core more uniformly. In some embodiments, this may facilitate rock hardness measurement that is less sensitive to how the drill core is fed into the rollers 2200 and 2202. In various embodiments, the shape of the rollers 2200 and 2202 may facilitate better intake of the drill core as there may be additional contact area between the drill core and the moving rollers 2200 and 2202.

Referring to FIG. 33, in various embodiments, the rollers 2200 and 2202 may be sized: 400 mm diameter and 200 mm width. In various embodiments, the profile of the grooves 2204 and 2206 may have a diameter of 63.5 mm which may be close to matching a standard diameter, such as, for example the diameter of HQ core In some embodiments, the profile may impinge on the cylindrical core by an offset, such as, for example, by 10 mm, so that the cylindrical core is squeezed (i.e. if the profile exactly matched the cylindrical core, there would be no crushing action as the cylindrical core would fit perfectly between the two rollers). In various embodiments, the shape of the rollers 2200 and 2202 may facilitate use of the rollers 2200 and 2202 with cylindrical drill core.

In some embodiments, only one of the rollers 2200 and 2202 may include a groove, such that the rollers may be used with half drill core.

Figure 34:
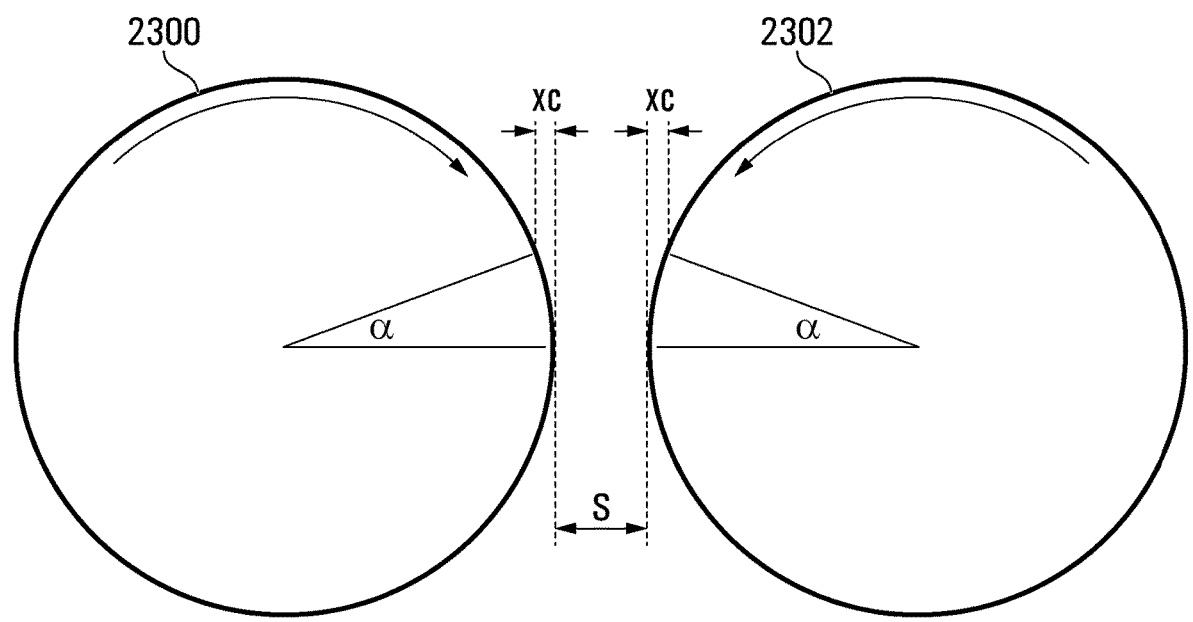
FIG. 34 is a schematic front view of rollers for a roll crusher depicting compression distances during roll crushing of a rock sample, in accordance with various embodiments.

Referring to FIG. 34, there is provided a schematic representation of rollers 2300 and 2302 that may be generally similar to the rollers 1050 and 1052 shown in FIG. 17 and may be included in a roll crusher such as one generally similar to the roll crusher 1020. Referring to FIG. 34, during roll crushing of a rock sample, the rollers 2300 and 2302 may compress a rock sample by a compression distance, xc, on each side of the rock sample. In various embodiments, the compression distance xc may be determined by the lateral distance from the contact point of a rock sample and the surface of a roller to the surface at the same roller at the point where the roller gap is smallest (e.g. 3 PM or 9 PM on a clock).

In various embodiments, a measurement device may be configured to determine crushing energy applied to the rock sample during roll crushing by the rollers 2300 and 2302 based at least in part on sensed force information and compression distance, such as, for example, by multiplying crushing force by compression distance of the rock sample. For example, the measurement device may be configured to determine an area under a force versus compression distance (xc) graph as representative of crushing energy. The resulting units of the area beneath the curve of the force (kN) and compression distance curve (mm) are, kN·mm, which are equivalent to energy in Joules. In various embodiments, the measurement device may be configured to determine hardness of the rock sample based on the determined area under the force versus compression distance (xc) graph.

Figure 35:
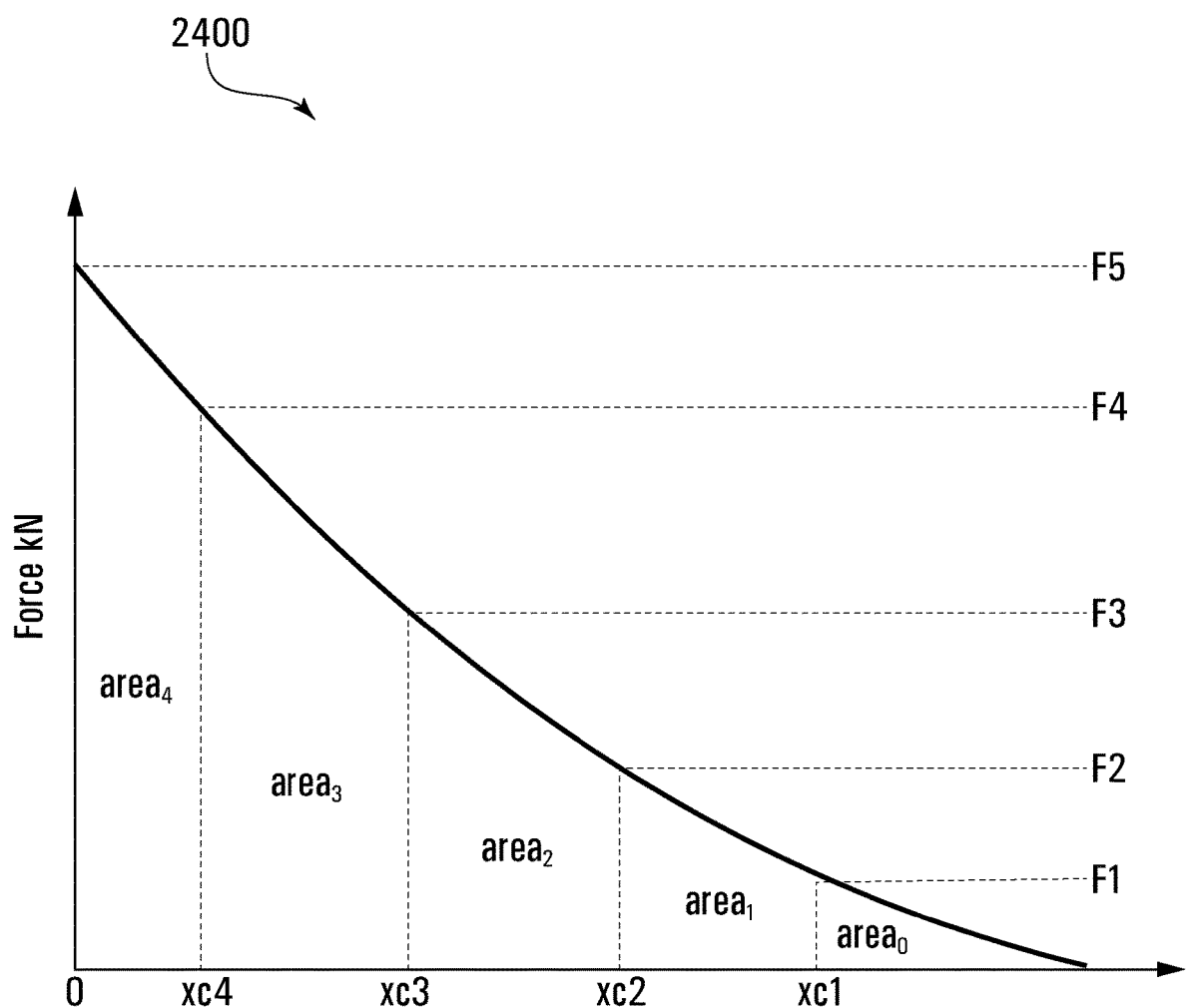
FIG. 35 is a graph showing force versus compression distances during roll crushing of a rock sample, in accordance with various embodiments.

Referring to FIG. 35, there is provided a force versus compression distance (xc) graph 2400 that shows how force may vary based on compression distance (xc) during the roll crushing of a rock sample by the rollers 2300 and 2302 shown in FIG. 34.

In various embodiments, the measurement device used with the rollers 2300 and 2302 shown in FIG. 34 may include blocks of codes generally similar to those of the flowchart 1200 except that a block of codes having functionality generally similar to the block of codes 1206 may direct a processor of the measurement device to determine energy applied to the rock sample during roll crushing by the rollers 2300 and 2302 from sensed force information and compression distance and to determine at least one hardness parameter based on the determined energy.

Referring to FIG. 34, the compression distance, $xc_n$, may be a horizontal distance from the contact point between the roller surface and the rock sample to the surface of the roller at the point where the roller gap is smallest (e.g. 3 PM or 9 PM on a clock). When there are two rollers, 2*xc may represent a size that the rock sample has to reduce by in order to pass between the rollers, since the onset of crushing, in order to exit the roll crusher. In various embodiments, compression distance, $xc_n$, may be calculated for any time increment, n, during roll crushing of the rock sample using the following:

$$\text{Compressive displacement, } xc_n = R \cdot \left(1 - \cos\left((t_{end} - t_n) \cdot 6 \cdot \text{rpm} \cdot \frac{\prod}{180}\right)\right)$$

Where R is the roller radius (mm), rpm is the rotational speed of rollers (rpm), $t_{end}$ is the final time increment during processing of a rock sample where the measured force is above the force threshold, which may be at the minimum roller gap, s, and to is a time increment during the crushing stage during which the force value is above the force threshold. In some embodiments, the roller radius may be about 200 mm, and the rotational speed of the rollers may be set to about 5 rpm, for example.

Referring to FIG. 35, the area under the force versus compression distance curve may be determined or estimated from the trapezoidal rule using the following:

$$\text{Energy (Joules)} = 2 \cdot \Sigma_{i=0}^{n} 0.5 \cdot (F_1 + F_0) \cdot (xc_0 \cdot xc_1) + 0.5 \cdot (F_2 + F_1) \cdot (xc_1 - xc_2) + \ldots + 0.5 \cdot (F_n + F_{n-1}) \cdot (xc_{n-1} - xc_n)$$

Where F is the crushing force (in kN, for example) measured by force sensors generally similar to the force sensors 1042 and 1044 shown in FIGS. 17 and 18 and xc is compression distance (mm), determined from roller speed, the size of the roller radius and the time increment, as described in the previous equation.

In various embodiments, the block having functionality generally similar to the block 1206 shown in FIG. 20 may direct the processor of the measurement device to use the above formula to determine or estimate the area under the force versus compression distance curve.

In various embodiments, the block may direct the processor to determine the processing energy in kWh by dividing the resulting energy in Joules by $3.6 \times 10^6$.

In various embodiments, the block having functionality generally similar to the block 1206 shown in FIG. 20 may direct the processor of the measurement device to determine a specific energy consumption (kWh/t) for the rock sample. The block may direct the processor to determine a mass of the rock sample, such as by determining a volume of the rock sample and multiplying by a rock sample density. In various embodiments, the rock sample density may have previously been assumed or estimated by a user and stored in memory in the measurement device.

In some embodiments, the block may direct the processor to use the size information determined at a block generally similar to the block 1204 to determine the volume of the rock sample. In some embodiments, the block may direct the processor to use one or more cameras to estimate the volume of the rock sample.

In various embodiments, the block having functionality generally similar to the block 1206 shown in FIG. 20 may direct the processor of the measurement device to divide the determined energy in kWh by the mass (in tonnes) of the rock sample to determine the specific energy consumption in (kWh/t).

The block having functionality generally similar to the block 1206 shown in FIG. 20 may direct the processor of the measurement device to determine or estimate a Drop Weight Index using the following equation, which may have been previously determined using a regression fit based on experimental results:

$$y=0.1561 \cdot E$$

Where y is the Drop Weight Index and E, is the energy in Joules, and the regression was fit with an $R^2$ of 0.96 using a roller gap of 16 mm, for example.

In various embodiments, the determined Drop Weight Index may act as a hardness parameter and may be treated generally as described above for other similar hardness parameters, for example.

Although the roll crusher 1020 shown in FIGS. 17 and 18 includes two force sensors, in various embodiments, a roll crusher generally similar to the roll crusher 1020 but including any number of force sensors, including a single force sensor, for example, may be used in the system 10 shown in FIG. 1 generally as described herein regarding the roll crusher 1020. In such embodiments, the measurement device 1030 may aggregate the forces sensed from the one or more force sensors before performing generally as described herein. More generally, in various embodiments, a roll crusher similar to any of the roll crushers described herein may include any number of force sensors, including a single force sensor.

While specific embodiments of the invention have been described and illustrated, such embodiments should be considered illustrative of the invention only and not as limiting the invention as construed in accordance with the accompanying claims.

The invention claimed is:

1. A method of facilitating hardness measurement of a rock sample, the method comprising:
   receiving force information representing one or more forces applied to the rock sample during roll crushing of the rock sample by at least one roller;
   determining size information representing a size of the rock sample, wherein determining the size information comprises determining, based on at least the force information, a processing time during which the one or more forces were applied to the rock sample during the roll crushing of the rock sample; and
   determining, based on at least the force information and the size information, at least one hardness parameter representing hardness of the rock sample.

2. The method of claim 1 wherein determining the processing time comprises determining the processing time as a time period during which the one or more forces applied to the rock sample remained above a threshold force.

3. The method of claim 1 wherein determining the size information comprises determining a size parameter representing the size of the rock sample based at least in part on the processing time and wherein determining the at least one hardness parameter comprises determining the at least one hardness parameter based at least in part on the force information and the size parameter.

4. The method of claim 1 further comprising receiving roller gap information representing a roller gap size provided by the at least one roller during the roll crushing and wherein determining the at least one hardness parameter comprises determining the at least one hardness parameter based at least in part on the roller gap information.

5. The method of claim 4 wherein determining the size information comprises determining the size information based at least in part on the roller gap information.

6. The method of claim 4 wherein determining the at least one hardness parameter comprises determining from the roller gap information, a maximum roller gap size during roll crushing of the rock sample and determining the at least one hardness parameter based at least in part on the maximum roller gap size.

7. The method of claim 1 wherein determining the at least one hardness parameter comprises determining compression distance of the rock sample during roll crushing and multiplying crushing forces of the one or more forces represented by the force information by the compression distance to determine crushing energy.

8. The method of claim 1 wherein determining the at least one hardness parameter comprises determining a maximum force of the one or more forces and determining the at least one hardness parameter based at least in part on the maximum force.

9. The method of claim 1 wherein receiving the force information comprises receiving a representation of one or more sensed roller holding forces holding the at least one roller against at least one gap limiter during the roll crushing and determining the one or more forces based at least in part on the one or more sensed roller holding forces.

10. The method of claim 1 further comprising controlling at least one roller engagement holder to adjust an applied roller gathering force.

11. The method of claim 10 wherein controlling the at least one roller engagement holder comprises controlling at least one hydraulic actuator included in the at least one roller engagement holder to adjust the applied roller gathering force.

12. The method of claim 1 wherein the one or more forces have a sampling period of less than about 1 ms.

13. The method of claim 1 wherein one or more forces have a sampling period of less than about 0.2 ms.

14. The method of claim 1 further comprising associating the at least one hardness parameter with at least one location from which the rock sample was extracted.

15. The method of claim 14 wherein the rock sample is from a drill core, the method further comprising:
   receiving core position information representing a position of the drill core relative to the at least one roller; and
   determining the at least one location based at least in part on the core position information.

16. The method of claim 15 wherein receiving the core position information comprises receiving engager position information, the engager position information representing a position of an engager configured to engage the drill core for urging the drill core towards the at least one roller for roll crushing.

17. The method of claim 16 further comprising causing a guide to guide the engager into engagement with the drill core for urging the drill core towards the at least one roller for roll crushing.

18. The method of claim 1 wherein the force information includes roll crushing motor power information representing the one or more forces applied to the rock sample during roll crushing of the rock sample.

19. A method of facilitating hardness measurement of a plurality of rock samples having varying sizes, the method comprising:

for each of the plurality of rock samples, performing the method of claim 1 to determine at least one hardness parameter for the rock sample.

20. The method of claim 19 further comprising determining an average hardness parameter for a set of the plurality of rock samples.

21. The method of claim 20 further comprising causing a representation of the average hardness parameter to be displayed by a display to a user.

22. A method of facilitating hardness measurement of a rock sample from a drill core, the method comprising:
- receiving force information representing one or more forces applied to the rock sample during roll crushing of the rock sample by at least one roller;
- determining size information representing a size of the rock sample;
- determining, based on at least the force information and the size information, at least one hardness parameter representing hardness of the rock sample;
- receiving core position information representing a position of the drill core relative to the at least one roller;
- determining at least one location from which the rock sample was extracted based at least in part on the core position information; and
- associating the at least one hardness parameter with the at least one location.

23. The method of claim 22 wherein associating the at least one hardness parameter with the at least one location comprises associating the at least one hardness parameter with first location information representing a location of a first end of the rock sample.

24. The method of claim 23 wherein associating the at least one hardness parameter with the at least one location comprises receiving rock sample length information representing a length of the rock sample.

25. The method of claim 24 further comprising determining, based on the first location information and the rock sample length information, second location information representing a location of a second end of the rock sample.

26. The method of claim 25 wherein the rock sample is a first rock sample, the method further comprising:
- receiving force information representing one or more forces applied to a second rock sample during roll crushing of the second rock sample by the at least one roller;
- determining, based on at least the force information, at least one hardness parameter representing hardness of the second rock sample; and
- associating the at least one hardness parameter representing hardness of the second rock sample with the second location information, the second location information representing a location of a first end of the second rock sample.

27. The method of claim 22 wherein determining the size information comprises determining, based on at least the force information, a processing time during which the one or more forces were applied to the rock sample during the roll crushing of the rock sample and wherein determining the processing time comprises determining the processing time as a time period during which the one or more forces applied to the rock sample remained above a threshold force.

28. The method of claim 22 wherein determining the size information comprises determining, based on at least the force information, a processing time during which the one or more forces were applied to the rock sample during the roll crushing of the rock sample and wherein determining the size information comprises determining a size parameter representing the size of the rock sample based at least in part on the processing time and wherein determining the at least one hardness parameter comprises determining the at least one hardness parameter based at least in part on the force information and the size parameter.

29. The method of claim 22 further comprising receiving roller gap information representing a roller gap size provided by the at least one roller during the roll crushing and wherein determining the at least one hardness parameter comprises determining the at least one hardness parameter based at least in part on the roller gap information.

30. The method of claim 29 wherein determining the size information comprises determining the size information based at least in part on the roller gap information.

31. The method of claim 29 wherein determining the at least one hardness parameter comprises determining from the roller gap information, a maximum roller gap size during roll crushing of the rock sample and determining the at least one hardness parameter based at least in part on the maximum roller gap size.

32. The method of claim 22 wherein determining the at least one hardness parameter comprises determining compression distance of the rock sample during roll crushing and multiplying crushing forces of the one or more forces represented by the force information by the compression distance to determine crushing energy.

33. The method of claim 22 wherein determining the at least one hardness parameter comprises determining a maximum force of the one or more forces and determining the at least one hardness parameter based at least in part on the maximum force.

34. The method of claim 22 wherein receiving the force information comprises receiving a representation of one or more sensed roller holding forces holding the at least one roller against at least one gap limiter during the roll crushing and determining the one or more forces based at least in part on the one or more sensed roller holding forces.

35. The method of claim 22 further comprising controlling at least one roller engagement holder to adjust an applied roller gathering force.

36. The method of claim 35 wherein controlling the at least one roller engagement holder comprises controlling at least one hydraulic actuator included in the at least one roller engagement holder to adjust the applied roller gathering force.

37. The method of claim 22 wherein the one or more forces have a sampling period of less than about 1 ms.

38. The method of claim 22 wherein one or more forces have a sampling period of less than about 0.2 ms.

39. The method of claim 22 wherein receiving the core position information comprises receiving engager position information, the engager position information representing a position of an engager configured to engage the drill core for urging the drill core towards the at least one roller for roll crushing.

40. The method of claim 39 further comprising causing a guide to guide the engager into engagement with the drill core for urging the drill core towards the at least one roller for roll crushing.

41. The method of claim 22 wherein the force information includes roll crushing motor power information representing the one or more forces applied to the rock sample during roll crushing of the rock sample.

42. A method of facilitating hardness measurement of a plurality of rock samples having varying sizes, the method comprising:

for each of the plurality of rock samples, performing the method of claim 22 to determine at least one hardness parameter for the rock sample.

43. The method of claim 42 further comprising determining an average hardness parameter for a set of the plurality of rock samples.

44. The method of claim 43 further comprising causing a representation of the average hardness parameter to be displayed by a display to a user.

* * * * *